US012440557B2

(12) United States Patent
Wang et al.

(10) Patent No.: US 12,440,557 B2

(45) Date of Patent: Oct. 14, 2025

(54) PEPTIDE IMMUNOGENS AND FORMULATIONS THEREOF TARGETING MEMBRANE-BOUND IgE FOR TREATMENT OF IgE MEDIATED ALLERGIC DISEASES

(71) Applicant: United Biomedical, Inc., Hauppauge, NY (US)

(72) Inventors: Chang Yi Wang, Cold Spring Harbor, NY (US); Feng Lin, Hauppauge, NY (US); Jiun Bo Chen, Hauppauge (TW)

(73) Assignee: United Biomedical, Inc., Hauppauge, NY (US)

( * ) Notice: Subject to any disclaimer, the term of this patent is extended or adjusted under 35 U.S.C. 154(b) by 1142 days.

(21) Appl. No.: 16/959,378

(22) PCT Filed: Dec. 31, 2017

(86) PCT No.: PCT/US2017/069174

§ 371 (c)(1),
(2) Date: Jun. 30, 2020

(87) PCT Pub. No.: WO2019/133024

PCT Pub. Date: Jul. 4, 2019

(65) Prior Publication Data

US 2023/0270848 A1 Aug. 31, 2023

(51) Int. Cl.

| | |
|---|---|
| ***A61K 39/35*** | (2006.01) |
| ***A61K 47/42*** | (2017.01) |
| ***C07K 16/42*** | (2006.01) |
| *A61K 39/00* | (2006.01) |

(52) U.S. Cl.

CPC .............. *A61K 39/35* (2013.01); *A61K 47/42* (2013.01); *C07K 16/4291* (2013.01); *A61K 2039/505* (2013.01); *A61K 2039/55561* (2013.01)

(58) Field of Classification Search

CPC ..... A61K 39/35; A61K 39/00; C07K 16/4291
See application file for complete search history.

(56) References Cited

U.S. PATENT DOCUMENTS

| | | | | |
|---|---|---|---|---|
| 6,811,782 | B1 | 11/2004 | Wang et al. | |
| 6,906,169 | B2 * | 6/2005 | Wang | C07K 14/4711 530/324 |
| 9,408,897 | B2 * | 8/2016 | Levinson | A61K 39/08 |
| 2006/0052592 | A1 | 3/2006 | Levinson et al. | |
| 2013/0302314 | A1 | 11/2013 | Chang et al. | |
| 2014/0127244 | A1 | 5/2014 | Levinson et al. | |
| 2014/0271690 | A1 * | 9/2014 | Wang | C07K 16/18 530/387.9 |

FOREIGN PATENT DOCUMENTS

| | | | | |
|---|---|---|---|---|
| CN | 1167491 | A | 12/1997 | |
| EP | 1090039 | B1 | 4/2009 | |
| JP | 2002518038 | A | 6/2002 | |
| JP | 2004508028 | A | 3/2004 | |
| WO | WO-9612740 | A1 * | 5/1996 | A61K 39/0008 |
| WO | 1999067293 | A1 | 12/1999 | |
| WO | 2010097012 | A1 | 9/2010 | |
| WO | 2014165028 | A1 | 10/2014 | |

OTHER PUBLICATIONS

Korean Office Action dated Mar. 28, 2023, issued during the prosecution of Korean Patent Application No. 10-2020-7022271.

H, D., Brightbill, et al., "Antibodies Specific for a Segment of Human Membrane IgE Deplete IgE-producing B cells in humanized mice" Journal of Clinical Investigation, vol. 120, No. 6, Jun. 2010, 13 pages.

J. Chrn, et al., "Unique Epitopes on CemX in IgE-B Cell Receptors Are Potentially Applicable for Targeting IgE-Committed B Cells", The Journal of Immunology, vol. I 184, pp. 1748-1756, 2010.

Japanese Office Action dated Dec. 21, 2021, issued during the prosecution of Japanese Patent Application No. JP 2020-536658.

Singapore Examination Report dated Jul. 31, 2023, issued during the prosecution of Patent Application No. 11202006215T.

Wang et al., "Synthetic IgE peptide vaccine for immunotherapy of allergy" Vaccine 21 (2003) 1580-1590.

Weeratna et al., "Immunogenicity of a peptide-based anti-IgE conjugate vaccine in non-human primates" Immunity, Inflammation and Disease, Jun. 2016; 4(2): 135-147.

Vigl B. et al., Quantitative in vitro and in vivo models to assess human IgE B cell receptor crosslinking by IgE and EMPD IgE targeting antibodies. J Immunol Methods, Jun. 21, 2017, vol. 449, pp. 28-36.

(Continued)

*Primary Examiner* — Aurora M Fontainhas
*Assistant Examiner* — Jennifer A Benavides
(74) *Attorney, Agent, or Firm* — Troutman Pepper Locke LLP; Peter N. Fill; Nicholas J. DiCeglie, Jr.

(57) ABSTRACT

The present disclosure is directed to peptide immunogen constructs targeting the extracellular membrane-proximal domain of membrane-bound IgE (or IgE EMPD) and formulations thereof for the treatment of IgE-mediated allergic diseases. The IgE EMPD peptide immunogen constructs have a B cell epitope peptide of more than 20 amino acids, preferably cyclic, linked through an optional spacer to heterologous T helper cell (Th) epitopes derived from pathogen proteins. These peptide immunogen constructs and formulations thereof can stimulate the generation of highly specific antibodies in vaccinated hosts that are directed against the IgE EMPD peptide and are crossreactive with membrane-bound IgE on B lymphocytes committed to IgE secretion. The antibodies induced by the peptide immunogen constructs and formulations thereof in vaccinated hosts can induce apoptosis of IgE-expressing B cells and mediate Antibody Dependent Cellular Cytototoxity (ADCC), resulting in reduction of antigen-specific IgE and total IgE levels in vaccinated hosts to effectively treat IgE-mediated allergic pathology.

4 Claims, 23 Drawing Sheets

Specification includes a Sequence Listing.

(56) References Cited

OTHER PUBLICATIONS

Taiwanese Search Report dated Apr. 22, 2020, issued during the prosecution of TW107147187.
Taiwanese Search Report dated Sep. 12, 2022, issued during the prosecution of TW107147187.
Chinese Office Action dated Jan. 5, 2023, issued during the prosecution of CN2017800980834.
Russian Search Report dated Nov. 19, 2021, issued during the prosecution of RU2020125383.
Indonesia Office Action dated Aug. 13, 2022, issued during the prosecution of IDP00202005611.
Mexican Office Action dated Nov. 1, 2024, issued during the prosecution of MX/a/2020/006937.
Canadian Office Action dated Feb. 2, 2024, issued during the prosecution of CA3,087,036.
Australian Examination report dated Sep. 3, 2024, issued during the prosecution of AU2017445171.
PCT International Search Report issued during the prosecution of PCT/US2017/069174. dated Jun. 6, 2028.

* cited by examiner

Mechanism of the IgE-mediated Allergic Disease Pathway

| SEQ ID NO | $EC_{50}$ (µg/mL) |
|---|---|
| 88 | 0.03320 |
| 89 | 0.02368 |
| 90 | 0.03980 |
| 91 | 0.03561 |
| 92 | 0.04522 |
| 93 | 0.02111 |
| 94 | 0.08892 |
| 96 | >5 |
| 97 | 1.127 |

Figure 7
% Annexin V+/PI-
80
60
20
62.5
125.0
250.0
500.0
1000.0
SEQ ID NO: 89
SEQ ID NO: 90
SEQ ID NO: 91
SEQ ID NO: 92
SEQ ID NO: 93
Xolair (anti-IgE mAb)

Cell line: mIgE.Fc$_L$ Ramos

Antibodies: purified guinea pig anti-IgE-EMPD IgG

| **SEQ ID NO:** | **88** | **89** | **90** | **91** | **92** | **93** | **Xolair** |
|---|---|---|---|---|---|---|---|
| $EC_{50}$ (ng/mL) | 303.8 | 345.3 | 277.5 | 403.9 | 536 | 302 | 121.4 |

- *Animals:* F1 offspring (hIGHE x Balb/c).
- *Groups:* Placebo and 3 vaccination groups.
- *Vaccine dose:* Immunize on weeks 0, 3, and 5 with doses at 9 (low) , 18 (medium) or 40 (high) µg per dose or adjuvant placebo by *i.m.* route.
- *Allergen:* Immunize on week 10 and 16 with 50 µg papain/TiterMax Gold adjuvant by subcutaneous route.

Figure 15

Experimental Protocol for Efficacy Evaluation of IgE-EMPD Vaccine Formulations On Sensitization/Recall Responses in Human IGHE Knockin Hybrid Mice

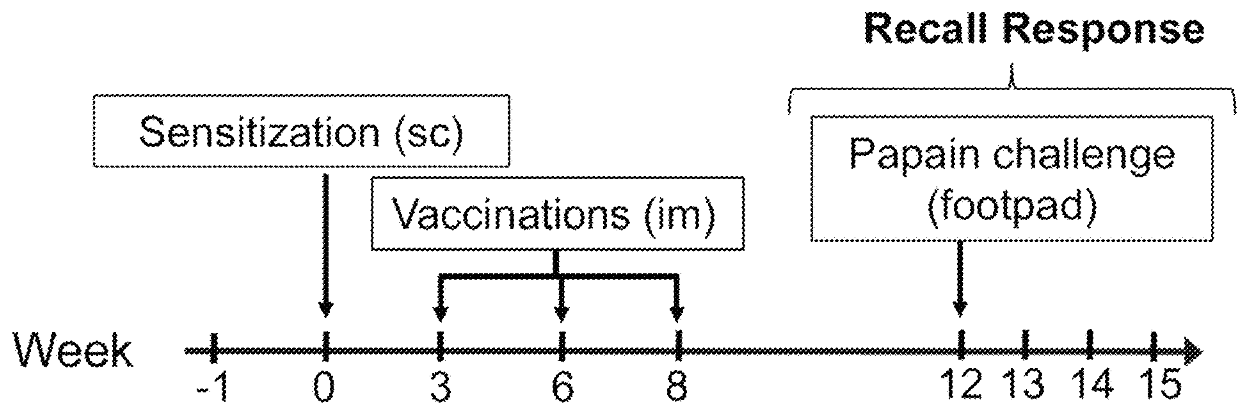

- *Animals*: F1 offspring (HuIGHE x Balb/c).
- *Groups:* Placebo and vaccination groups.
- *Vaccine dose:* Immunize on weeks 3, 6, and 8 with a dose of 40 μg or adjuvant placebo by *i.m.* route.
- *Allergen:* Sensitize on week 0 with 50 μg papain/TiterMax Gold adjuvant by subcutaneous route and recall on week 12 with 50 μg papain/PBS solution via footpad.

Figure 20
Antibody titers [$\log_{10}$(dilution factor)] to SEQ ID NO: 5
SEQ ID NO: 125
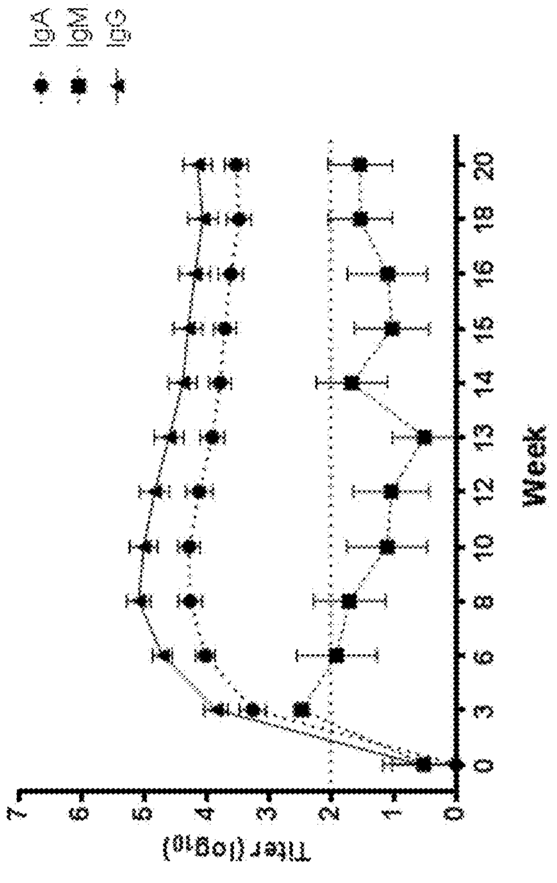
SEQ ID NO: 126
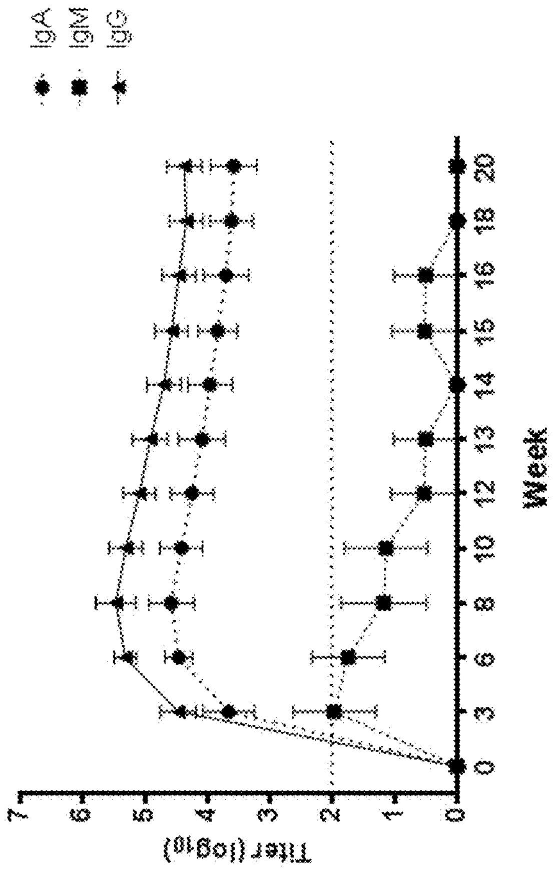

SEQUENCE LISTING

```
<160> NUMBER OF SEQ ID NOS: 130

<210> SEQ ID NO 1
<211> LENGTH: 67
<212> TYPE: PRT
<213> ORGANISM: Homo sapiens
<220> FEATURE:
<221> NAME/KEY: PEPTIDE
<222> LOCATION: (1)..(67)
<223> OTHER INFORMATION: IgE-EMPD 1-67

<400> SEQUENCE: 1

Gly Leu Ala Gly Gly Ser Ala Gln Ser Gln Arg Ala Pro Asp Arg Val
1               5                   10                  15

Leu Cys His Ser Gly Gln Gln Gln Gly Leu Pro Arg Ala Ala Gly Gly
            20                  25                  30

Ser Val Pro His Pro Arg Cys His Cys Gly Ala Gly Arg Ala Asp Trp
        35                  40                  45

Pro Gly Pro Pro Glu Leu Asp Val Cys Val Glu Glu Ala Glu Gly Glu
    50                  55                  60

Ala Pro Trp
65


<210> SEQ ID NO 2
<211> LENGTH: 52
<212> TYPE: PRT
<213> ORGANISM: Homo sapiens
<220> FEATURE:
<221> NAME/KEY: PEPTIDE
<222> LOCATION: (1)..(52)
<223> OTHER INFORMATION: IgE-EMPD 1-52

<400> SEQUENCE: 2

Gly Leu Ala Gly Gly Ser Ala Gln Ser Gln Arg Ala Pro Asp Arg Val
1               5                   10                  15

Leu Cys His Ser Gly Gln Gln Gln Gly Leu Pro Arg Ala Ala Gly Gly
            20                  25                  30

Ser Val Pro His Pro Arg Cys His Cys Gly Ala Gly Arg Ala Asp Trp
        35                  40                  45

Pro Gly Pro Pro
    50


<210> SEQ ID NO 3
<211> LENGTH: 77
<212> TYPE: PRT
<213> ORGANISM: Homo sapiens
<220> FEATURE:
```

<221> NAME/KEY: PEPTIDE
<222> LOCATION: (1)..(76)
<223> OTHER INFORMATION: IgE-EMPD -10-66

<400> SEQUENCE: 3

Thr Val Gln Arg Ala Val Ser Val Asn Pro Gly Leu Ala Gly Gly Ser
1 5 10 15

Ala Gln Ser Gln Arg Ala Pro Asp Arg Val Leu Cys His Ser Gly Gln
20 25 30

Gln Gln Gly Leu Pro Arg Ala Ala Gly Gly Ser Val Pro His Pro Arg
35 40 45

Cys His Cys Gly Ala Gly Arg Ala Asp Trp Pro Gly Pro Pro Glu Leu
50 55 60

Asp Val Cys Val Glu Glu Ala Glu Gly Glu Ala Pro Trp
65 70 75

<210> SEQ ID NO 4
<211> LENGTH: 62
<212> TYPE: PRT
<213> ORGANISM: Homo sapiens
<220> FEATURE:
<221> NAME/KEY: PEPTIDE
<222> LOCATION: (1)..(62)
<223> OTHER INFORMATION: IgE-EMPD -10-52

<400> SEQUENCE: 4

Thr Val Gln Arg Ala Val Ser Val Asn Pro Gly Leu Ala Gly Gly Ser
1 5 10 15

Ala Gln Ser Gln Arg Ala Pro Asp Arg Val Leu Cys His Ser Gly Gln
20 25 30

Gln Gln Gly Leu Pro Arg Ala Ala Gly Gly Ser Val Pro His Pro Arg
35 40 45

Cys His Cys Gly Ala Gly Arg Ala Asp Trp Pro Gly Pro Pro
50 55 60

<210> SEQ ID NO 5
<211> LENGTH: 39
<212> TYPE: PRT
<213> ORGANISM: Homo sapiens
<220> FEATURE:
<221> NAME/KEY: PEPTIDE
<222> LOCATION: (1)..(39)
<223> OTHER INFORMATION: IgE-EMPD 1-39

<400> SEQUENCE: 5

Gly Leu Ala Gly Gly Ser Ala Gln Ser Gln Arg Ala Pro Asp Arg Val
1 5 10 15

Leu Cys His Ser Gly Gln Gln Gln Gly Leu Pro Arg Ala Ala Gly Gly
20 25 30

Ser Val Pro His Pro Arg Cys
35

<210> SEQ ID NO 6
<211> LENGTH: 34
<212> TYPE: PRT
<213> ORGANISM: Homo sapiens
<220> FEATURE:
<221> NAME/KEY: PEPTIDE
<222> LOCATION: (1)..(34)
<223> OTHER INFORMATION: IgE-EMPD 7-40

<400> SEQUENCE: 6

Ala Gln Ser Gln Arg Ala Pro Asp Arg Val Leu Cys His Ser Gly Gln

```
1               5                   10                  15

Gln Gln Gly Leu Pro Arg Ala Ala Gly Gly Ser Val Pro His Pro Arg
            20                  25                  30

Cys His


<210> SEQ ID NO 7
<211> LENGTH: 17
<212> TYPE: PRT
<213> ORGANISM: Homo sapiens
<220> FEATURE:
<221> NAME/KEY: PEPTIDE
<222> LOCATION: (1)..(17)
<223> OTHER INFORMATION: IgE-EMPD 1-17

<400> SEQUENCE: 7

Gly Leu Ala Gly Gly Ser Ala Gln Ser Gln Arg Ala Pro Asp Arg Val
1               5                   10                  15

Leu


<210> SEQ ID NO 8
<211> LENGTH: 20
<212> TYPE: PRT
<213> ORGANISM: Homo sapiens
<220> FEATURE:
<221> NAME/KEY: PEPTIDE
<222> LOCATION: (1)..(20)
<223> OTHER INFORMATION: IgE-EMPD 19-38

<400> SEQUENCE: 8

His Ser Gly Gln Gln Gln Gly Leu Pro Arg Ala Ala Gly Gly Ser Val
1               5                   10                  15

Pro His Pro Arg
            20


<210> SEQ ID NO 9
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD -9-1

<400> SEQUENCE: 9

Val Gln Arg Ala Val Ser Val Asn Pro Gly
1               5                   10


<210> SEQ ID NO 10
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD -8-2

<400> SEQUENCE: 10

Gln Arg Ala Val Ser Val Asn Pro Gly Leu
1               5                   10


<210> SEQ ID NO 11
<211> LENGTH: 10
<212> TYPE: PRT
<213> ORGANISM: Homo sapiens
<220> FEATURE:
<221> NAME/KEY: PEPTIDE
```

<222> LOCATION: (1)..(10)
<223> OTHER INFORMATION: IgE-EMPD -7-3

<400> SEQUENCE: 11

Arg Ala Val Ser Val Asn Pro Gly Leu Ala
1 5 10

<210> SEQ ID NO 12
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD -6-4

<400> SEQUENCE: 12

Ala Val Ser Val Asn Pro Gly Leu Ala Gly
1 5 10

<210> SEQ ID NO 13
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgEEMPD -5-5

<400> SEQUENCE: 13

Val Ser Val Asn Pro Gly Leu Ala Gly Gly
1 5 10

<210> SEQ ID NO 14
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD -4-6

<400> SEQUENCE: 14

Ser Val Asn Pro Gly Leu Ala Gly Gly Ser
1 5 10

<210> SEQ ID NO 15
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD -3-7

<400> SEQUENCE: 15

Val Asn Pro Gly Leu Ala Gly Gly Ser Ala
1 5 10

<210> SEQ ID NO 16
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD -2-8

<400> SEQUENCE: 16

Asn Pro Gly Leu Ala Gly Gly Ser Ala Gln
1 5 10

<210> SEQ ID NO 17
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD -1-9

<400> SEQUENCE: 17

Pro Gly Leu Ala Gly Gly Ser Ala Gln Ser
1 5 10

<210> SEQ ID NO 18
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 1-10

<400> SEQUENCE: 18

Gly Leu Ala Gly Gly Ser Ala Gln Ser Gln
1 5 10

<210> SEQ ID NO 19
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 2-11

<400> SEQUENCE: 19

Leu Ala Gly Gly Ser Ala Gln Ser Gln Arg
1 5 10

<210> SEQ ID NO 20
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 3-12

<400> SEQUENCE: 20

Ala Gly Gly Ser Ala Gln Ser Gln Arg Ala
1 5 10

<210> SEQ ID NO 21
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 4-13

<400> SEQUENCE: 21

Gly Gly Ser Ala Gln Ser Gln Arg Ala Pro
1 5 10

<210> SEQ ID NO 22
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 5-14

<400> SEQUENCE: 22

Gly Ser Ala Gln Ser Gln Arg Ala Pro Asp
1               5                   10

<210> SEQ ID NO 23
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 6-15

<400> SEQUENCE: 23

Ser Ala Gln Ser Gln Arg Ala Pro Asp Arg
1               5                   10

<210> SEQ ID NO 24
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 7-16

<400> SEQUENCE: 24

Ala Gln Ser Gln Arg Ala Pro Asp Arg Val
1               5                   10

<210> SEQ ID NO 25
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 8-17

<400> SEQUENCE: 25

Gln Ser Gln Arg Ala Pro Asp Arg Val Leu
1               5                   10

<210> SEQ ID NO 26
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 9-18

<400> SEQUENCE: 26

Ser Gln Arg Ala Pro Asp Arg Val Leu Cys
1               5                   10

<210> SEQ ID NO 27
<211> LENGTH: 10
<212> TYPE: PRT

<213> ORGANISM: Homo sapiens
<220> FEATURE:
<221> NAME/KEY: PEPTIDE
<222> LOCATION: (1)..(10)
<223> OTHER INFORMATION: IgEEMPD 10-19

<400> SEQUENCE: 27

Gln Arg Ala Pro Asp Arg Val Leu Cys His
1 5 10

<210> SEQ ID NO 28
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 11-20

<400> SEQUENCE: 28

Arg Ala Pro Asp Arg Val Leu Cys His Ser
1 5 10

<210> SEQ ID NO 29
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 12-21

<400> SEQUENCE: 29

Ala Pro Asp Arg Val Leu Cys His Ser Gly
1 5 10

<210> SEQ ID NO 30
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 13-22

<400> SEQUENCE: 30

Pro Asp Arg Val Leu Cys His Ser Gly Gln
1 5 10

<210> SEQ ID NO 31
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 14-23

<400> SEQUENCE: 31

Asp Arg Val Leu Cys His Ser Gly Gln Gln
1 5 10

<210> SEQ ID NO 32
<211> LENGTH: 10
<212> TYPE: PRT
<213> ORGANISM: Homo sapiens
<220> FEATURE:
<221> NAME/KEY: PEPTIDE
<222> LOCATION: (1)..(10)

<223> OTHER INFORMATION: IgE-EMPD 15-24

<400> SEQUENCE: 32

```
Arg Val Leu Cys His Ser Gly Gln Gln Gln
1               5                   10
```

<210> SEQ ID NO 33
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 16-25

<400> SEQUENCE: 33

```
Val Leu Cys His Ser Gly Gln Gln Gln Gly
1               5                   10
```

<210> SEQ ID NO 34
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgEEMPD 17-26

<400> SEQUENCE: 34

```
Leu Cys His Ser Gly Gln Gln Gln Gly Leu
1               5                   10
```

<210> SEQ ID NO 35
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 18-27

<400> SEQUENCE: 35

```
Cys His Ser Gly Gln Gln Gln Gly Leu Pro
1               5                   10
```

<210> SEQ ID NO 36
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 19-28

<400> SEQUENCE: 36

```
His Ser Gly Gln Gln Gln Gly Leu Pro Arg
1               5                   10
```

<210> SEQ ID NO 37
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 20-29

<400> SEQUENCE: 37

Ser Gly Gln Gln Gln Gly Leu Pro Arg Ala
1 5 10

<210> SEQ ID NO 38
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 21-30

<400> SEQUENCE: 38

Gly Gln Gln Gln Gly Leu Pro Arg Ala Ala
1 5 10

<210> SEQ ID NO 39
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 22-31

<400> SEQUENCE: 39

Gln Gln Gln Gly Leu Pro Arg Ala Ala Gly
1 5 10

<210> SEQ ID NO 40
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 23-32

<400> SEQUENCE: 40

Gln Gln Gly Leu Pro Arg Ala Ala Gly Gly
1 5 10

<210> SEQ ID NO 41
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 24-33

<400> SEQUENCE: 41

Gln Gly Leu Pro Arg Ala Ala Gly Gly Ser
1 5 10

<210> SEQ ID NO 42
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 25-34

<400> SEQUENCE: 42

Gly Leu Pro Arg Ala Ala Gly Gly Ser Val
1 5 10

```
<210> SEQ ID NO 43
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 26-35

<400> SEQUENCE: 43

Leu Pro Arg Ala Ala Gly Gly Ser Val Pro
1               5                   10


<210> SEQ ID NO 44
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 27-36

<400> SEQUENCE: 44

Pro Arg Ala Ala Gly Gly Ser Val Pro His
1               5                   10


<210> SEQ ID NO 45
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgEEMPD 28-37

<400> SEQUENCE: 45

Arg Ala Ala Gly Gly Ser Val Pro His Pro
1               5                   10


<210> SEQ ID NO 46
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 29-38

<400> SEQUENCE: 46

Ala Ala Gly Gly Ser Val Pro His Pro Arg
1               5                   10


<210> SEQ ID NO 47
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 30-39

<400> SEQUENCE: 47

Ala Gly Gly Ser Val Pro His Pro Arg Cys
1               5                   10


<210> SEQ ID NO 48
<211> LENGTH: 10
<212> TYPE: PRT
<213> ORGANISM: Homo sapiens
```

<220> FEATURE:
<221> NAME/KEY: PEPTIDE
<222> LOCATION: (1)..(10)
<223> OTHER INFORMATION: IgE-EMPD 31-40

<400> SEQUENCE: 48

Gly Gly Ser Val Pro His Pro Arg Cys His
1 5 10

<210> SEQ ID NO 49
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 32-41

<400> SEQUENCE: 49

Gly Ser Val Pro His Pro Arg Cys His Cys
1 5 10

<210> SEQ ID NO 50
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 33-42

<400> SEQUENCE: 50

Ser Val Pro His Pro Arg Cys His Cys Gly
1 5 10

<210> SEQ ID NO 51
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 34-43

<400> SEQUENCE: 51

Val Pro His Pro Arg Cys His Cys Gly Ala
1 5 10

<210> SEQ ID NO 52
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 35-44

<400> SEQUENCE: 52

Pro His Pro Arg Cys His Cys Gly Ala Gly
1 5 10

<210> SEQ ID NO 53
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 36-45

<400> SEQUENCE: 53

His Pro Arg Cys His Cys Gly Ala Gly Arg
1 5 10

<210> SEQ ID NO 54
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 37-46

<400> SEQUENCE: 54

Pro Arg Cys His Cys Gly Ala Gly Arg Ala
1 5 10

<210> SEQ ID NO 55
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 38-47

<400> SEQUENCE: 55

Arg Cys His Cys Gly Ala Gly Arg Ala Asp
1 5 10

<210> SEQ ID NO 56
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 39-48

<400> SEQUENCE: 56

Cys His Cys Gly Ala Gly Arg Ala Asp Trp
1 5 10

<210> SEQ ID NO 57
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgEEMPD 40-49

<400> SEQUENCE: 57

His Cys Gly Ala Gly Arg Ala Asp Trp Pro
1 5 10

<210> SEQ ID NO 58
<211> LENGTH: 10
<212> TYPE: PRT
<213> ORGANISM: Homo sapiens
<220> FEATURE:
<221> NAME/KEY: PEPTIDE
<222> LOCATION: (1)..(10)
<223> OTHER INFORMATION: IgE-EMPD 41-50

<400> SEQUENCE: 58

Cys Gly Ala Gly Arg Ala Asp Trp Pro Gly 1 5 10

<210> SEQ ID NO 59
<211> LENGTH: 17
<212> TYPE: PRT
<213> ORGANISM: Clostridium tetani
<220> FEATURE:
<221> NAME/KEY: PEPTIDE
<222> LOCATION: (1)..(17)
<223> OTHER INFORMATION: Clostridium tetani 1 Th

<400> SEQUENCE: 59

Lys Lys Gln Tyr Ile Lys Ala Asn Ser Lys Phe Ile Gly Ile Thr Glu
1 5 10 15

Leu

<210> SEQ ID NO 60
<211> LENGTH: 15
<212> TYPE: PRT
<213> ORGANISM: Measles virus
<220> FEATURE:
<221> NAME/KEY: PEPTIDE
<222> LOCATION: (1)..(15)
<223> OTHER INFORMATION: MvF1 Th

<400> SEQUENCE: 60

Leu Ser Glu Ile Lys Gly Val Ile Val His Arg Leu Glu Gly Val
1 5 10 15

<210> SEQ ID NO 61
<211> LENGTH: 24
<212> TYPE: PRT
<213> ORGANISM: Bordetella pertussis
<220> FEATURE:
<221> NAME/KEY: PEPTIDE
<222> LOCATION: (1)..(24)
<223> OTHER INFORMATION: Bordetella pertussis Th

<400> SEQUENCE: 61

Gly Ala Tyr Ala Arg Cys Pro Asn Gly Thr Arg Ala Leu Thr Val Ala
1 5 10 15

Glu Leu Arg Gly Asn Ala Glu Leu
20

<210> SEQ ID NO 62
<211> LENGTH: 17
<212> TYPE: PRT
<213> ORGANISM: Clostridium tetani
<220> FEATURE:
<221> NAME/KEY: PEPTIDE
<222> LOCATION: (1)..(17)
<223> OTHER INFORMATION: Clostridium tetani 2 Th

<400> SEQUENCE: 62

Trp Val Arg Asp Ile Ile Asp Asp Phe Thr Asn Glu Ser Ser Gln Lys
1 5 10 15

Thr

<210> SEQ ID NO 63
<211> LENGTH: 23
<212> TYPE: PRT
<213> ORGANISM: diphtheria bacilli
<220> FEATURE:
<221> NAME/KEY: PEPTIDE
<222> LOCATION: (1)..(23)
<223> OTHER INFORMATION: Diphtheria Th

<400> SEQUENCE: 63

Asp Ser Glu Thr Ala Asp Asn Leu Glu Lys Thr Val Ala Ala Leu Ser
1 5 10 15

Ile Leu Pro Gly His Gly Cys
20

<210> SEQ ID NO 64
<211> LENGTH: 21
<212> TYPE: PRT
<213> ORGANISM: Plasmodium falciparum
<220> FEATURE:
<221> NAME/KEY: PEPTIDE
<222> LOCATION: (1)..(21)
<223> OTHER INFORMATION: Plasmodium falciparum Th

<400> SEQUENCE: 64

Asp His Glu Lys Lys His Ala Lys Met Glu Lys Ala Ser Ser Val Phe
1 5 10 15

Asn Val Val Asn Ser
20

<210> SEQ ID NO 65
<211> LENGTH: 17
<212> TYPE: PRT
<213> ORGANISM: Schistosoma mansoni
<220> FEATURE:
<221> NAME/KEY: PEPTIDE
<222> LOCATION: (1)..(17)
<223> OTHER INFORMATION: Schistosoma mansoni Th

<400> SEQUENCE: 65

Lys Trp Phe Lys Thr Asn Ala Pro Asn Gly Val Asp Glu Lys His Arg
1 5 10 15

His

<210> SEQ ID NO 66
<211> LENGTH: 25
<212> TYPE: PRT
<213> ORGANISM: Cholera Toxin
<220> FEATURE:
<221> NAME/KEY: PEPTIDE
<222> LOCATION: (1)..(25)
<223> OTHER INFORMATION: Cholera Toxin Th

<400> SEQUENCE: 66

Ala Leu Asn Ile Trp Asp Arg Phe Asp Val Phe Cys Thr Leu Gly Ala
1 5 10 15

Thr Thr Gly Tyr Leu Lys Gly Asn Ser
20 25

<210> SEQ ID NO 67
<211> LENGTH: 15
<212> TYPE: PRT
<213> ORGANISM: Measles virus
<220> FEATURE:
<221> NAME/KEY: PEPTIDE
<222> LOCATION: (1)..(15)
<223> OTHER INFORMATION: MvF 2 Th

<400> SEQUENCE: 67

Ile Ser Glu Ile Lys Gly Val Ile Val His Lys Ile Glu Gly Ile
1 5 10 15

<210> SEQ ID NO 68
<211> LENGTH: 22

<212> TYPE: PRT
<213> ORGANISM: Measles virus
<220> FEATURE:
<221> NAME/KEY: PEPTIDE
<222> LOCATION: (1)..(22)
<223> OTHER INFORMATION: KKKMvF 3 Th
<220> FEATURE:
<221> NAME/KEY: SITE
<222> LOCATION: (7)..(7)
<223> OTHER INFORMATION: S or T
<220> FEATURE:
<221> NAME/KEY: SITE
<222> LOCATION: (10)..(10)
<223> OTHER INFORMATION: K or R
<220> FEATURE:
<221> NAME/KEY: SITE
<222> LOCATION: (11)..(11)
<223> OTHER INFORMATION: G or T
<220> FEATURE:
<221> NAME/KEY: SITE
<222> LOCATION: (15)..(15)
<223> OTHER INFORMATION: H or T
<220> FEATURE:
<221> NAME/KEY: SITE
<222> LOCATION: (16)..(16)
<223> OTHER INFORMATION: K or R
<220> FEATURE:
<221> NAME/KEY: SITE
<222> LOCATION: (19)..(19)
<223> OTHER INFORMATION: G or T

<400> SEQUENCE: 68

```
Lys Lys Lys Ile Ser Ile Xaa Glu Ile Xaa Xaa Val Ile Val Xaa Xaa
1               5                   10                  15

Ile Glu Xaa Ile Leu Phe
            20
```

<210> SEQ ID NO 69
<211> LENGTH: 18
<212> TYPE: PRT
<213> ORGANISM: Hepatitis B virus
<220> FEATURE:
<221> NAME/KEY: PEPTIDE
<222> LOCATION: (1)..(18)
<223> OTHER INFORMATION: HBsAg 1 Th
<220> FEATURE:
<221> NAME/KEY: SITE
<222> LOCATION: (1)..(1)
<223> OTHER INFORMATION: K or R
<220> FEATURE:
<221> NAME/KEY: SITE
<222> LOCATION: (2)..(2)
<223> OTHER INFORMATION: K or R
<220> FEATURE:
<221> NAME/KEY: SITE
<222> LOCATION: (3)..(3)
<223> OTHER INFORMATION: K or R
<220> FEATURE:
<221> NAME/KEY: SITE
<222> LOCATION: (4)..(4)
<223> OTHER INFORMATION: L or I or V or F
<220> FEATURE:
<221> NAME/KEY: SITE
<222> LOCATION: (5)..(5)
<223> OTHER INFORMATION: F or K or R
<220> FEATURE:
<221> NAME/KEY: SITE
<222> LOCATION: (6)..(6)
<223> OTHER INFORMATION: L or I or V or F
<220> FEATURE:
<221> NAME/KEY: SITE
<222> LOCATION: (7)..(7)
<223> OTHER INFORMATION: L or I or V or F
<220> FEATURE:
<221> NAME/KEY: SITE
<222> LOCATION: (9)..(9)

<223> OTHER INFORMATION: K or R
<220> FEATURE:
<221> NAME/KEY: SITE
<222> LOCATION: (10)..(10)
<223> OTHER INFORMATION: L or I or V or F
<220> FEATURE:
<221> NAME/KEY: SITE
<222> LOCATION: (11)..(11)
<223> OTHER INFORMATION: L or I or V or F
<220> FEATURE:
<221> NAME/KEY: SITE
<222> LOCATION: (13)..(13)
<223> OTHER INFORMATION: L or I or V or F
<220> FEATURE:
<221> NAME/KEY: SITE
<222> LOCATION: (15)..(15)
<223> OTHER INFORMATION: Q or L or I or V or F
<220> FEATURE:
<221> NAME/KEY: SITE
<222> LOCATION: (17)..(17)
<223> OTHER INFORMATION: L or I or V or F
<220> FEATURE:
<221> NAME/KEY: SITE
<222> LOCATION: (18)..(18)
<223> OTHER INFORMATION: D or R

<400> SEQUENCE: 69

Xaa Xaa Xaa Xaa Xaa Xaa Xaa Thr Xaa Xaa Xaa Thr Xaa Pro Xaa Ser
1 5 10 15

Xaa Xaa

<210> SEQ ID NO 70
<211> LENGTH: 19
<212> TYPE: PRT
<213> ORGANISM: Measles virus
<220> FEATURE:
<221> NAME/KEY: PEPTIDE
<222> LOCATION: (1)..(19)
<223> OTHER INFORMATION: MvF 4 Th
<220> FEATURE:
<221> NAME/KEY: SITE
<222> LOCATION: (4)..(4)
<223> OTHER INFORMATION: S or T
<220> FEATURE:
<221> NAME/KEY: SITE
<222> LOCATION: (7)..(7)
<223> OTHER INFORMATION: K or R
<220> FEATURE:
<221> NAME/KEY: SITE
<222> LOCATION: (8)..(8)
<223> OTHER INFORMATION: G or T
<220> FEATURE:
<221> NAME/KEY: SITE
<222> LOCATION: (12)..(12)
<223> OTHER INFORMATION: H or T
<220> FEATURE:
<221> NAME/KEY: SITE
<222> LOCATION: (13)..(13)
<223> OTHER INFORMATION: K or R

<400> SEQUENCE: 70

Ile Ser Ile Xaa Glu Ile Xaa Xaa Val Ile Val Xaa Xaa Ile Glu Thr
1 5 10 15

Ile Leu Phe

<210> SEQ ID NO 71
<211> LENGTH: 18
<212> TYPE: PRT
<213> ORGANISM: Hepatitis B virus
<220> FEATURE:
<221> NAME/KEY: PEPTIDE
<222> LOCATION: (1)..(18)
<223> OTHER INFORMATION: HBsAg 2 Th
<220> FEATURE:
<221> NAME/KEY: SITE
<222> LOCATION: (4)..(4)
<223> OTHER INFORMATION: I or F
<220> FEATURE:
<221> NAME/KEY: SITE
<222> LOCATION: (5)..(5)
<223> OTHER INFORMATION: I or F
<220> FEATURE:
<221> NAME/KEY: SITE
<222> LOCATION: (6)..(6)
<223> OTHER INFORMATION: T or L
<220> FEATURE:
<221> NAME/KEY: SITE
<222> LOCATION: (7)..(7)
<223> OTHER INFORMATION: I or L
<220> FEATURE:
<221> NAME/KEY: SITE
<222> LOCATION: (11)..(11)
<223> OTHER INFORMATION: I or L
<220> FEATURE:
<221> NAME/KEY: SITE
<222> LOCATION: (14)..(14)
<223> OTHER INFORMATION: P or I
<220> FEATURE:
<221> NAME/KEY: SITE
<222> LOCATION: (15)..(15)
<223> OTHER INFORMATION: Q or T
<220> FEATURE:
<221> NAME/KEY: SITE
<222> LOCATION: (16)..(16)
<223> OTHER INFORMATION: S or T
<220> FEATURE:
<221> NAME/KEY: SITE
<222> LOCATION: (17)..(17)
<223> OTHER INFORMATION: L or I

<400> SEQUENCE: 71

Lys Lys Lys Xaa Xaa Xaa Xaa Thr Arg Ile Xaa Thr Ile Xaa Xaa Xaa
1 5 10 15

Xaa Asp

<210> SEQ ID NO 72
<211> LENGTH: 19
<212> TYPE: PRT
<213> ORGANISM: Measles virus
<220> FEATURE:
<221> NAME/KEY: PEPTIDE
<222> LOCATION: (1)..(19)
<223> OTHER INFORMATION: MvF 5 Th

<400> SEQUENCE: 72

Ile Ser Ile Thr Glu Ile Lys Gly Val Ile Val His Arg Ile Glu Thr
1 5 10 15

Ile Leu Phe

<210> SEQ ID NO 73
<211> LENGTH: 18
<212> TYPE: PRT
<213> ORGANISM: Hepatitis B virus
<220> FEATURE:
<221> NAME/KEY: PEPTIDE
<222> LOCATION: (1)..(18)
<223> OTHER INFORMATION: HBsAg 3 Th

<400> SEQUENCE: 73

Lys Lys Lys Ile Ile Thr Ile Thr Arg Ile Ile Thr Ile Ile Thr Thr
1 5 10 15

Ile Asp

<210> SEQ ID NO 74
<211> LENGTH: 11
<212> TYPE: PRT
<213> ORGANISM: Influenza virus
<220> FEATURE:
<221> NAME/KEY: PEPTIDE
<222> LOCATION: (1)..(11)
<223> OTHER INFORMATION: Influenza Matrix protein 1 _1 Th
<220> FEATURE:
<221> NAME/KEY: PEPTIDE
<222> LOCATION: (1)..(11)
<223> OTHER INFORMATION: Influenza Matrix protein 1_1 Th

<400> SEQUENCE: 74

Phe Val Phe Thr Leu Thr Val Pro Ser Glu Arg
1 5 10

<210> SEQ ID NO 75
<211> LENGTH: 15
<212> TYPE: PRT
<213> ORGANISM: Influenza virus
<220> FEATURE:
<221> NAME/KEY: PEPTIDE
<222> LOCATION: (1)..(15)
<223> OTHER INFORMATION: Influenza Matrix protein 1_2 Th

<400> SEQUENCE: 75

Ser Gly Pro Leu Lys Ala Glu Ile Ala Gln Arg Leu Glu Asp Val
1 5 10 15

<210> SEQ ID NO 76
<211> LENGTH: 9
<212> TYPE: PRT
<213> ORGANISM: Influenza virus
<220> FEATURE:
<221> NAME/KEY: PEPTIDE
<222> LOCATION: (1)..(9)
<223> OTHER INFORMATION: Influenza Non-structural protein 1 Th

<400> SEQUENCE: 76

Asp Arg Leu Arg Arg Asp Gln Lys Ser
1 5

<210> SEQ ID NO 77
<211> LENGTH: 19
<212> TYPE: PRT
<213> ORGANISM: Epstein-Barr virus
<220> FEATURE:
<221> NAME/KEY: PEPTIDE
<222> LOCATION: (1)..(19)
<223> OTHER INFORMATION: EBV BHRF1 Th

<400> SEQUENCE: 77

Ala Gly Leu Thr Leu Ser Leu Leu Val Ile Cys Ser Tyr Leu Phe Ile
1 5 10 15

Ser Arg Gly

<210> SEQ ID NO 78
<211> LENGTH: 15
<212> TYPE: PRT
<213> ORGANISM: Clostridium tetani
<220> FEATURE:
<221> NAME/KEY: PEPTIDE
<222> LOCATION: (1)..(15)
<223> OTHER INFORMATION: Clostridium tetani TT1 Th

<400> SEQUENCE: 78

Gln Tyr Ile Lys Ala Asn Ser Lys Phe Ile Gly Ile Thr Glu Leu
1 5 10 15

<210> SEQ ID NO 79
<211> LENGTH: 20
<212> TYPE: PRT
<213> ORGANISM: Epstein-Barr virus
<220> FEATURE:
<221> NAME/KEY: PEPTIDE
<222> LOCATION: (1)..(20)
<223> OTHER INFORMATION: EBV EBNA-1 Th

<400> SEQUENCE: 79

```
Pro Gly Pro Leu Arg Glu Ser Ile Val Cys Tyr Phe Met Val Phe Leu
1               5                   10                  15

Gln Thr His Ile
            20
```

<210> SEQ ID NO 80
<211> LENGTH: 21
<212> TYPE: PRT
<213> ORGANISM: Clostridium tetani
<220> FEATURE:
<221> NAME/KEY: PEPTIDE
<222> LOCATION: (1)..(21)
<223> OTHER INFORMATION: Clostridium tetani TT2 Th

<400> SEQUENCE: 80

```
Phe Asn Asn Phe Thr Val Ser Phe Trp Leu Arg Val Pro Lys Val Ser
1               5                   10                  15

Ala Ser His Leu Glu
            20
```

<210> SEQ ID NO 81
<211> LENGTH: 16
<212> TYPE: PRT
<213> ORGANISM: Clostridium tetani
<220> FEATURE:
<221> NAME/KEY: PEPTIDE
<222> LOCATION: (1)..(16)
<223> OTHER INFORMATION: Clostridium tetani TT3 Th

<400> SEQUENCE: 81

```
Lys Phe Ile Ile Lys Arg Tyr Thr Pro Asn Asn Glu Ile Asp Ser Phe
1               5                   10                  15
```

<210> SEQ ID NO 82
<211> LENGTH: 16
<212> TYPE: PRT
<213> ORGANISM: Clostridium tetani
<220> FEATURE:
<221> NAME/KEY: PEPTIDE
<222> LOCATION: (1)..(16)
<223> OTHER INFORMATION: Clostridium tetani TT4 Th

<400> SEQUENCE: 82

```
Val Ser Ile Asp Lys Phe Arg Ile Phe Cys Lys Ala Leu Asn Pro Lys
1               5                   10                  15
```

<210> SEQ ID NO 83
<211> LENGTH: 18
<212> TYPE: PRT
<213> ORGANISM: Epstein-Barr virus
<220> FEATURE:
<221> NAME/KEY: PEPTIDE
<222> LOCATION: (1)..(18)
<223> OTHER INFORMATION: EBV CP Th

<400> SEQUENCE: 83

```
Val Pro Gly Leu Tyr Ser Pro Cys Arg Ala Phe Phe Asn Lys Glu Glu
1               5                   10                  15

Leu Leu


<210> SEQ ID NO 84
<211> LENGTH: 14
<212> TYPE: PRT
<213> ORGANISM: Human cytomegalovirus
<220> FEATURE:
<221> NAME/KEY: PEPTIDE
<222> LOCATION: (1)..(14)
<223> OTHER INFORMATION: HCMV IE1 Th

<400> SEQUENCE: 84

Asp Lys Arg Glu Met Trp Met Ala Cys Ile Lys Glu Leu His
1               5                   10


<210> SEQ ID NO 85
<211> LENGTH: 15
<212> TYPE: PRT
<213> ORGANISM: Epstein-Barr virus
<220> FEATURE:
<221> NAME/KEY: PEPTIDE
<222> LOCATION: (1)..(15)
<223> OTHER INFORMATION: EBV GP340 Th

<400> SEQUENCE: 85

Thr Gly His Gly Ala Arg Thr Ser Thr Glu Pro Thr Thr Asp Tyr
1               5                   10                  15


<210> SEQ ID NO 86
<211> LENGTH: 13
<212> TYPE: PRT
<213> ORGANISM: Epstein-Barr virus
<220> FEATURE:
<221> NAME/KEY: PEPTIDE
<222> LOCATION: (1)..(13)
<223> OTHER INFORMATION: EBV BPLF1 Th

<400> SEQUENCE: 86

Lys Glu Leu Lys Arg Gln Tyr Glu Lys Lys Leu Arg Gln
1               5                   10


<210> SEQ ID NO 87
<211> LENGTH: 11
<212> TYPE: PRT
<213> ORGANISM: Epstein-Barr virus
<220> FEATURE:
<221> NAME/KEY: PEPTIDE
<222> LOCATION: (1)..(11)
<223> OTHER INFORMATION: EBV EBNA-2 Th

<400> SEQUENCE: 87

Thr Val Phe Tyr Asn Ile Pro Pro Met Pro Leu
1               5                   10


<210> SEQ ID NO 88
<211> LENGTH: 59
<212> TYPE: PRT
<213> ORGANISM: Homo sapiens
<220> FEATURE:
<221> NAME/KEY: PEPTIDE
<222> LOCATION: (1)..(39)
<223> OTHER INFORMATION: IgE-EMPD 1-39
<220> FEATURE:
<221> NAME/KEY: SITE
<222> LOCATION: (40)..(40)
<223> OTHER INFORMATION: epsilon K as a spacer
<220> FEATURE:
```

<221> NAME/KEY: PEPTIDE
<222> LOCATION: (41)..(59)
<223> OTHER INFORMATION: UBITh(R)1

<400> SEQUENCE: 88

Gly Leu Ala Gly Gly Ser Ala Gln Ser Gln Arg Ala Pro Asp Arg Val
1 5 10 15

Leu Cys His Ser Gly Gln Gln Gln Gly Leu Pro Arg Ala Ala Gly Gly
20 25 30

Ser Val Pro His Pro Arg Cys Lys Ile Ser Ile Thr Glu Ile Lys Gly
35 40 45

Val Ile Val His Arg Ile Glu Thr Ile Leu Phe
50 55

<210> SEQ ID NO 89
<211> LENGTH: 59
<212> TYPE: PRT
<213> ORGANISM: Homo sapiens
<220> FEATURE:
<221> NAME/KEY: PEPTIDE
<222> LOCATION: (1)..(19)
<223> OTHER INFORMATION: UBITh(R)1
<220> FEATURE:
<221> NAME/KEY: SITE
<222> LOCATION: (20)..(20)
<223> OTHER INFORMATION: epsilon K as a spacer
<220> FEATURE:
<221> NAME/KEY: PEPTIDE
<222> LOCATION: (21)..(59)
<223> OTHER INFORMATION: IgE-EMPD 1-39

<400> SEQUENCE: 89

Ile Ser Ile Thr Glu Ile Lys Gly Val Ile Val His Arg Ile Glu Thr
1 5 10 15

Ile Leu Phe Lys Gly Leu Ala Gly Gly Ser Ala Gln Ser Gln Arg Ala
20 25 30

Pro Asp Arg Val Leu Cys His Ser Gly Gln Gln Gln Gly Leu Pro Arg
35 40 45

Ala Ala Gly Gly Ser Val Pro His Pro Arg Cys
50 55

<210> SEQ ID NO 90
<211> LENGTH: 79
<212> TYPE: PRT
<213> ORGANISM: Homo sapiens
<220> FEATURE:
<221> NAME/KEY: PEPTIDE
<222> LOCATION: (1)..(19)
<223> OTHER INFORMATION: UBITh(R)1
<220> FEATURE:
<221> NAME/KEY: SITE
<222> LOCATION: (20)..(20)
<223> OTHER INFORMATION: epsilon K as a spacer
<220> FEATURE:
<221> NAME/KEY: PEPTIDE
<222> LOCATION: (21)..(59)
<223> OTHER INFORMATION: IgE-EMPD 1-39
<220> FEATURE:
<221> NAME/KEY: SITE
<222> LOCATION: (60)..(60)
<223> OTHER INFORMATION: epsilon K as a spacer
<220> FEATURE:
<221> NAME/KEY: PEPTIDE
<222> LOCATION: (61)..(79)
<223> OTHER INFORMATION: UBITh(R)1

<400> SEQUENCE: 90

Ile Ser Ile Thr Glu Ile Lys Gly Val Ile Val His Arg Ile Glu Thr

```
1               5                   10                  15

Ile Leu Phe Lys Gly Leu Ala Gly Gly Ser Ala Gln Ser Gln Arg Ala
            20                  25                  30

Pro Asp Arg Val Leu Cys His Ser Gly Gln Gln Gln Gly Leu Pro Arg
        35                  40                  45

Ala Ala Gly Gly Ser Val Pro His Pro Arg Cys Lys Ile Ser Ile Thr
    50                  55                  60

Glu Ile Lys Gly Val Ile Val His Arg Ile Glu Thr Ile Leu Phe
65                  70                  75


<210> SEQ ID NO 91
<211> LENGTH: 54
<212> TYPE: PRT
<213> ORGANISM: Homo sapiens
<220> FEATURE:
<221> NAME/KEY: PEPTIDE
<222> LOCATION: (1)..(34)
<223> OTHER INFORMATION: IgE-EMPD 7-40
<220> FEATURE:
<221> NAME/KEY: SITE
<222> LOCATION: (35)..(35)
<223> OTHER INFORMATION: epsilon K as a spacer
<220> FEATURE:
<221> NAME/KEY: PEPTIDE
<222> LOCATION: (36)..(54)
<223> OTHER INFORMATION: UBITh(R)1

<400> SEQUENCE: 91

Ala Gln Ser Gln Arg Ala Pro Asp Arg Val Leu Cys His Ser Gly Gln
1               5                   10                  15

Gln Gln Gly Leu Pro Arg Ala Ala Gly Gly Ser Val Pro His Pro Arg
            20                  25                  30

Cys His Lys Ile Ser Ile Thr Glu Ile Lys Gly Val Ile Val His Arg
        35                  40                  45

Ile Glu Thr Ile Leu Phe
    50


<210> SEQ ID NO 92
<211> LENGTH: 54
<212> TYPE: PRT
<213> ORGANISM: Homo sapiens
<220> FEATURE:
<221> NAME/KEY: PEPTIDE
<222> LOCATION: (1)..(19)
<223> OTHER INFORMATION: UBITh(R)1
<220> FEATURE:
<221> NAME/KEY: SITE
<222> LOCATION: (20)..(20)
<223> OTHER INFORMATION: epsilon K as a spacer
<220> FEATURE:
<221> NAME/KEY: PEPTIDE
<222> LOCATION: (21)..(54)
<223> OTHER INFORMATION: IgE-EMPD 7-40

<400> SEQUENCE: 92

Ile Ser Ile Thr Glu Ile Lys Gly Val Ile Val His Arg Ile Glu Thr
1               5                   10                  15

Ile Leu Phe Lys Ala Gln Ser Gln Arg Ala Pro Asp Arg Val Leu Cys
            20                  25                  30

His Ser Gly Gln Gln Gln Gly Leu Pro Arg Ala Ala Gly Gly Ser Val
        35                  40                  45

Pro His Pro Arg Cys His
    50
```

```
<210> SEQ ID NO 93
<211> LENGTH: 74
<212> TYPE: PRT
<213> ORGANISM: Homo sapiens
<220> FEATURE:
<221> NAME/KEY: PEPTIDE
<222> LOCATION: (1)..(19)
<223> OTHER INFORMATION: UBITh(R)1
<220> FEATURE:
<221> NAME/KEY: SITE
<222> LOCATION: (20)..(20)
<223> OTHER INFORMATION: epsilon K as a spacer
<220> FEATURE:
<221> NAME/KEY: PEPTIDE
<222> LOCATION: (21)..(54)
<223> OTHER INFORMATION: IgE-EMPD 7-40
<220> FEATURE:
<221> NAME/KEY: SITE
<222> LOCATION: (55)..(55)
<223> OTHER INFORMATION: epsilon K as a spacer
<220> FEATURE:
<221> NAME/KEY: PEPTIDE
<222> LOCATION: (56)..(74)
<223> OTHER INFORMATION: UBITh(R)1

<400> SEQUENCE: 93

Ile Ser Ile Thr Glu Ile Lys Gly Val Ile Val His Arg Ile Glu Thr
1               5                   10                  15

Ile Leu Phe Lys Ala Gln Ser Gln Arg Ala Pro Asp Arg Val Leu Cys
            20                  25                  30

His Ser Gly Gln Gln Gln Gly Leu Pro Arg Ala Ala Gly Gly Ser Val
        35                  40                  45

Pro His Pro Arg Cys His Lys Ile Ser Ile Thr Glu Ile Lys Gly Val
    50                  55                  60

Ile Val His Arg Ile Glu Thr Ile Leu Phe
65                  70


<210> SEQ ID NO 94
<211> LENGTH: 62
<212> TYPE: PRT
<213> ORGANISM: Homo sapiens
<220> FEATURE:
<221> NAME/KEY: PEPTIDE
<222> LOCATION: (1)..(19)
<223> OTHER INFORMATION: UBITh(R)1
<220> FEATURE:
<221> NAME/KEY: PEPTIDE
<222> LOCATION: (20)..(23)
<223> OTHER INFORMATION: epsilon K-KKK as a spacer
<220> FEATURE:
<221> NAME/KEY: SITE
<222> LOCATION: (20)..(20)
<223> OTHER INFORMATION: epsilon-K
<220> FEATURE:
<221> NAME/KEY: PEPTIDE
<222> LOCATION: (24)..(62)
<223> OTHER INFORMATION: IgE-EMPD 1-39

<400> SEQUENCE: 94

Ile Ser Ile Thr Glu Ile Lys Gly Val Ile Val His Arg Ile Glu Thr
1               5                   10                  15

Ile Leu Phe Lys Lys Lys Lys Gly Leu Ala Gly Gly Ser Ala Gln Ser
            20                  25                  30

Gln Arg Ala Pro Asp Arg Val Leu Cys His Ser Gly Gln Gln Gln Gly
        35                  40                  45

Leu Pro Arg Ala Ala Gly Gly Ser Val Pro His Pro Arg Cys
    50                  55                  60
```

<210> SEQ ID NO 95
<211> LENGTH: 61
<212> TYPE: PRT
<213> ORGANISM: Homo sapiens
<220> FEATURE:
<221> NAME/KEY: PEPTIDE
<222> LOCATION: (1)..(18)
<223> OTHER INFORMATION: UBITh(R)2
<220> FEATURE:
<221> NAME/KEY: PEPTIDE
<222> LOCATION: (19)..(22)
<223> OTHER INFORMATION: epsilon K-KKK as a spacer
<220> FEATURE:
<221> NAME/KEY: SITE
<222> LOCATION: (19)..(19)
<223> OTHER INFORMATION: epsilon-K
<220> FEATURE:
<221> NAME/KEY: PEPTIDE
<222> LOCATION: (23)..(61)
<223> OTHER INFORMATION: IgE-EMPD 1-39

<400> SEQUENCE: 95

```
Lys Lys Lys Ile Ile Thr Ile Thr Arg Ile Ile Thr Ile Ile Thr Thr
1               5                   10                  15

Ile Asp Lys Lys Lys Lys Gly Leu Ala Gly Gly Ser Ala Gln Ser Gln
            20                  25                  30

Arg Ala Pro Asp Arg Val Leu Cys His Ser Gly Gln Gln Gln Gly Leu
        35                  40                  45

Pro Arg Ala Ala Gly Gly Ser Val Pro His Pro Arg Cys
    50                  55                  60
```

<210> SEQ ID NO 96
<211> LENGTH: 40
<212> TYPE: PRT
<213> ORGANISM: Homo sapiens
<220> FEATURE:
<221> NAME/KEY: PEPTIDE
<222> LOCATION: (1)..(19)
<223> OTHER INFORMATION: UBITh(R)1
<220> FEATURE:
<221> NAME/KEY: PEPTIDE
<222> LOCATION: (20)..(23)
<223> OTHER INFORMATION: epsilon K-KKK as a spacer
<220> FEATURE:
<221> NAME/KEY: SITE
<222> LOCATION: (20)..(20)
<223> OTHER INFORMATION: epsilon-K
<220> FEATURE:
<221> NAME/KEY: PEPTIDE
<222> LOCATION: (24)..(40)
<223> OTHER INFORMATION: IgE-EMPD 1-17

<400> SEQUENCE: 96

```
Ile Ser Ile Thr Glu Ile Lys Gly Val Ile Val His Arg Ile Glu Thr
1               5                   10                  15

Ile Leu Phe Lys Lys Lys Lys Gly Leu Ala Gly Gly Ser Ala Gln Ser
            20                  25                  30

Gln Arg Ala Pro Asp Arg Val Leu
        35                  40
```

<210> SEQ ID NO 97
<211> LENGTH: 43
<212> TYPE: PRT
<213> ORGANISM: Homo sapiens
<220> FEATURE:
<221> NAME/KEY: PEPTIDE
<222> LOCATION: (1)..(19)
<223> OTHER INFORMATION: UBITh(R)1
<220> FEATURE:
<221> NAME/KEY: PEPTIDE
<222> LOCATION: (20)..(23)
<223> OTHER INFORMATION: epsilon K-KKK as a spacer
<220> FEATURE:
<221> NAME/KEY: SITE
<222> LOCATION: (20)..(20)
<223> OTHER INFORMATION: epsilon-K
<220> FEATURE:
<221> NAME/KEY: PEPTIDE
<222> LOCATION: (24)..(43)
<223> OTHER INFORMATION: IgE-EMPD 19-38

<400> SEQUENCE: 97

```
Ile Ser Ile Thr Glu Ile Lys Gly Val Ile Val His Arg Ile Glu Thr
1               5                   10                  15

Ile Leu Phe Lys Lys Lys Lys His Ser Gly Gln Gln Gln Gly Leu Pro
            20                  25                  30

Arg Ala Ala Gly Gly Ser Val Pro His Pro Arg
        35                  40
```

<210> SEQ ID NO 98
<211> LENGTH: 57
<212> TYPE: PRT
<213> ORGANISM: Homo sapiens
<220> FEATURE:
<221> NAME/KEY: PEPTIDE
<222> LOCATION: (1)..(17)
<223> OTHER INFORMATION: Clostridium tetani 1 Th
<220> FEATURE:
<221> NAME/KEY: SITE
<222> LOCATION: (18)..(18)
<223> OTHER INFORMATION: epsilon K as a spacer
<220> FEATURE:
<221> NAME/KEY: PEPTIDE
<222> LOCATION: (19)..(57)
<223> OTHER INFORMATION: IgE-EMPD 1-39

<400> SEQUENCE: 98

```
Lys Lys Gln Tyr Ile Lys Ala Asn Ser Lys Phe Ile Gly Ile Thr Glu
1               5                   10                  15

Leu Lys Gly Leu Ala Gly Gly Ser Ala Gln Ser Gln Arg Ala Pro Asp
            20                  25                  30

Arg Val Leu Cys His Ser Gly Gln Gln Gln Gly Leu Pro Arg Ala Ala
        35                  40                  45

Gly Gly Ser Val Pro His Pro Arg Cys
    50                  55
```

<210> SEQ ID NO 99
<211> LENGTH: 55
<212> TYPE: PRT
<213> ORGANISM: Homo sapiens
<220> FEATURE:
<221> NAME/KEY: PEPTIDE
<222> LOCATION: (1)..(15)
<223> OTHER INFORMATION: MvF1 Th
<220> FEATURE:
<221> NAME/KEY: SITE
<222> LOCATION: (16)..(16)
<223> OTHER INFORMATION: epsilon K as a spacer
<220> FEATURE:
<221> NAME/KEY: PEPTIDE
<222> LOCATION: (17)..(55)
<223> OTHER INFORMATION: IgE-EMPD 1-39

<400> SEQUENCE: 99

```
Leu Ser Glu Ile Lys Gly Val Ile Val His Arg Leu Glu Gly Val Lys
1               5                   10                  15

Gly Leu Ala Gly Gly Ser Ala Gln Ser Gln Arg Ala Pro Asp Arg Val
            20                  25                  30
```

```
Leu Cys His Ser Gly Gln Gln Gln Gly Leu Pro Arg Ala Ala Gly Gly
        35                  40                  45

Ser Val Pro His Pro Arg Cys
    50                  55
```

<210> SEQ ID NO 100
<211> LENGTH: 64
<212> TYPE: PRT
<213> ORGANISM: Homo sapiens
<220> FEATURE:
<221> NAME/KEY: PEPTIDE
<222> LOCATION: (1)..(24)
<223> OTHER INFORMATION: Bordetella pertussis Th
<220> FEATURE:
<221> NAME/KEY: SITE
<222> LOCATION: (25)..(25)
<223> OTHER INFORMATION: epsilon K as a spacer
<220> FEATURE:
<221> NAME/KEY: PEPTIDE
<222> LOCATION: (26)..(64)
<223> OTHER INFORMATION: IgE-EMPD 1-39

<400> SEQUENCE: 100

```
Gly Ala Tyr Ala Arg Cys Pro Asn Gly Thr Arg Ala Leu Thr Val Ala
1               5                   10                  15

Glu Leu Arg Gly Asn Ala Glu Leu Lys Gly Leu Ala Gly Gly Ser Ala
            20                  25                  30

Gln Ser Gln Arg Ala Pro Asp Arg Val Leu Cys His Ser Gly Gln Gln
        35                  40                  45

Gln Gly Leu Pro Arg Ala Ala Gly Gly Ser Val Pro His Pro Arg Cys
    50                  55                  60
```

<210> SEQ ID NO 101
<211> LENGTH: 57
<212> TYPE: PRT
<213> ORGANISM: Homo sapiens
<220> FEATURE:
<221> NAME/KEY: PEPTIDE
<222> LOCATION: (1)..(17)
<223> OTHER INFORMATION: Clostridium tetani 2 Th
<220> FEATURE:
<221> NAME/KEY: SITE
<222> LOCATION: (18)..(18)
<223> OTHER INFORMATION: epsilon K as a spacer
<220> FEATURE:
<221> NAME/KEY: PEPTIDE
<222> LOCATION: (19)..(57)
<223> OTHER INFORMATION: IgE-EMPD 1-39

<400> SEQUENCE: 101

```
Trp Val Arg Asp Ile Ile Asp Asp Phe Thr Asn Glu Ser Ser Gln Lys
1               5                   10                  15

Thr Lys Gly Leu Ala Gly Gly Ser Ala Gln Ser Gln Arg Ala Pro Asp
            20                  25                  30

Arg Val Leu Cys His Ser Gly Gln Gln Gln Gly Leu Pro Arg Ala Ala
        35                  40                  45

Gly Gly Ser Val Pro His Pro Arg Cys
    50                  55
```

<210> SEQ ID NO 102
<211> LENGTH: 63
<212> TYPE: PRT
<213> ORGANISM: Homo sapiens
<220> FEATURE:
<221> NAME/KEY: PEPTIDE
<222> LOCATION: (1)..(23)

<223> OTHER INFORMATION: Diphtheria Th
<220> FEATURE:
<221> NAME/KEY: SITE
<222> LOCATION: (24)..(24)
<223> OTHER INFORMATION: epsilon K as a spacer
<220> FEATURE:
<221> NAME/KEY: PEPTIDE
<222> LOCATION: (25)..(63)
<223> OTHER INFORMATION: IgE-EMPD 1-39

<400> SEQUENCE: 102

```
Asp Ser Glu Thr Ala Asp Asn Leu Glu Lys Thr Val Ala Ala Leu Ser
1               5                   10                  15

Ile Leu Pro Gly His Gly Cys Lys Gly Leu Ala Gly Gly Ser Ala Gln
            20                  25                  30

Ser Gln Arg Ala Pro Asp Arg Val Leu Cys His Ser Gly Gln Gln Gln
        35                  40                  45

Gly Leu Pro Arg Ala Ala Gly Gly Ser Val Pro His Pro Arg Cys
    50                  55                  60
```

<210> SEQ ID NO 103
<211> LENGTH: 61
<212> TYPE: PRT
<213> ORGANISM: Homo sapiens
<220> FEATURE:
<221> NAME/KEY: PEPTIDE
<222> LOCATION: (1)..(21)
<223> OTHER INFORMATION: Plasmodium falciparum Th
<220> FEATURE:
<221> NAME/KEY: SITE
<222> LOCATION: (22)..(22)
<223> OTHER INFORMATION: epsilon K as a spacer
<220> FEATURE:
<221> NAME/KEY: PEPTIDE
<222> LOCATION: (23)..(61)
<223> OTHER INFORMATION: IgE-EMPD 1-39

<400> SEQUENCE: 103

```
Asp His Glu Lys Lys His Ala Lys Met Glu Lys Ala Ser Ser Val Phe
1               5                   10                  15

Asn Val Val Asn Ser Lys Gly Leu Ala Gly Gly Ser Ala Gln Ser Gln
            20                  25                  30

Arg Ala Pro Asp Arg Val Leu Cys His Ser Gly Gln Gln Gln Gly Leu
        35                  40                  45

Pro Arg Ala Ala Gly Gly Ser Val Pro His Pro Arg Cys
    50                  55                  60
```

<210> SEQ ID NO 104
<211> LENGTH: 57
<212> TYPE: PRT
<213> ORGANISM: Homo sapiens
<220> FEATURE:
<221> NAME/KEY: PEPTIDE
<222> LOCATION: (1)..(17)
<223> OTHER INFORMATION: Schistosoma mansoni Th
<220> FEATURE:
<221> NAME/KEY: SITE
<222> LOCATION: (18)..(18)
<223> OTHER INFORMATION: epsilon K as a spacer
<220> FEATURE:
<221> NAME/KEY: PEPTIDE
<222> LOCATION: (19)..(57)
<223> OTHER INFORMATION: IgE-EMPD 1-39

<400> SEQUENCE: 104

```
Lys Trp Phe Lys Thr Asn Ala Pro Asn Gly Val Asp Glu Lys His Arg
1               5                   10                  15
```

```
His Lys Gly Leu Ala Gly Gly Ser Ala Gln Ser Gln Arg Ala Pro Asp
            20                  25                  30

Arg Val Leu Cys His Ser Gly Gln Gln Gln Gly Leu Pro Arg Ala Ala
        35                  40                  45

Gly Gly Ser Val Pro His Pro Arg Cys
    50                  55


<210> SEQ ID NO 105
<211> LENGTH: 65
<212> TYPE: PRT
<213> ORGANISM: Homo sapiens
<220> FEATURE:
<221> NAME/KEY: PEPTIDE
<222> LOCATION: (1)..(25)
<223> OTHER INFORMATION: Cholera Toxin Th
<220> FEATURE:
<221> NAME/KEY: SITE
<222> LOCATION: (26)..(26)
<223> OTHER INFORMATION: epsilon K as a spacer
<220> FEATURE:
<221> NAME/KEY: PEPTIDE
<222> LOCATION: (27)..(65)
<223> OTHER INFORMATION: IgE-EMPD 1-39

<400> SEQUENCE: 105

Ala Leu Asn Ile Trp Asp Arg Phe Asp Val Phe Cys Thr Leu Gly Ala
1               5                   10                  15

Thr Thr Gly Tyr Leu Lys Gly Asn Ser Lys Gly Leu Ala Gly Gly Ser
            20                  25                  30

Ala Gln Ser Gln Arg Ala Pro Asp Arg Val Leu Cys His Ser Gly Gln
        35                  40                  45

Gln Gln Gly Leu Pro Arg Ala Ala Gly Gly Ser Val Pro His Pro Arg
    50                  55                  60

Cys
65


<210> SEQ ID NO 106
<211> LENGTH: 55
<212> TYPE: PRT
<213> ORGANISM: Homo sapiens
<220> FEATURE:
<221> NAME/KEY: PEPTIDE
<222> LOCATION: (1)..(15)
<223> OTHER INFORMATION: MvF 2 Th
<220> FEATURE:
<221> NAME/KEY: SITE
<222> LOCATION: (16)..(16)
<223> OTHER INFORMATION: epsilon K as a spacer
<220> FEATURE:
<221> NAME/KEY: PEPTIDE
<222> LOCATION: (17)..(55)
<223> OTHER INFORMATION: IgE-EMPD 1-39

<400> SEQUENCE: 106

Ile Ser Glu Ile Lys Gly Val Ile Val His Lys Ile Glu Gly Ile Lys
1               5                   10                  15

Gly Leu Ala Gly Gly Ser Ala Gln Ser Gln Arg Ala Pro Asp Arg Val
            20                  25                  30

Leu Cys His Ser Gly Gln Gln Gln Gly Leu Pro Arg Ala Ala Gly Gly
        35                  40                  45

Ser Val Pro His Pro Arg Cys
    50                  55


<210> SEQ ID NO 107
<211> LENGTH: 62
```

<212> TYPE: PRT
<213> ORGANISM: Homo sapiens
<220> FEATURE:
<221> NAME/KEY: PEPTIDE
<222> LOCATION: (1)..(22)
<223> OTHER INFORMATION: KKKMvF 3 Th
<220> FEATURE:
<221> NAME/KEY: SITE
<222> LOCATION: (7)..(7)
<223> OTHER INFORMATION: S or T
<220> FEATURE:
<221> NAME/KEY: SITE
<222> LOCATION: (10)..(10)
<223> OTHER INFORMATION: K or R
<220> FEATURE:
<221> NAME/KEY: SITE
<222> LOCATION: (11)..(11)
<223> OTHER INFORMATION: G or T
<220> FEATURE:
<221> NAME/KEY: SITE
<222> LOCATION: (15)..(15)
<223> OTHER INFORMATION: H or T
<220> FEATURE:
<221> NAME/KEY: SITE
<222> LOCATION: (16)..(16)
<223> OTHER INFORMATION: K or R
<220> FEATURE:
<221> NAME/KEY: SITE
<222> LOCATION: (19)..(19)
<223> OTHER INFORMATION: G or T
<220> FEATURE:
<221> NAME/KEY: SITE
<222> LOCATION: (23)..(23)
<223> OTHER INFORMATION: epsilon K as a spacer
<220> FEATURE:
<221> NAME/KEY: PEPTIDE
<222> LOCATION: (24)..(62)
<223> OTHER INFORMATION: IgE-EMPD 1-39

<400> SEQUENCE: 107

```
Lys Lys Lys Ile Ser Ile Xaa Glu Ile Xaa Xaa Val Ile Val Xaa Xaa
1               5                   10                  15

Ile Glu Xaa Ile Leu Phe Lys Gly Leu Ala Gly Gly Ser Ala Gln Ser
            20                  25                  30

Gln Arg Ala Pro Asp Arg Val Leu Cys His Ser Gly Gln Gln Gln Gly
        35                  40                  45

Leu Pro Arg Ala Ala Gly Gly Ser Val Pro His Pro Arg Cys
    50                  55                  60
```

<210> SEQ ID NO 108
<211> LENGTH: 58
<212> TYPE: PRT
<213> ORGANISM: Homo sapiens
<220> FEATURE:
<221> NAME/KEY: PEPTIDE
<222> LOCATION: (1)..(18)
<223> OTHER INFORMATION: HBsAg 1 Th
<220> FEATURE:
<221> NAME/KEY: SITE
<222> LOCATION: (1)..(1)
<223> OTHER INFORMATION: K or R
<220> FEATURE:
<221> NAME/KEY: SITE
<222> LOCATION: (2)..(2)
<223> OTHER INFORMATION: K or R
<220> FEATURE:
<221> NAME/KEY: SITE
<222> LOCATION: (3)..(3)
<223> OTHER INFORMATION: K or R
<220> FEATURE:
<221> NAME/KEY: SITE
<222> LOCATION: (4)..(4)
<223> OTHER INFORMATION: L or I or V or F
<220> FEATURE:

<221> NAME/KEY: SITE
<222> LOCATION: (5)..(5)
<223> OTHER INFORMATION: F or K or R
<220> FEATURE:
<221> NAME/KEY: SITE
<222> LOCATION: (6)..(6)
<223> OTHER INFORMATION: L or I or V or F
<220> FEATURE:
<221> NAME/KEY: SITE
<222> LOCATION: (7)..(7)
<223> OTHER INFORMATION: L or I or V or F
<220> FEATURE:
<221> NAME/KEY: SITE
<222> LOCATION: (9)..(9)
<223> OTHER INFORMATION: K or R
<220> FEATURE:
<221> NAME/KEY: SITE
<222> LOCATION: (10)..(10)
<223> OTHER INFORMATION: L or I or V or F
<220> FEATURE:
<221> NAME/KEY: SITE
<222> LOCATION: (11)..(11)
<223> OTHER INFORMATION: L or I or V or F
<220> FEATURE:
<221> NAME/KEY: SITE
<222> LOCATION: (13)..(13)
<223> OTHER INFORMATION: L or I or V or F
<220> FEATURE:
<221> NAME/KEY: SITE
<222> LOCATION: (15)..(15)
<223> OTHER INFORMATION: Q or L or I or V or F
<220> FEATURE:
<221> NAME/KEY: SITE
<222> LOCATION: (17)..(17)
<223> OTHER INFORMATION: L or I or V or F
<220> FEATURE:
<221> NAME/KEY: SITE
<222> LOCATION: (18)..(18)
<223> OTHER INFORMATION: D or R
<220> FEATURE:
<221> NAME/KEY: SITE
<222> LOCATION: (19)..(19)
<223> OTHER INFORMATION: epsilon K as a spacer
<220> FEATURE:
<221> NAME/KEY: PEPTIDE
<222> LOCATION: (20)..(58)
<223> OTHER INFORMATION: IgE-EMPD 1-39

<400> SEQUENCE: 108

```
Xaa Xaa Xaa Xaa Xaa Xaa Xaa Thr Xaa Xaa Xaa Thr Xaa Pro Xaa Ser
1               5                   10                  15

Xaa Xaa Lys Gly Leu Ala Gly Gly Ser Ala Gln Ser Gln Arg Ala Pro
            20                  25                  30

Asp Arg Val Leu Cys His Ser Gly Gln Gln Gln Gly Leu Pro Arg Ala
        35                  40                  45

Ala Gly Gly Ser Val Pro His Pro Arg Cys
    50                  55
```

<210> SEQ ID NO 109
<211> LENGTH: 59
<212> TYPE: PRT
<213> ORGANISM: Homo sapiens
<220> FEATURE:
<221> NAME/KEY: PEPTIDE
<222> LOCATION: (1)..(19)
<223> OTHER INFORMATION: MvF 4 Th
<220> FEATURE:
<221> NAME/KEY: SITE
<222> LOCATION: (4)..(4)
<223> OTHER INFORMATION: S or T
<220> FEATURE:
<221> NAME/KEY: SITE
<222> LOCATION: (7)..(7)
<223> OTHER INFORMATION: K or R
<220> FEATURE:
<221> NAME/KEY: SITE
<222> LOCATION: (8)..(8)
<223> OTHER INFORMATION: G or T
<220> FEATURE:
<221> NAME/KEY: SITE
<222> LOCATION: (12)..(12)
<223> OTHER INFORMATION: H or T
<220> FEATURE:
<221> NAME/KEY: SITE
<222> LOCATION: (13)..(13)
<223> OTHER INFORMATION: K or R
<220> FEATURE:
<221> NAME/KEY: SITE
<222> LOCATION: (20)..(20)
<223> OTHER INFORMATION: epsilon K as a spacer
<220> FEATURE:
<221> NAME/KEY: PEPTIDE
<222> LOCATION: (21)..(59)
<223> OTHER INFORMATION: IgE-EMPD 1-39

<400> SEQUENCE: 109

```
Ile Ser Ile Xaa Glu Ile Xaa Xaa Val Ile Val Xaa Xaa Ile Glu Thr
1               5                   10                  15

Ile Leu Phe Lys Gly Leu Ala Gly Gly Ser Ala Gln Ser Gln Arg Ala
            20                  25                  30

Pro Asp Arg Val Leu Cys His Ser Gly Gln Gln Gln Gly Leu Pro Arg
        35                  40                  45

Ala Ala Gly Gly Ser Val Pro His Pro Arg Cys
    50                  55
```

<210> SEQ ID NO 110
<211> LENGTH: 58
<212> TYPE: PRT
<213> ORGANISM: Homo sapiens
<220> FEATURE:
<221> NAME/KEY: PEPTIDE
<222> LOCATION: (1)..(18)
<223> OTHER INFORMATION: HBsAg 2 Th
<220> FEATURE:
<221> NAME/KEY: SITE
<222> LOCATION: (4)..(4)
<223> OTHER INFORMATION: I or F
<220> FEATURE:
<221> NAME/KEY: SITE
<222> LOCATION: (5)..(5)
<223> OTHER INFORMATION: I or F
<220> FEATURE:
<221> NAME/KEY: SITE
<222> LOCATION: (6)..(6)
<223> OTHER INFORMATION: T or L
<220> FEATURE:
<221> NAME/KEY: SITE
<222> LOCATION: (7)..(7)
<223> OTHER INFORMATION: I or L
<220> FEATURE:
<221> NAME/KEY: SITE
<222> LOCATION: (11)..(11)
<223> OTHER INFORMATION: I or L
<220> FEATURE:
<221> NAME/KEY: SITE
<222> LOCATION: (14)..(14)
<223> OTHER INFORMATION: P or I
<220> FEATURE:
<221> NAME/KEY: SITE
<222> LOCATION: (15)..(15)
<223> OTHER INFORMATION: Q or T
<220> FEATURE:
<221> NAME/KEY: SITE
<222> LOCATION: (16)..(16)
<223> OTHER INFORMATION: S or T
<220> FEATURE:
<221> NAME/KEY: SITE
<222> LOCATION: (17)..(17)

<223> OTHER INFORMATION: L or I
<220> FEATURE:
<221> NAME/KEY: SITE
<222> LOCATION: (19)..(19)
<223> OTHER INFORMATION: epsilon K as a spacer
<220> FEATURE:
<221> NAME/KEY: PEPTIDE
<222> LOCATION: (20)..(58)
<223> OTHER INFORMATION: IgE-EMPD 1-39

<400> SEQUENCE: 110

Lys Lys Lys Xaa Xaa Xaa Xaa Thr Arg Ile Xaa Thr Ile Xaa Xaa Xaa
1 5 10 15

Xaa Asp Lys Gly Leu Ala Gly Gly Ser Ala Gln Ser Gln Arg Ala Pro
20 25 30

Asp Arg Val Leu Cys His Ser Gly Gln Gln Gln Gly Leu Pro Arg Ala
35 40 45

Ala Gly Gly Ser Val Pro His Pro Arg Cys
50 55

<210> SEQ ID NO 111
<211> LENGTH: 51
<212> TYPE: PRT
<213> ORGANISM: Homo sapiens
<220> FEATURE:
<221> NAME/KEY: PEPTIDE
<222> LOCATION: (1)..(11)
<223> OTHER INFORMATION: Influenza MP1_1 Th
<220> FEATURE:
<221> NAME/KEY: SITE
<222> LOCATION: (12)..(12)
<223> OTHER INFORMATION: epsilon K as a spacer
<220> FEATURE:
<221> NAME/KEY: PEPTIDE
<222> LOCATION: (13)..(51)
<223> OTHER INFORMATION: IgE-EMPD 1-39

<400> SEQUENCE: 111

Phe Val Phe Thr Leu Thr Val Pro Ser Glu Arg Lys Gly Leu Ala Gly
1 5 10 15

Gly Ser Ala Gln Ser Gln Arg Ala Pro Asp Arg Val Leu Cys His Ser
20 25 30

Gly Gln Gln Gln Gly Leu Pro Arg Ala Ala Gly Gly Ser Val Pro His
35 40 45

Pro Arg Cys
50

<210> SEQ ID NO 112
<211> LENGTH: 55
<212> TYPE: PRT
<213> ORGANISM: Homo sapiens
<220> FEATURE:
<221> NAME/KEY: PEPTIDE
<222> LOCATION: (1)..(15)
<223> OTHER INFORMATION: Influenza MP1_2 Th
<220> FEATURE:
<221> NAME/KEY: SITE
<222> LOCATION: (16)..(16)
<223> OTHER INFORMATION: epsilon K as a spacer
<220> FEATURE:
<221> NAME/KEY: PEPTIDE
<222> LOCATION: (17)..(55)
<223> OTHER INFORMATION: IgE-EMPD 1-39

<400> SEQUENCE: 112

Ser Gly Pro Leu Lys Ala Glu Ile Ala Gln Arg Leu Glu Asp Val Lys
1 5 10 15

Gly Leu Ala Gly Gly Ser Ala Gln Ser Gln Arg Ala Pro Asp Arg Val
20 25 30

Leu Cys His Ser Gly Gln Gln Gln Gly Leu Pro Arg Ala Ala Gly Gly
35 40 45

Ser Val Pro His Pro Arg Cys
50 55

<210> SEQ ID NO 113
<211> LENGTH: 49
<212> TYPE: PRT
<213> ORGANISM: Homo sapiens
<220> FEATURE:
<221> NAME/KEY: PEPTIDE
<222> LOCATION: (1)..(9)
<223> OTHER INFORMATION: Influenza NSP1 Th
<220> FEATURE:
<221> NAME/KEY: SITE
<222> LOCATION: (10)..(10)
<223> OTHER INFORMATION: epsilon K as a spacer
<220> FEATURE:
<221> NAME/KEY: PEPTIDE
<222> LOCATION: (11)..(49)
<223> OTHER INFORMATION: IgE-EMPD 1-39

<400> SEQUENCE: 113

Asp Arg Leu Arg Arg Asp Gln Lys Ser Lys Gly Leu Ala Gly Gly Ser
1 5 10 15

Ala Gln Ser Gln Arg Ala Pro Asp Arg Val Leu Cys His Ser Gly Gln
20 25 30

Gln Gln Gly Leu Pro Arg Ala Ala Gly Gly Ser Val Pro His Pro Arg
35 40 45

Cys

<210> SEQ ID NO 114
<211> LENGTH: 59
<212> TYPE: PRT
<213> ORGANISM: Homo sapiens
<220> FEATURE:
<221> NAME/KEY: PEPTIDE
<222> LOCATION: (1)..(19)
<223> OTHER INFORMATION: EBV BHRF1 Th
<220> FEATURE:
<221> NAME/KEY: SITE
<222> LOCATION: (20)..(20)
<223> OTHER INFORMATION: epsilon K as a spacer
<220> FEATURE:
<221> NAME/KEY: PEPTIDE
<222> LOCATION: (21)..(59)
<223> OTHER INFORMATION: IgE-EMPD 1-39

<400> SEQUENCE: 114

Ala Gly Leu Thr Leu Ser Leu Leu Val Ile Cys Ser Tyr Leu Phe Ile
1 5 10 15

Ser Arg Gly Lys Gly Leu Ala Gly Gly Ser Ala Gln Ser Gln Arg Ala
20 25 30

Pro Asp Arg Val Leu Cys His Ser Gly Gln Gln Gln Gly Leu Pro Arg
35 40 45

Ala Ala Gly Gly Ser Val Pro His Pro Arg Cys
50 55

<210> SEQ ID NO 115
<211> LENGTH: 55
<212> TYPE: PRT
<213> ORGANISM: Homo sapiens
<220> FEATURE:
<221> NAME/KEY: PEPTIDE
<222> LOCATION: (1)..(15)
<223> OTHER INFORMATION: Clostridium tetani TT1 Th
<220> FEATURE:
<221> NAME/KEY: SITE
<222> LOCATION: (16)..(16)
<223> OTHER INFORMATION: epsilon K as a spacer
<220> FEATURE:
<221> NAME/KEY: PEPTIDE
<222> LOCATION: (17)..(55)
<223> OTHER INFORMATION: IgE-EMPD 1-39

<400> SEQUENCE: 115

Gln Tyr Ile Lys Ala Asn Ser Lys Phe Ile Gly Ile Thr Glu Leu Lys
1               5                   10                  15

Gly Leu Ala Gly Gly Ser Ala Gln Ser Gln Arg Ala Pro Asp Arg Val
            20                  25                  30

Leu Cys His Ser Gly Gln Gln Gln Gly Leu Pro Arg Ala Ala Gly Gly
        35                  40                  45

Ser Val Pro His Pro Arg Cys
    50                  55

<210> SEQ ID NO 116
<211> LENGTH: 60
<212> TYPE: PRT
<213> ORGANISM: Homo sapiens
<220> FEATURE:
<221> NAME/KEY: PEPTIDE
<222> LOCATION: (1)..(20)
<223> OTHER INFORMATION: EBV EBNA-1 Th
<220> FEATURE:
<221> NAME/KEY: SITE
<222> LOCATION: (21)..(21)
<223> OTHER INFORMATION: epsilon K as a spacer
<220> FEATURE:
<221> NAME/KEY: PEPTIDE
<222> LOCATION: (22)..(60)
<223> OTHER INFORMATION: IgE-EMPD 1-39

<400> SEQUENCE: 116

Pro Gly Pro Leu Arg Glu Ser Ile Val Cys Tyr Phe Met Val Phe Leu
1               5                   10                  15

Gln Thr His Ile Lys Gly Leu Ala Gly Gly Ser Ala Gln Ser Gln Arg
            20                  25                  30

Ala Pro Asp Arg Val Leu Cys His Ser Gly Gln Gln Gln Gly Leu Pro
        35                  40                  45

Arg Ala Ala Gly Gly Ser Val Pro His Pro Arg Cys
    50                  55                  60

<210> SEQ ID NO 117
<211> LENGTH: 61
<212> TYPE: PRT
<213> ORGANISM: Homo sapiens
<220> FEATURE:
<221> NAME/KEY: PEPTIDE
<222> LOCATION: (1)..(21)
<223> OTHER INFORMATION: Clostridium tetani TT2 Th
<220> FEATURE:
<221> NAME/KEY: SITE
<222> LOCATION: (22)..(22)
<223> OTHER INFORMATION: epsilon K as a spacer
<220> FEATURE:
<221> NAME/KEY: PEPTIDE
<222> LOCATION: (23)..(61)
<223> OTHER INFORMATION: IgE-EMPD 1-39

<400> SEQUENCE: 117

Phe Asn Asn Phe Thr Val Ser Phe Trp Leu Arg Val Pro Lys Val Ser
1               5                   10                  15

Ala Ser His Leu Glu Lys Gly Leu Ala Gly Gly Ser Ala Gln Ser Gln
20 25 30

Arg Ala Pro Asp Arg Val Leu Cys His Ser Gly Gln Gln Gln Gly Leu
35 40 45

Pro Arg Ala Ala Gly Gly Ser Val Pro His Pro Arg Cys
50 55 60

<210> SEQ ID NO 118
<211> LENGTH: 56
<212> TYPE: PRT
<213> ORGANISM: Homo sapiens
<220> FEATURE:
<221> NAME/KEY: PEPTIDE
<222> LOCATION: (1)..(16)
<223> OTHER INFORMATION: Clostridium tetani TT3 Th
<220> FEATURE:
<221> NAME/KEY: SITE
<222> LOCATION: (17)..(17)
<223> OTHER INFORMATION: epsilon K as a spacer
<220> FEATURE:
<221> NAME/KEY: PEPTIDE
<222> LOCATION: (18)..(56)
<223> OTHER INFORMATION: IgE-EMPD 1-39

<400> SEQUENCE: 118

Lys Phe Ile Ile Lys Arg Tyr Thr Pro Asn Asn Glu Ile Asp Ser Phe
1 5 10 15

Lys Gly Leu Ala Gly Gly Ser Ala Gln Ser Gln Arg Ala Pro Asp Arg
20 25 30

Val Leu Cys His Ser Gly Gln Gln Gln Gly Leu Pro Arg Ala Ala Gly
35 40 45

Gly Ser Val Pro His Pro Arg Cys
50 55

<210> SEQ ID NO 119
<211> LENGTH: 56
<212> TYPE: PRT
<213> ORGANISM: Homo sapiens
<220> FEATURE:
<221> NAME/KEY: PEPTIDE
<222> LOCATION: (1)..(16)
<223> OTHER INFORMATION: Clostridium tetani TT4 Th
<220> FEATURE:
<221> NAME/KEY: SITE
<222> LOCATION: (17)..(17)
<223> OTHER INFORMATION: epsilon K as a spacer
<220> FEATURE:
<221> NAME/KEY: PEPTIDE
<222> LOCATION: (18)..(56)
<223> OTHER INFORMATION: IgE-EMPD 1-39

<400> SEQUENCE: 119

Val Ser Ile Asp Lys Phe Arg Ile Phe Cys Lys Ala Leu Asn Pro Lys
1 5 10 15

Lys Gly Leu Ala Gly Gly Ser Ala Gln Ser Gln Arg Ala Pro Asp Arg
20 25 30

Val Leu Cys His Ser Gly Gln Gln Gln Gly Leu Pro Arg Ala Ala Gly
35 40 45

Gly Ser Val Pro His Pro Arg Cys
50 55

<210> SEQ ID NO 120
<211> LENGTH: 58
<212> TYPE: PRT
<213> ORGANISM: Homo sapiens
<220> FEATURE:
<221> NAME/KEY: PEPTIDE
<222> LOCATION: (1)..(18)
<223> OTHER INFORMATION: EBV CP Th
<220> FEATURE:
<221> NAME/KEY: SITE
<222> LOCATION: (19)..(19)
<223> OTHER INFORMATION: epsilon K as a spacer
<220> FEATURE:
<221> NAME/KEY: PEPTIDE
<222> LOCATION: (20)..(58)
<223> OTHER INFORMATION: IgE-EMPD 1-39

<400> SEQUENCE: 120

```
Val Pro Gly Leu Tyr Ser Pro Cys Arg Ala Phe Phe Asn Lys Glu Glu
1               5                   10                  15

Leu Leu Lys Gly Leu Ala Gly Gly Ser Ala Gln Ser Gln Arg Ala Pro
            20                  25                  30

Asp Arg Val Leu Cys His Ser Gly Gln Gln Gln Gly Leu Pro Arg Ala
        35                  40                  45

Ala Gly Gly Ser Val Pro His Pro Arg Cys
    50                  55
```

<210> SEQ ID NO 121
<211> LENGTH: 54
<212> TYPE: PRT
<213> ORGANISM: Homo sapiens
<220> FEATURE:
<221> NAME/KEY: PEPTIDE
<222> LOCATION: (1)..(14)
<223> OTHER INFORMATION: HCMV IE1 Th
<220> FEATURE:
<221> NAME/KEY: SITE
<222> LOCATION: (15)..(15)
<223> OTHER INFORMATION: epsilon K as a spacer
<220> FEATURE:
<221> NAME/KEY: PEPTIDE
<222> LOCATION: (16)..(54)
<223> OTHER INFORMATION: IgE-EMPD 1-39

<400> SEQUENCE: 121

```
Asp Lys Arg Glu Met Trp Met Ala Cys Ile Lys Glu Leu His Lys Gly
1               5                   10                  15

Leu Ala Gly Gly Ser Ala Gln Ser Gln Arg Ala Pro Asp Arg Val Leu
            20                  25                  30

Cys His Ser Gly Gln Gln Gln Gly Leu Pro Arg Ala Ala Gly Gly Ser
        35                  40                  45

Val Pro His Pro Arg Cys
    50
```

<210> SEQ ID NO 122
<211> LENGTH: 55
<212> TYPE: PRT
<213> ORGANISM: Homo sapiens
<220> FEATURE:
<221> NAME/KEY: PEPTIDE
<222> LOCATION: (1)..(15)
<223> OTHER INFORMATION: EBV GP340 Th
<220> FEATURE:
<221> NAME/KEY: SITE
<222> LOCATION: (16)..(16)
<223> OTHER INFORMATION: epsilon K as a spacer
<220> FEATURE:
<221> NAME/KEY: PEPTIDE
<222> LOCATION: (17)..(55)
<223> OTHER INFORMATION: IgE-EMPD 1-39

<400> SEQUENCE: 122

Thr Gly His Gly Ala Arg Thr Ser Thr Glu Pro Thr Thr Asp Tyr Lys
1 5 10 15

Gly Leu Ala Gly Gly Ser Ala Gln Ser Gln Arg Ala Pro Asp Arg Val
20 25 30

Leu Cys His Ser Gly Gln Gln Gln Gly Leu Pro Arg Ala Ala Gly Gly
35 40 45

Ser Val Pro His Pro Arg Cys
50 55

<210> SEQ ID NO 123
<211> LENGTH: 53
<212> TYPE: PRT
<213> ORGANISM: Homo sapiens
<220> FEATURE:
<221> NAME/KEY: PEPTIDE
<222> LOCATION: (1)..(13)
<223> OTHER INFORMATION: EBV BPLF1 Th
<220> FEATURE:
<221> NAME/KEY: PEPTIDE
<222> LOCATION: (14)..(14)
<223> OTHER INFORMATION: epsilon K as a spacer
<220> FEATURE:
<221> NAME/KEY: PEPTIDE
<222> LOCATION: (15)..(53)
<223> OTHER INFORMATION: IgE-EMPD 1-39

<400> SEQUENCE: 123

Lys Glu Leu Lys Arg Gln Tyr Glu Lys Lys Leu Arg Gln Lys Gly Leu
1 5 10 15

Ala Gly Gly Ser Ala Gln Ser Gln Arg Ala Pro Asp Arg Val Leu Cys
20 25 30

His Ser Gly Gln Gln Gln Gly Leu Pro Arg Ala Ala Gly Gly Ser Val
35 40 45

Pro His Pro Arg Cys
50

<210> SEQ ID NO 124
<211> LENGTH: 51
<212> TYPE: PRT
<213> ORGANISM: Homo sapiens
<220> FEATURE:
<221> NAME/KEY: PEPTIDE
<222> LOCATION: (1)..(11)
<223> OTHER INFORMATION: EBV EBNA-2 Th
<220> FEATURE:
<221> NAME/KEY: SITE
<222> LOCATION: (12)..(12)
<223> OTHER INFORMATION: epsilon K as a spacer
<220> FEATURE:
<221> NAME/KEY: PEPTIDE
<222> LOCATION: (13)..(51)
<223> OTHER INFORMATION: IgE-EMPD 1-39

<400> SEQUENCE: 124

Thr Val Phe Tyr Asn Ile Pro Pro Met Pro Leu Lys Gly Leu Ala Gly
1 5 10 15

Gly Ser Ala Gln Ser Gln Arg Ala Pro Asp Arg Val Leu Cys His Ser
20 25 30

Gly Gln Gln Gln Gly Leu Pro Arg Ala Ala Gly Gly Ser Val Pro His
35 40 45

Pro Arg Cys
50

<210> SEQ ID NO 125
<211> LENGTH: 74

<212> TYPE: PRT
<213> ORGANISM: Macaca fascicularis
<220> FEATURE:
<221> NAME/KEY: PEPTIDE
<222> LOCATION: (1)..(19)
<223> OTHER INFORMATION: UBITh(R)1
<220> FEATURE:
<221> NAME/KEY: SITE
<222> LOCATION: (20)..(20)
<223> OTHER INFORMATION: epsilon K as a spacer
<220> FEATURE:
<221> NAME/KEY: PEPTIDE
<222> LOCATION: (21)..(54)
<223> OTHER INFORMATION: IgE-EMPD 7-40 (Macaca fascicularis)
<220> FEATURE:
<221> NAME/KEY: SITE
<222> LOCATION: (55)..(55)
<223> OTHER INFORMATION: epsilon K as a spacer
<220> FEATURE:
<221> NAME/KEY: PEPTIDE
<222> LOCATION: (56)..(74)
<223> OTHER INFORMATION: UBITh(R)1

<400> SEQUENCE: 125

```
Ile Ser Ile Thr Glu Ile Lys Gly Val Ile Val His Arg Ile Glu Thr
1               5                   10                  15

Ile Leu Phe Lys Ala Gln Ser Gln Arg Ala Pro Asp Arg Val Leu Cys
            20                  25                  30

His Ser Glu Gln Gln Gln Gly Leu Pro Arg Ala Ala Arg Gly Ser Val
        35                  40                  45

Pro Asp His Arg Cys His Lys Ile Ser Ile Thr Glu Ile Lys Gly Val
    50                  55                  60

Ile Val His Arg Ile Glu Thr Ile Leu Phe
65                  70
```

<210> SEQ ID NO 126
<211> LENGTH: 59
<212> TYPE: PRT
<213> ORGANISM: Macaca fascicularis
<220> FEATURE:
<221> NAME/KEY: PEPTIDE
<222> LOCATION: (1)..(39)
<223> OTHER INFORMATION: IgE-EMPD 1-39 (Macaca fascicularis)
<220> FEATURE:
<221> NAME/KEY: SITE
<222> LOCATION: (40)..(40)
<223> OTHER INFORMATION: epsilon K as a spacer
<220> FEATURE:
<221> NAME/KEY: PEPTIDE
<222> LOCATION: (41)..(59)
<223> OTHER INFORMATION: UBITh(R)1

<400> SEQUENCE: 126

```
Gly Leu Ala Gly Gly Ser Ala Gln Ser Gln Arg Ala Pro Asp Arg Val
1               5                   10                  15

Leu Cys His Ser Glu Gln Gln Gln Gly Leu Pro Arg Ala Ala Arg Gly
            20                  25                  30

Ser Val Pro Asp His Arg Cys Lys Ile Ser Ile Thr Glu Ile Lys Gly
        35                  40                  45

Val Ile Val His Arg Ile Glu Thr Ile Leu Phe
    50                  55
```

<210> SEQ ID NO 127
<211> LENGTH: 52
<212> TYPE: PRT
<213> ORGANISM: Macaca fascicularis
<220> FEATURE:
<221> NAME/KEY: PEPTIDE
<222> LOCATION: (1)..(52)
<223> OTHER INFORMATION: IgE-EMPD 1-52 (Macaca fascicularis)

<400> SEQUENCE: 127

Gly Leu Ala Gly Gly Ser Ala Gln Ser Gln Arg Ala Pro Asp Arg Val
1 5 10 15

Leu Cys His Ser Glu Gln Gln Gln Gly Leu Pro Arg Ala Ala Arg Gly
20 25 30

Ser Val Pro Asp His Arg Cys His Cys Gly Ala Gly Arg Ala Asp Trp
35 40 45

Pro Gly Leu Pro
50

<210> SEQ ID NO 128
<211> LENGTH: 6
<212> TYPE: PRT
<213> ORGANISM: Homo sapiens
<220> FEATURE:
<221> NAME/KEY: PEPTIDE
<222> LOCATION: (1)..(6)
<223> OTHER INFORMATION: Spacer 1
<220> FEATURE:
<221> NAME/KEY: SITE
<222> LOCATION: (3)..(3)
<223> OTHER INFORMATION: Any amino acid
<220> FEATURE:
<221> NAME/KEY: SITE
<222> LOCATION: (5)..(5)
<223> OTHER INFORMATION: Any amino acid

<400> SEQUENCE: 128

Pro Pro Xaa Pro Xaa Pro
1 5

<210> SEQ ID NO 129
<211> LENGTH: 4
<212> TYPE: PRT
<213> ORGANISM: Homo sapiens
<220> FEATURE:
<221> NAME/KEY: PEPTIDE
<222> LOCATION: (1)..(4)
<223> OTHER INFORMATION: Spacer 2
<220> FEATURE:
<221> NAME/KEY: SITE
<222> LOCATION: (1)..(1)
<223> OTHER INFORMATION: epsilon K

<400> SEQUENCE: 129

Lys Lys Lys Lys
1

<210> SEQ ID NO 130
<211> LENGTH: 58
<212> TYPE: PRT
<213> ORGANISM: Artificial Sequence
<220> FEATURE:
<223> OTHER INFORMATION: Synthetic Peptide
<220> FEATURE:
<221> NAME/KEY: SITE
<222> LOCATION: (1)..(19)
<223> OTHER INFORMATION: UBITh(R)2
<220> FEATURE:
<221> NAME/KEY: SITE
<222> LOCATION: (20)..(20)
<223> OTHER INFORMATION: epsilon K as a spacer -continued

```
<220> FEATURE:
<221> NAME/KEY: SITE
<222> LOCATION: (21)..(58)
<223> OTHER INFORMATION: IgEEMPD 1-39

<400> SEQUENCE: 130

Lys Lys Lys Ile Ile Thr Ile Thr Arg Ile Ile Thr Ile Ile Thr Thr
1               5                   10                  15

Ile Asp Lys Gly Leu Ala Gly Gly Ser Ala Gln Ser Gln Arg Ala Pro
            20                  25                  30

Asp Arg Val Leu Cys His Ser Gly Gln Gln Gln Gly Leu Pro Arg Ala
        35                  40                  45

Ala Gly Gly Ser Val Pro His Pro Arg Cys
    50                  55
```

PEPTIDE IMMUNOGENS AND FORMULATIONS THEREOF TARGETING MEMBRANE-BOUND IgE FOR TREATMENT OF IgE MEDIATED ALLERGIC DISEASES

This application is a national phase entry under 35 U.S.C. § 371 of International Application Number PCT/US2017/069174, filed Dec. 31, 2017, entitled "PEPTIDE IMMUNOGENS AND FORMULATIONS THEREOF TARGETING MEMBRANE-BOUND IgE FOR TREATMENT OF IgE MEDIATED ALLERGIC DISEASES", which is hereby incorporated by reference in its entirety.

FIELD OF THE INVENTION

This disclosure relates to peptide immunogen constructs targeting the extracellular membrane-proximal domain of membrane-bound IgE (or IgE EMPD) and formulations thereof as a universal vaccine for the treatment and/or prevention of IgE-mediated allergic diseases.

BACKGROUND OF THE INVENTION

Allergies, also known as Immunoglobulin E (IgE) mediated allergic diseases, are a number of conditions caused by hypersensitivity of the immune system to something in the environment that usually causes little or no problem in most people. These diseases include drug-, food-, and insect-allergy, allergic rhinitis (hay fever), atopic dermatitis, allergic asthma, conjunctivitis, eczema, urticaria (hives), and anaphylaxis (website: en.wikipedia.org/wiki/Allergy). Diverse symptoms are often attributed to allergies and may include red eyes, an itchy rash, sneezing, a runny nose, shortness of breath, or swelling.

The prevalence of allergic disease is increasing. At the beginning of the 20th century, allergy was viewed as a rare disease. However, since then, several factors have triggered a dramatic increase in the prevalence of allergic diseases. Respiratory manifestations are the most prevalent, affecting up to 30% of the general population. According to statistics from the World Health Organization (WHO), hundreds of millions of people in the world have rhinitis and it is estimated that 235 million people have asthma (World Health Organization (2011) WHO Media Center, Asthma Fact Sheet No. 307). The societal cost of allergic diseases is considerable, mainly because of the high prevalence of allergic rhinoconjunctivitis and the associated loss of productivity. A Swedish study estimated the cost of lost productivity caused by rhinitis at EUR 2.7 billion per year in Sweden alone, and an American study established rhinitis as the most costly disease for American employers (Larsen J N, et al., 2016).

An allergic reaction is an abnormally vigorous immune response in which the immune system fights off a perceived threat from a type of antigen, an allergen, that would otherwise be harmless to the body (website: en.wikipedia.org/wiki/Allergen). Specifically, an allergen is an antigen capable of stimulating a type-I hypersensitivity reaction in atopic individuals through IgE responses. Allergens can be found in a variety of sources, such as dust mite excretion, pollen, pet dander, certain foods, or chemical/physical irritants. Food allergies are not as common as food sensitivity, but some foods such as peanuts (a legume), nuts, seafood and shellfish are the cause of serious allergies in many people.

Allergy is a systemic immunological disease initiated by the priming of an adaptive immune response to common allergens. IgE plays a central role in mediating type-I hypersensitivity reactions that are responsible for causing IgE mediated allergic diseases. IgE mediated allergic diseases are characterized by the presence of allergen-specific IgE antibodies and eosinophilic inflammation. The allergic reaction is biphasic, with an immediate reaction occurring within minutes following allergen exposure and a late-phase reaction occurring hours later. The immediate reaction is caused by release of preformed mediators (e.g., histamine, proteases, chemokines, heparin) from basophils and mast cells upon cross-linking of IgE bound to high-affinity receptors on the cell surface. The late-phase allergic reaction is caused by mobilization and attraction of inflammatory cells, such as eosinophils, basophils, neutrophils, and mononuclear cells.

Allergens result in elevated levels of serum total free Immunoglobulin E (IgE) and allergen-specific IgE in allergy-prone individuals. Allergen-specific IgE-mediated type-I hypersensitivity is central to the pathogenesis of IgE mediated allergic diseases (FIG. 1). IgE sensitizes mast cells and basophils by binding to the high affinity receptor IgE receptor, FcεRI, on the surface of those effector cells. Binding of antigens to IgE that is already bound to the FcεRI on mast cells causes cross-linking of the bound IgE and the aggregation of the underlying FcεRI. The cross-linked receptors initiate a signal transduction cascade and rapid degranulation. The mast cells and basophils release stored histamine, followed by the synthesis and release of bradykinin, prostaglandins, leukotrienes, cytokines and other inflammatory mediators. These further attract and activate inflammatory cells that produce the symptoms of allergy and up-regulate the biosynthesis of IgE by B cells to promote heightened sensitivity. IgE-FcεRI interactions and the degranulation event are central to type I allergic reactions and to the development of atopic asthma.

Like other immunoglobulin isotypes, IgE is found in 2 forms, a secreted serum immunoglobulin form and a membrane-bound form (mIgE). Studies on the gene segments encoding the membrane-anchoring peptide of mouse and human mIgEs show that the difference between mIgE and secreted IgE is that mIgE contains three extra regions: (1) a central conserved stretch of 25 hydrophobic, uncharged amino acid residues, which spans the plasma membrane; (2) a C-terminal cytoplasmic tail; and (3) an N-terminal extracellular portion of the membrane-anchoring segment of mIgE. In human, the epsilon-chain of mIgE on the surface of B lymphocytes is present as both short and long isoforms. The short isoform contains 15 amino acids in the extracellular membrane proximal domain of mIgE, referred to as the IgE EMPD, whereas the long isoform contains an additional segment of 52 amino acid residues, for a total of 67 amino acids in the EMPD. These two isoforms are generated as a consequence of alternative splicing between a donor site at the 3' end of the CH4 exon and two acceptor sites separated by 156 bp and located around two thousand nucleotides downstream of the CH4 exon. The long form transcript has been detected at a level of 100 times higher than the short form in IgE-producing myeloma cells and tonsil B cells treated with IL-4 plus CD40 (Peng et al. 1992 and Zhang et al 1992); whereas, the short form was not detectable at the protein level (Peng et al, 1992). The IgE EMPD is specific to the mIgE form and is not found on secreted serum IgE (FIG. 2).

Current clinical guidelines for the treatment of IgE mediated allergic diseases include a combination of patient education, allergen avoidance, pharmacotherapy, allergen based immunotherapy, and therapeutic targeting of IgE, but these treatment options have their limitations. For example, allergen avoidance is indicated whenever feasible, although, in practice, adequate symptom control is difficult to achieve with allergen avoidance alone. Also, even though safe and inexpensive drugs are available for the treatment of allergic symptoms, many patients report insufficient symptom control with these drugs. Importantly, pharmacotherapy has no effect on the progression of the disease and treatment has to be administered repeatedly as long as symptoms prevail, which often means life-long. Only the classical allergen based immunotherapy has disease-modifying potential and is considered to be the optimal treatment strategy.

Allergen based immunotherapy (AIT) involves the subcutaneous injection of incrementally increasing doses of allergen in order to suppress symptoms on subsequent re-exposure to that allergen. The amount of allergen presented to the immune system in the mucosa under natural exposure conditions is relatively low, but it results in an efficient stimulation of the allergic response and allergy symptoms appear within minutes. By contrast, when an allergen is administered as immunotherapy, the amount of allergen is relatively high, where one dose administered in immunotherapy corresponds approximately to 100 times the estimated maximal yearly intake through natural exposure. The quantitative difference in combination with the different route of entry into the body exerts a profound effect on the immune system, which responds by inducing immunological tolerance to the allergen.

The original administration form of AIT was by subcutaneous injection and this treatment regimen is traditionally conducted in two phases: (1) an initial up-dosing phase and (2) a subsequent maintenance phase. The up-dosing phase is an individual titration, where increasing doses are administered for the purpose of slowly building tolerance and carefully assessing the sensitivity of the patient. The maximum-tolerated dose, or the maximum dose recommended, whichever is reached first, is then given throughout the maintenance phase.

Two mechanisms are thought to play a major role in AIT: (1) immune deviation and (2) induction of regulatory T cells. The relative contributions from immune deviation and regulatory T cells are not established, but the end result is reduction and, in some cases, even elimination of the capacity to mount an allergic reaction in response to allergen exposure.

Immune deviation is a term signifying a modified immunological response to allergen exposure, where allergen-specific T helper type 1 (Th1) cells are mobilized and stimulated at the expense of Th2 cells. Th1 cells produce interferon gamma (IFN-γ), which stimulates B cells to produce IgG instead of IgE, and IgG is not capable of triggering an allergic reaction.

Regulatory T cells are a diverse group of T cells that are active in the regulation of immune responses. An increase in allergen-specific CD4+CD25+ regulatory T cells in peripheral blood has been demonstrated after AIT. These cells produce interleukin (IL)-10 and transforming growth factor (TGF)-β, and have the potential to suppress local Th2 cell responses and redirect antibody class switching in favor of IgG4 (IL10 isotype switch factor), and IgA (TGF-β isotype switch factor). Allergen-specific IgG4 antibodies interrupt allergen presentation to Th2 cells and, in addition, block allergen-induced activation of mast cells and basophils, thereby significantly weakening the allergic reaction.

Although antigen based immunotherapy can be effective, there are still serious issues and unmet needs related to AIT of IgE mediated allergic diseases. First, all injections for AIT are given in the doctor's office because there is a small risk of inducing allergic reactions, which can become severe or even life threatening if not treated promptly and appropriately. Second, the aspect of disease modification through AIT has been demonstrated clinically for only a few allergen products. Third, only a few structures of specific allergens have been described and the definition of an allergen is mostly based upon the functional criterion of being able to elicit an IgE response in susceptible individuals. Thus, allergens are generally defined by the immune system of an individual patient and, as such, any immunogenic protein (antigen) has allergenic potential, even though most patients with allergy have IgE antibodies specific for a relatively limited number of major allergens. Fourth, every patient has a unique sensitization pattern with respect to allergen molecules and epitopes. Fifth, all marketed allergen products are manufactured by aqueous extraction of allergenic source materials derived from natural raw materials, such as pollens, house dust mite cultures, animal hair and/or dander, or insect venoms and such natural raw materials are inherently variable in composition. Thus, allergen products used for AIT are not generic and differ in their composition, IgE-binding potency, and extent of quality control between manufacturers. No international standards are in effect. This means that products from different manufacturers can perform differently in patients and, as a consequence, clinical results cannot be extrapolated directly from one allergen product to another.

An updated review on allergen based immunotherapy: the future of allergy treatment is included here by reference (Drug Discovery Today Volume 21, Issue 1, January 2016, Pages 26-37) where all supporting documents can be found for statements made in this background section.

In addition to AIT, therapeutic targeting of the IgE molecule has been studied in treating IgE mediated allergic diseases.

Therapeutic targeting of serum soluble IgE with an anti-IgE monoclonal antibody has been shown to be effective in treating IgE mediated allergic diseases. Currently, Omalizumab (XOLAIR®), a recombinant humanized monoclonal antibody has been approved for the treatment of moderate-to-severe persisting allergic asthma in adults and adolescents. Omalizumab stops the allergic cascade by binding to circulating, unbound, free IgE and prevents it from binding to IgE FcεRI on the surface of immune effector cells. Treatment using Omalizumab leads to a marked decrease in levels of free IgE and a downregulation of cellular IgE receptors (Chang et al, 2007). Although treatment with Omalizumab has been shown to be effective, it has its limitations. Specifically, Omalizumab is able to neutralize free IgE in the serum but it does not affect IgE production. Therefore, Omalizumab must be administered frequently and chronically in order to maintain sufficient suppression of serum IgE.

Therapeutic targeting of the extracellular membrane proximal domain of membrane bound IgE (IgE EMPD) has also been studied for treating IgE mediated allergic diseases. Crosslinking of the B cell receptor (BCR) in the absence of additional costimulatory signals can lead to B cell apoptosis. Apoptotic depletion of B cells through BCR crosslinking has been extensively described for immature B cells as a mechanism by which autoreactive B cells are removed from the B cell repertoire. Anti-IgE EMPD monoclonal antibodies, such as 47H4 (Brightbill et al. 2010), 4B12 and 26H2 (Chen et al. 2010), have been shown to crosslink IgE BCR and cause the apoptosis of mIgE-expressing B cells (FIG. 2). Brightbill et al also found that therapeutic delivery of 47H4 in vivo can reduce established IgE responses, as observed in *N. brasiliensis* infection and allergic asthma models (Chen et al. 2010). To deplete IgE-lineage B cells in order to reduce serum IgE, some antibodies and epitopes for targeting the IgE-EMPD, especially within the extra 52-amino acid-long form region, have been studied and identified (Chen et al. 2010, Chang et al. 2015, Chen et al. 2002). One group reported the use of hepatitis B virus core antigen (HBcAg) as a carrier harboring the IgE EMPD fragments as inserts to induce specific IgE EMPD antibody response in BALB/c mice. The cloned constructs spontaneously assembled into virus-like particles (VPLs) with various IgE EMPD fragments presented at the tip of the "spike" of VLPs to gain immunogenicity. The IgG antibodies purified from the sera of immunized mice were able to cause the apoptosis of mIgE.FcL-expressing Ramos cells through a BCR-dependent caspase pathway as well as Antibody-dependent Cell mediated Cytotoxicity (ADCC) in mIgE.FcL-expressing A20 cells by using purified mouse splenic NK cells as effector cells (Lin, et al. 2012). The above approach has generated some interest in vaccine development for allergy treatment. However, the antigen expression system is cumbersome generating most of the antibodies targeting the carrier VLPs with the antigens and delivery system far from optimal for effective vaccine development applicable for industrial and clinical uses.

In view of the above, there is an unmet need to develop an immunotherapeutic approach for treating and/or preventing IgE mediated allergic diseases that is: allergen independent, capable of eliciting highly specific immune responses against IgE, easily administered to patients, able to be manufactured under stringent good manufacturing practices (GMP), and is cost effective for world wide application to replace the century-old AIT practice.

REFERENCES

1. LARSEN, J. N., et al. "Allergy Immunotherapy: The Future of Allergy Treatment", *Drug Discovery Today,* 1:26-37 (2016).
2. PENG, C., et al. "A New Isoform of Human Membrane-Bound IgE", *J. Immunol.* 148:129-136 (1992).
3 ZHANG, K., et al. "Two unusual forms of human immunoglobulin E encoded by alternative RNA splicing of epsilon heavy chain membrane exons", *J. Exp. Med.,* 176: 233-243 (1992).
4. CHEN, J. B., et al. "Unique epitopes on CεmX in IgE-B cell receptors are potentially applicable for targeting IgE-committed B cells", *J. Immunol,* 184:1748-1756 (2010).
5. LIN, C. J., et al. "CεmX peptide-carrying HBcAg virus-like particles induced antibodies that down-regulate mIgE-B lymphocytes", *Mol. Immunol.,* 52:190-199 (2012).
6. CHANG, T. W., et al. "C(Epsilon)mX Peptides for Inducing Immune Responses to Human mIgE on B Lymphocytes", U.S. Pat. No. 8,974,794 B2 (2015).
7. CHEN, H. Y., et al. "Monoclonal Antibodies against the CamX Domain of Human Membrane-Bound IgE and Their Potential Use for Targeting IgE-Expressing B Cells", *Immunol.,* 128:315-324. (2002).
8. BRIGHTBILL, H. D., et al. "Antibodies specific for a segment of human membrane IgE deplete IgE-producing B cells in humanized mice", *J Clin. Invest.,* 120:2218-2229 (2010).
9. LU, C. S., et al. "Generating allergen-specific human IgEs for immunoassays by employing human ε gene knockin mice", *Allergy,* 70:384-390 (2015).
10. WU, P. C., et al. "The IgE gene in primates exhibits extraordinary evolutionary diversity", *Immunogenetics,* 64:279-287 (2012).
11. CHANG, T. W., et al. "Anti-IgE Antibodies for the Treatment of IgE-Mediated Allergic Diseases", *Advances in Immunology,* 93:63-119 (2007).
12. TRAGGIAI, E., et al. "An efficient method to make human monoclonal antibodies from memory B cells: potent neutralization of SARS coronavirus", *Nature Medicine,* 10:871-875 (2004).
13. "Asthma Fact Sheet" World Health Organization (2011) WHO Media Center, Asthma Fact Sheet No. 307. World Health Organization website (accessed Aug. 18, 2017).
14. "2016 Appendix to GINA Report" *Global Initiative For Asthma* website, website address: ginasthma.org/wp-content/uploads/2016/04/GINA-Appendix-2016-final.pdf (accessed Aug. 18, 2017).
15. "Allergy" *Wikipedia, The Free Encyclopedia*, website address: en.wikipedia.org/wiki/Allergy (accessed Aug. 18, 2017).
16. website: en.wikipedia.org/wiki/Allergen)

SUMMARY OF THE INVENTION

The present disclosure is directed to individual peptide immunogen constructs targeting the extracellular membrane proximal domain of membrane-bound IgE (IgE EMPD) for the treatment and/or prevention of IgE mediated allergic diseases. The present disclosure is also directed to compositions containing the peptide immunogen constructs, methods of making and using the peptide immunogen constructs, and antibodies produced by the peptide immunogen constructs.

The disclosed peptide immunogen constructs contain about 20 or more amino acids. The peptide immunogen constructs contain a B cell epitope from the 67 amino acid sequence of the full-length IgE EMPD (SEQ ID NO: 1). The B cell epitope can be linked to a heterologous T helper cell (Th) epitope derived from pathogen proteins through an optional heterologous spacer. The disclosed peptide immunogen constructs stimulate the generation of highly specific antibodies directed against IgE EMPD and can bind to recombinant IgE EMPD-containing protein, IgE EMPD on mIgE bearing B cells, and/or a recombinant, soluble IgE EMPD protein containing the Fc portion of human IgG1 and the IgE EMPD of human membrane-bound IgE (referred to as "γ1-em67"). The disclosed peptide immunogen constructs can be used as an allergen-independent, cost-effective, universal immunotherapy for global patients suffering from IgE mediated allergic diseases.

The B cell epitope portion of the peptide immunogen constructs have amino acid sequences from the full-length IgE EMPD sequence (SEQ ID NO: 1). In some embodiments, the B cell epitope has a sequence containing the internal intra-molecular loop formed by endogenous cysteines (C18-C39), according to numbering of the full-length IgE EMPD sequence (SEQ ID NO: 1). In certain specific embodiments, the B cell epitope has an amino acid sequence of IgE EMPD-1-39 (SEQ ID NO: 5), IgE EMPD-7-40 (SEQ ID NO: 6), IgE EMPD-19-38 (SEQ ID NO: 8), or IgE EMPD-1-40 (SEQ ID NO: 9).

The peptide immunogen constructs of the present disclosure can contain a heterologous Th epitope amino acid sequence derived from a pathogenic protein (e.g., SEQ ID NOs: 59 to 87). In certain embodiments, the heterologous Th epitope is derived from natural pathogens, such as Diphtheria Toxin (SEQ ID NO: 63), *Plasmodium Falciparum* (SEQ ID NO: 64), Cholera Toxin (SEQ ID NO: 66). In other embodiments, the heterologous Th epitope is an idealized artificial Th epitope derived from Measles Virus Fusion protein (MVF 1 to 5) or Hepatitis B Surface Antigen (HBsAg 1 to 3) in the form of either single sequence or combinatorial sequences (e.g., SEQ ID NOs: 70, 69, and 71).

In some embodiments, the peptide immunogen constructs contain a B cell epitope from IgE EMPD linked to a heterologous T helper cell (Th) epitope through an optional heterologous spacer. In certain embodiments, the peptide immunogen constructs contain a B cell antigenic site having more than about 20 amino acids from IgE EMPD-1-40 (SEQ ID NO: 9) linked to a heterologous Th epitope derived from a pathogenic protein (e.g., SEQ ID NOs: 59 to 87) through an optional heterologous spacer. In some embodiments, the optional heterologous spacer is a molecule or chemical structure capable of linking two amino acids and/or peptides together. In certain embodiments, the spacer is a naturally occurring amino acid, a non-naturally occurring amino acid, or a combination thereof. In specific embodiments, the peptide immunogen constructs have the amino acid sequence of SEQ ID NOs: 88-95, 98-124, and 130.

The present disclosure is also directed to compositions containing an IgE EMPD peptide immunogen construct. In some embodiments, the disclosed compositions contain more than one IgE EMPD peptide immunogen construct. In certain embodiments, the compositions contain a mixture of IgE EMPD G1-C39 peptide immunogen constructs (e.g., any combination of SEQ ID NOs: 88-95, 98-124, and 130) to cover a broad genetic background in patients. Compositions containing a mixture of peptide immunogen constructs can lead to a higher percentage in responder rate upon vaccine immunization for the treatment of IgE mediated allergic diseases compared to compositions containing only a single peptide immunogen construct.

The present disclosure is also directed to pharmaceutical compositions, including vaccine formulations, for the treatment and/or prevention of IgE mediated allergic diseases. In some embodiments, the pharmaceutical compositions contain the disclosed peptide immunogen constructs in the form of a stabilized immunostimulatory complex formed through electrostatic associations by mixing a CpG oligomer with a composition containing a peptide immunogen complex. Such stabilized immunostimulatory complexes are able to further enhance the immunogenicity of the peptide immunogen constructs. In some embodiments, the pharmaceutical compositions contain adjuvants such as mineral salts, including alum gel (ALHYDROGEL), aluminum phosphate (ADJUPHOS), or water-in-oil emulsions including MONTANIDE ISA 51 or 720.

The present disclosure is also directed to antibodies directed against the disclosed IgE EMPD peptide immunogen constructs. In particular, the peptide immunogen constructs of the present disclosure are able to stimulate the generation of highly specific antibodies that are cross-reactive with the IgE EMPD-1-52 amino acid sequence (SEQ ID NO: 2), the IgE EMPD 1-67 amino acid sequence (SEQ ID NO: 1), and fragments thereof (e.g., SEQ ID NOs: 5 and 6) when administered to a subject. The highly specific antibodies produced by the peptide immunogen constructs are cross reactive with recombinant IgE EMPD-containing protein, γ1-em67, and/or IgE EMPD on membrane-bound IgE bearing B cells. The disclosed antibodies bind with high specificity to IgE EMPD without much, if any, directed to the heterologous Th epitopes employed for immunogenicity enhancement, which is in sharp contrast to the conventional protein or other biological carriers used for such peptide antigenicity enhancement.

The present disclosure also includes methods for treating and/or preventing IgE mediated allergic diseases using the disclosed peptide immunogen constructs and/or antibodies directed against the peptide immunogen constructs. In some embodiments, the methods for treating and/or preventing IgE mediated allergic diseases including administering to a host a composition containing a disclosed peptide immunogen construct. In certain embodiments, the compositions utilized in the methods contain a disclosed peptide immunogen construct in the form of a stable immunostimulatory complex with negatively charged oligonucleotides, such as CpG oligomers, through electrostatic association, which complexes are further supplemented, optionally, with mineral salts or oil as adjuvant, for administration to patients with IgE mediated allergic diseases. The disclosed methods also include dosing regimens, dosage forms, and routes for administering the peptide immunogen constructs to a host at risk for, or with, IgE mediated allergic diseases.

BRIEF DESCRIPTION OF THE DRAWINGS

FIG. 2A shows that IgE is expressed in two forms: secretory IgE and membrane-bound IgE (mIgE). Secretory IgE is captured on the cell surface of basophils and mast cells through FcεRI, while mIgE is exclusively present on IgE-committed B cells as part of the B cell receptor. The extracellular membrane proximal domain (EMPD) of mIgE is a 67 amino acid peptide segment (SEQ ID NO: 1) between the CH4 domain and the transmembrane region and is exclusively found on mIgE B cells. The underlined amino acids represent the residues that are found in the short isoform of EMPD. The uniqueness of IgE EMPD has provided an attractive site for targeting mIgE and mIgE B cells. FIG. 2B shows a mechanism for depleting mIgE B cells by targeting IgE EMPD, which causes the suppression of allergen-specific IgE production before the mIgE B cells differentiate into new IgE-secreting plasma cells. Existing IgE secreting plasma cells with their limited lifespan eventually die off, resulting in the gradual decline in total and allergen-specific IgE.

FIG. 6A contains the histograms from polyclonal antibodies directed against IgE EMPD immunogen constructs of SEQ ID NOs: 88 to 90. FIG. 6B contains the histograms from polyclonal antibodies directed against IgE EMPD immunogen constructs of SEQ ID NOs: 91 to 93. FIG. 6*c* contains the histograms from polyclonal antibodies directed against IgE EMPD immunogen constructs of SEQ ID NOs: 94, 96, and 97.

three times at weeks 0, 3 and 5 and subcutaneously challenged with papain/TiterMax at weeks 10 and 16. Serum IgE was measured in a human IgE (hIgE) quantitative ELISA. Mouse serum was diluted at 1:20. hIgE purified from U266 myeloma cells was used to generate a standard curve. The IgE concentration was calculated by interpolating the $A_{450}$ to a standard curve generated by nonlinear regression using four parameter logistic curve-fit.

Figure 10:
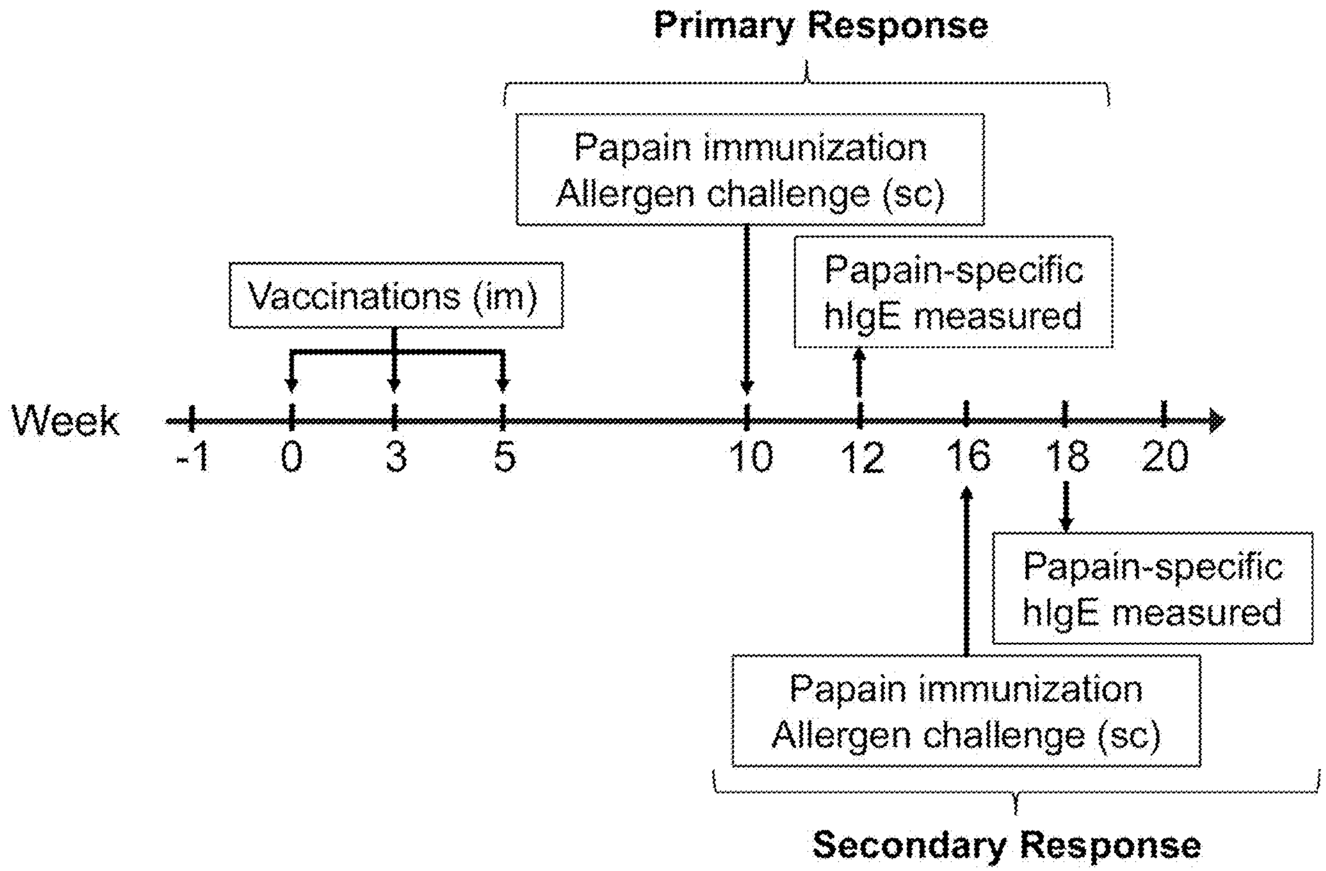
FIG. 10 is a schematic that illustrates an experimental design for evaluating papain-induced primary and secondary immune responses following immunization with peptide immunogen constructs of the present disclosure. Human IGHE knockin hybrid mice were immunized intramuscularly (im) with an IgE EMPD peptide immunogen construct three times at weeks 0, 3, and 5. In the primary IgE response model, mice were subcutaneously (sc) challenged with papain/TiterMax Gold at week 10 and papain-specific human IgE (hIgE) was measured at week 12 (shown in FIG. 13). In the secondary IgE response, mice were subcutaneously challenged with papain/TiterMax Gold again at week 16 and papain-specific human IgE (hIgE) was measured at week 18 (shown in FIG. 14). The serum of immunized mice was also tested throughout the study for anti-IgE antibody production (FIG. 11) and changes in serum IgE (FIG. 12).
Figure 13:
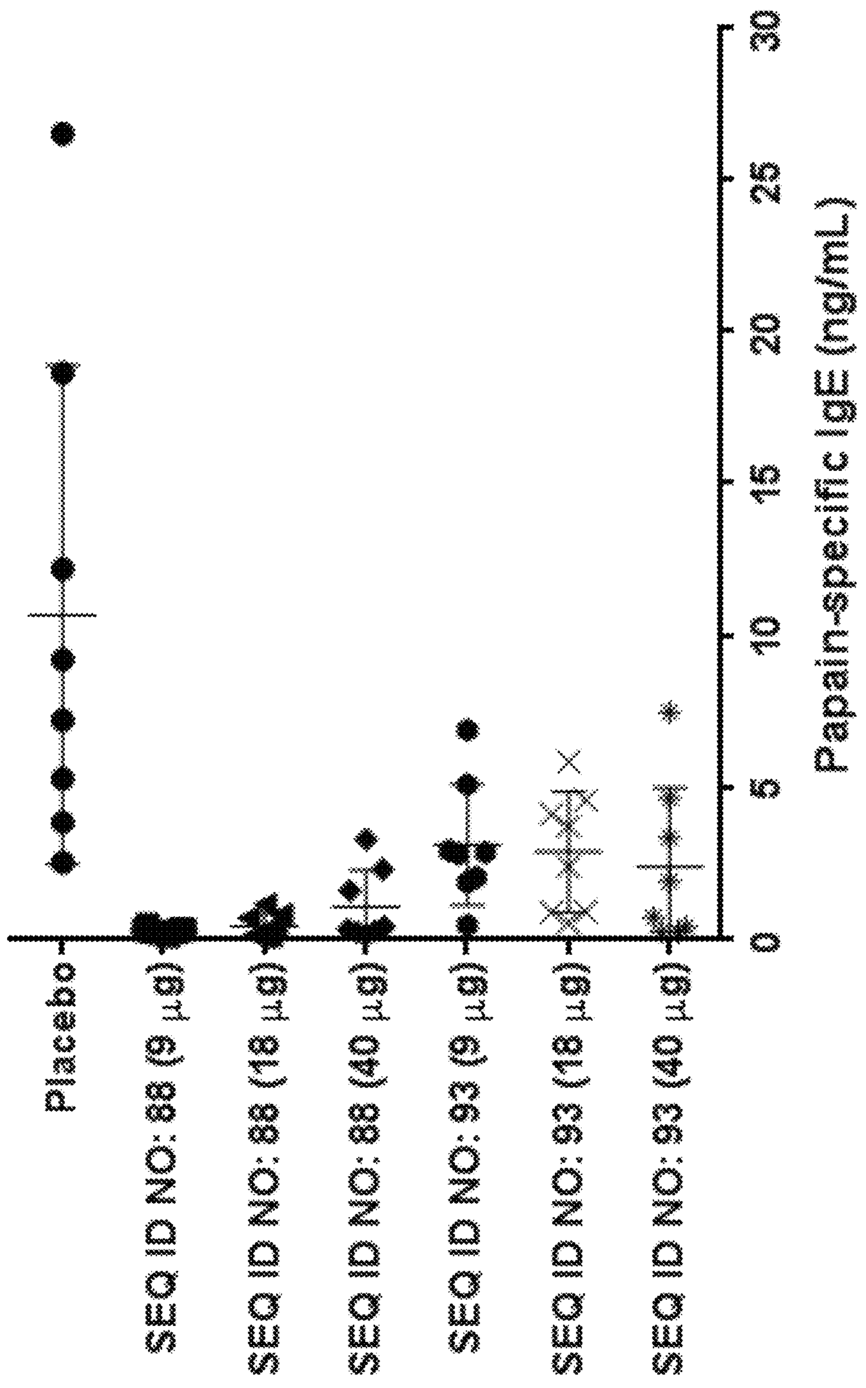

FIG. 13 is a graph that shows the suppression of papain-specific human IgE (hIgE) production in primary IgE response measured at week 12 using the experimental design described in FIG. 10. Specifically, human IGHE knockin hybrid mice (hIGHE×Balb/c, n=8 per group) were intramuscularly immunized with an IgE EMPD immunogen construct (SEQ ID NO: 88 or 93) at the indicated doses (100 μL per immunization) three times at week 0, 3 and 5. Serum papain-specific hIgE was measured in a quantitative ELISA. Mouse serum was diluted 1:10. A monoclonal chimeric papain-specific hIgE was used to generate a standard curve. The papain-specific hIgE concentration was calculated by interpolating the $A_{450}$ to a standard curve generated by nonlinear regression using four parameter logistic curve-fit.

Figure 14:
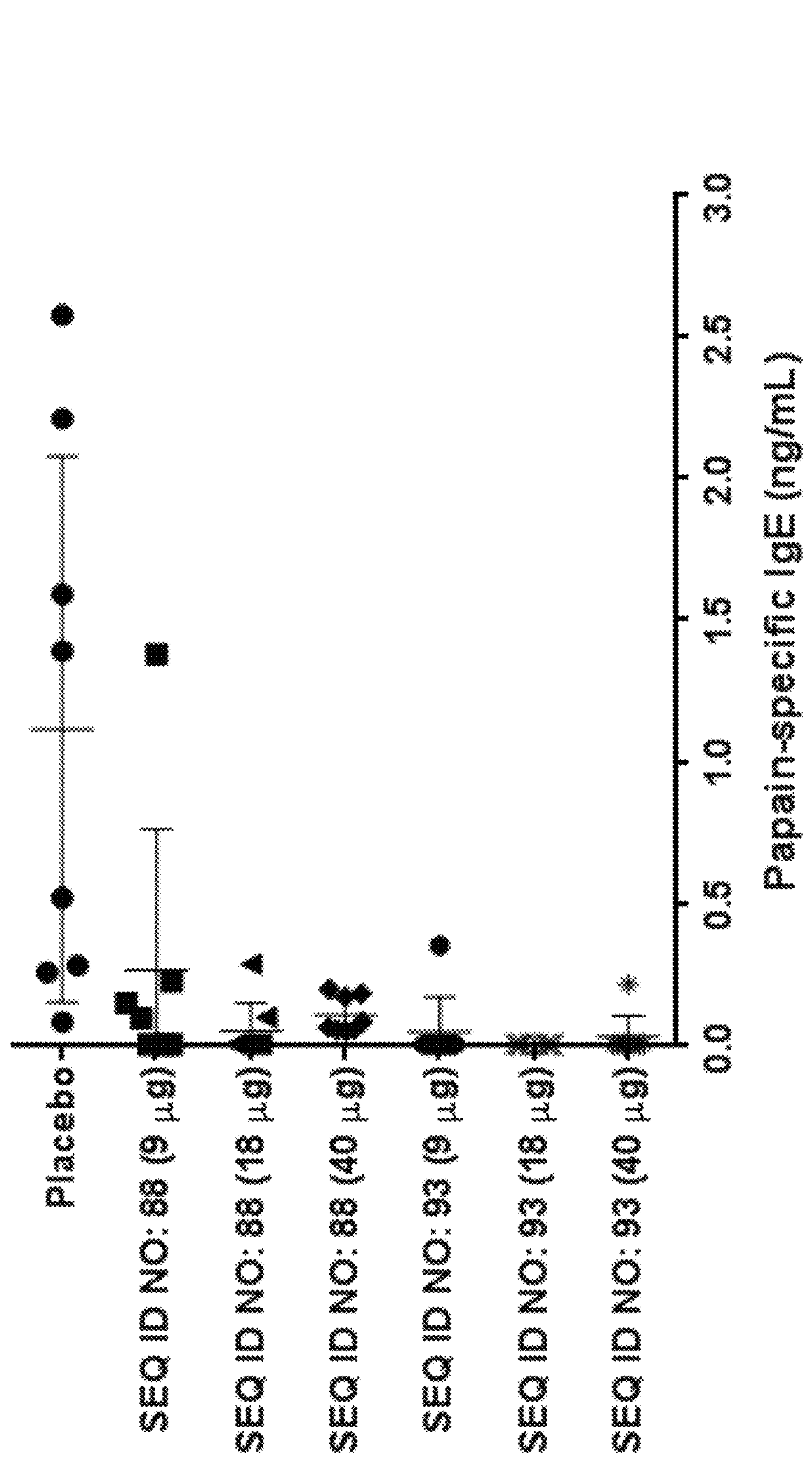

FIG. 14 shows the suppression of papain-specific human IgE (hIgE) production in secondary IgE response measured at week 18 using the experimental design described in FIG. 10. Specifically, human IGHE knockin hybrid mice (hIGHE×Balb/c, n=8 per group) intramuscularly immunized with an IgE EMPD immunogen construct (SEQ ID NO: 88 or 93) at the indicated doses (100 μL per immunization) three times at weeks 0, 3 and 5. Serum papain-specific hIgE was measured in a quantitative ELISA. Mouse serum was diluted at 1:10. A monoclonal chimeric papain-specific hIgE was used to generate a standard curve. The papain-specific hIgE concentration was calculated by interpolating the $A_{450}$ to a standard curve generated by nonlinear regression using four parameter logistic curve-fit.

FIG. 15 is a schematic that illustrates an experimental design for evaluating papain-induced sensitization and recall immune responses following immunization with peptide immunogen constructs of the present disclosure. Human IGHE knockin hybrid mice were subcutaneously (sc) sensitized with papain/TiterMax Gold at week 0 and then intramuscularly immunized with an IgE EMPD peptide immunogen construct three times at weeks 3, 6, and 8. The papain-specific immune recall response was triggered by intradermal footpad injection with papain in PBS solution at week 12. The levels of total IgE and papain-specific IgE/IgG were evaluated between weeks 0 to 6 of the experiment (FIG. 16) and the level of papain-specific IgE was evaluated at weeks 12, 13, and 14 (FIG. 17).

Figure 16:
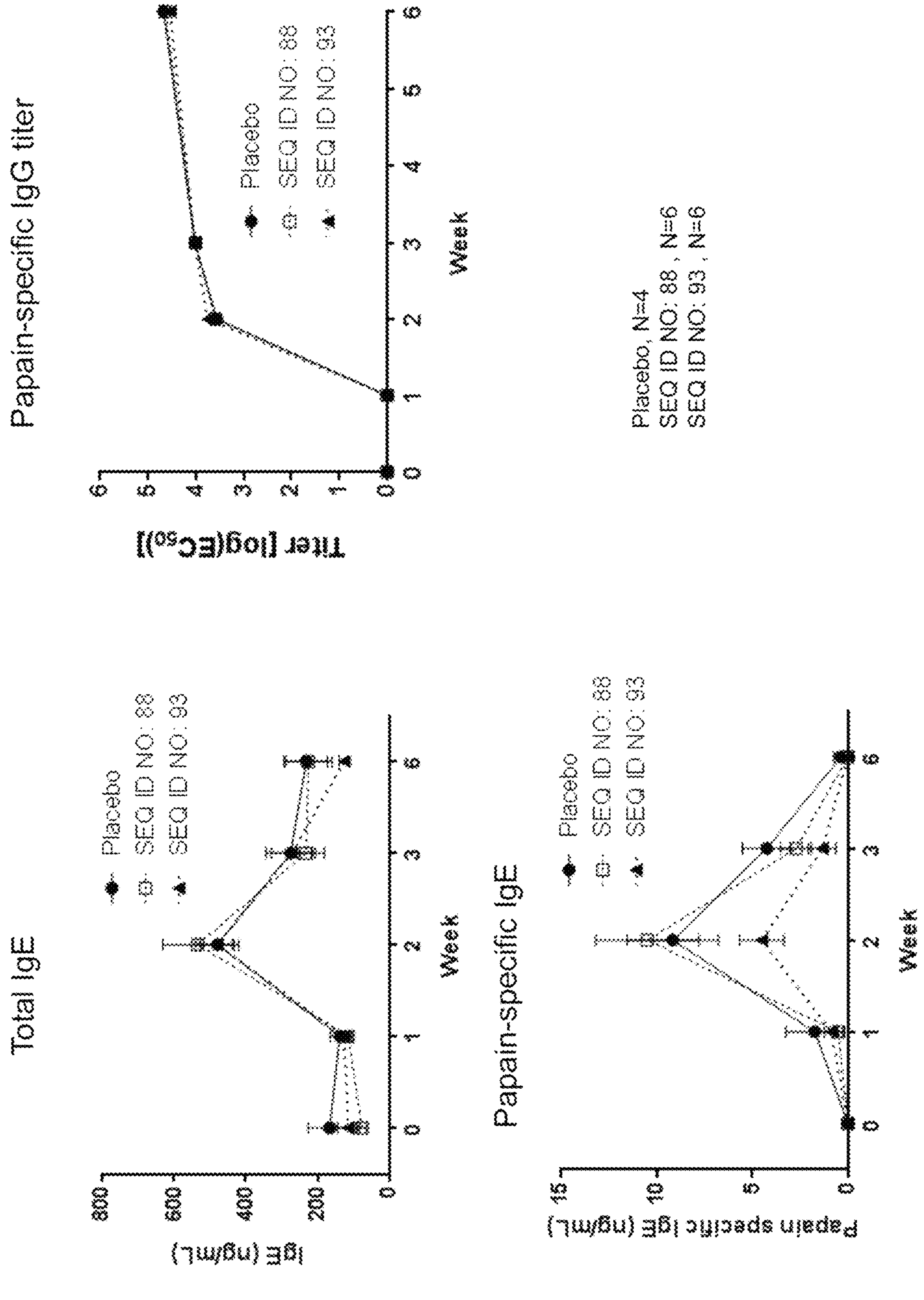

FIG. 16 contains graphs that show the outcome of sensitization of all human IGHE knockin hybrid mice with papain using the experimental design described in FIG. 15. Papain-specific mouse IgG titer expressed at Log ($EC_{50}$) and human IgE (ng/mL) were detected over a 6-week period. In addition, total IgE level (ng/mL) was increased due to bystander activation.

Figure 17:
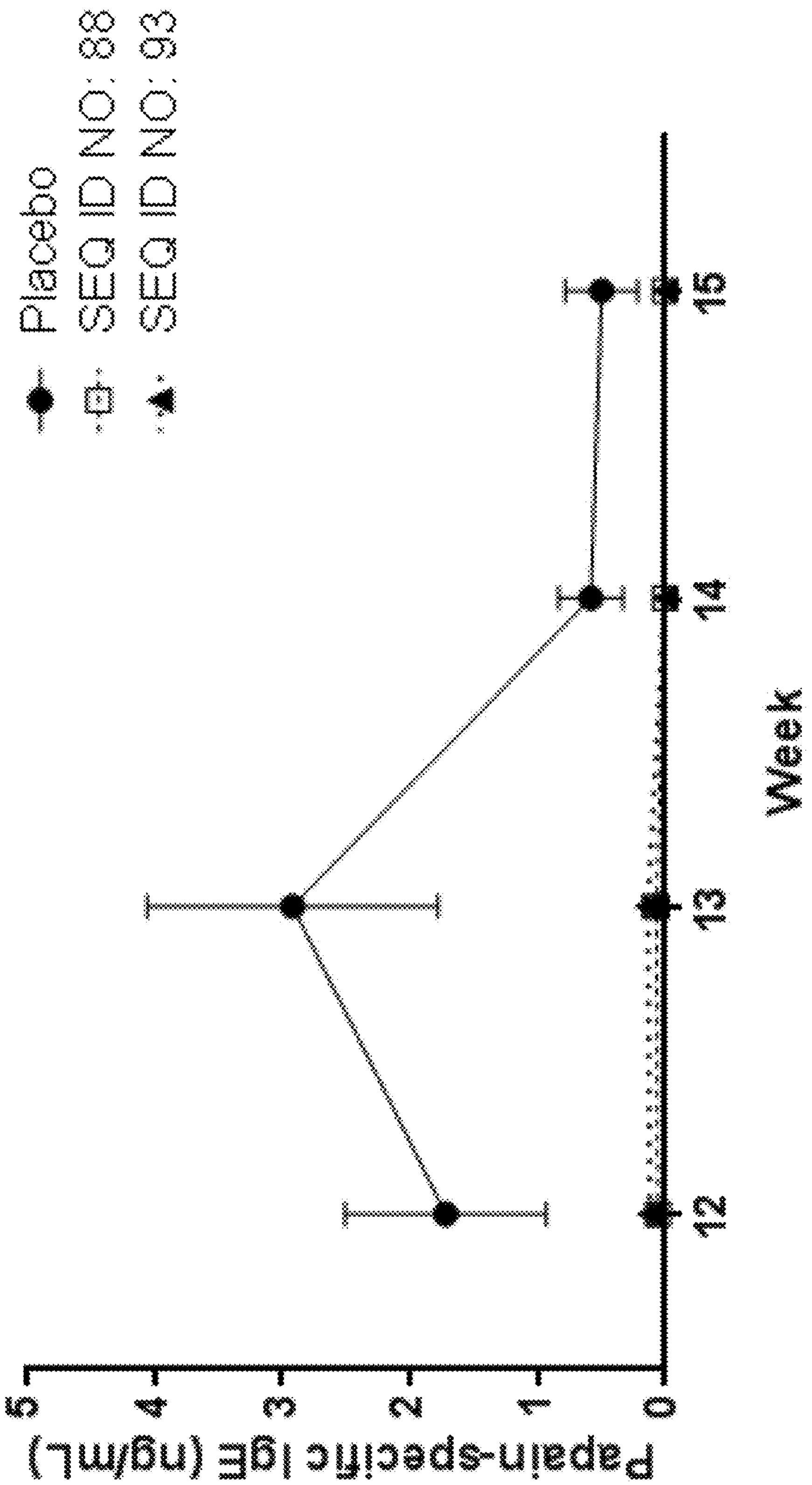

FIG. 17 is a graph that shows the suppression of papain-specific human IgE (hIgE) production at weeks 12, 13, and 14 using the experimental design described in FIG. 15. Specifically, the graph shows the papain-specific recall response in sensitized human IGHE knockin hybrid mice (hIGHE×Balb/c, n=8 per group) intramuscularly immunized with SEQ ID NO: 88 or 93 at 400 μg/mL (100 μL per immunization) three times at weeks 3, 6 and 8. Serum papain-specific hIgE was measured in a quantitative ELISA. Mouse serum was diluted at 1:10. A monoclonal chimeric papain-specific hIgE (ng/mL) was used to generate a standard curve. The papain-specific hIgE concentration was calculated by interpolating the $A_{450}$ to a standard curve generated by nonlinear regression using four parameter logistic curve-fit.

Figure 18A:
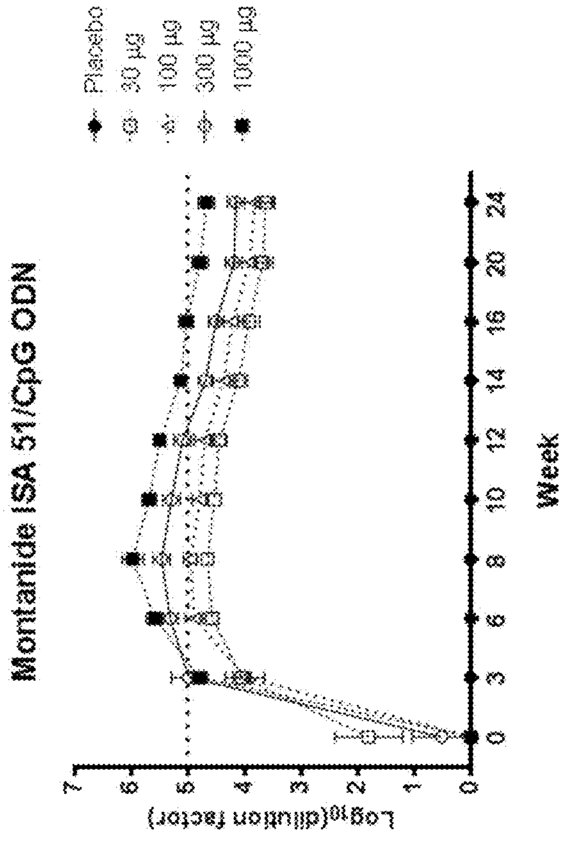
Figure 18B:
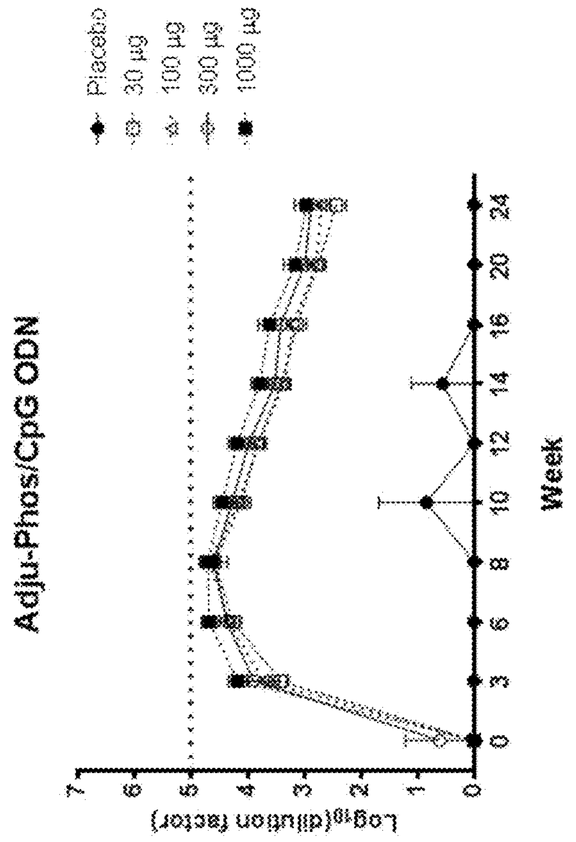

FIGS. 18A and 18B are graphs that show the immunogenicity of prototype immunotherapeutic allergy vaccine formulations in cynomolgus macaques immunized with an IgE EMPD immunogen construct (SEQ ID NO: 88) in four dosages of 30, 100, 300, and 1000 μg per dose plus a placebo control formulation at week 0, 3 and 6 at the indicated doses and assayed for anti-IgE EMPD titers by ELISA. FIG. 18A shows the antibody response in macaques immunized with a formulation containing Montanide™ ISA 51 and CpG ODN. FIG. 18B shows the antibody response in macaques immunized with a formulation containing ADJUPHOS and CpG ODN.

Figure 19:
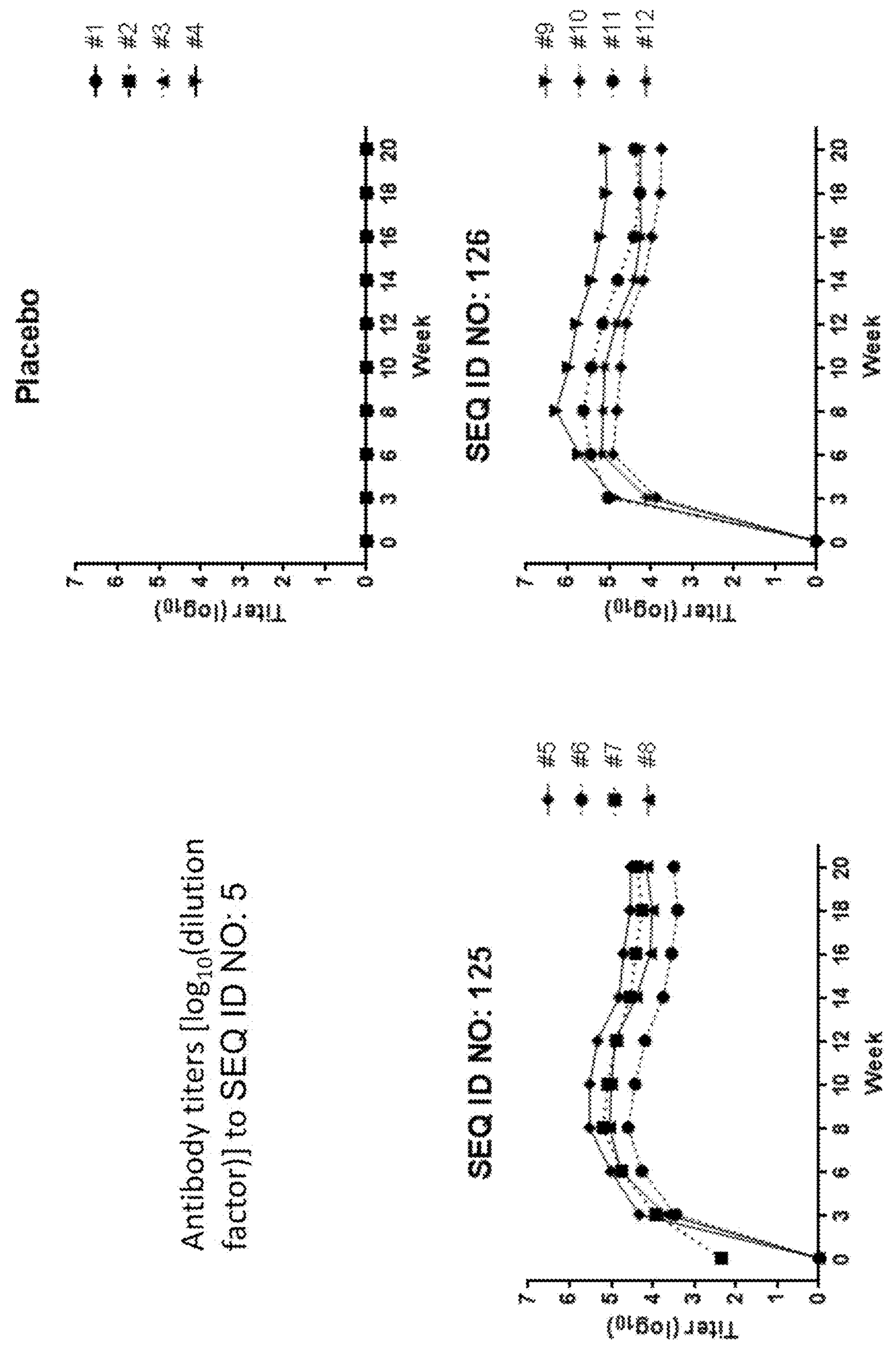

FIG. 19 are graphs that illustrate the kinetics of antibody response over a 20-week period in cynomolgus macaques (2 males and 2 females per group) intramuscularly immunized with an immunogen construct (SEQ ID NOs: 125 or 126) at 300 μg/mL (500 μL per immunization) three times at weeks 0, 3 and 6. Macaque serum was diluted from 1:100 to 1: ($4.19\times10^8$) by a 4-fold serial dilution. ELISA plates were coated with SEQ ID NO: 5. The titer of a tested serum, expressed as Log 10 of dilution factor, was calculated by nonlinear regression with four-parameter logistic curve-fit. A cutoff was set at a 2-fold of the average $A_{450}$ of all serum samples at 1:100 dilution.

FIG. 20 illustrates the kinetics of IgG, IgA and IgM antibody responses over a 20-week period in cynomolgus macaques (2 males and 2 females per group) intramuscularly immunized with an IgE EMPD immunogen construct (SEQ ID NO: 125 or 126) at 300 μg/mL (500 μL per immunization) three times at weeks 0, 3 and 6. Macaque serum was diluted from 1:100 to 1: ($4.19\times10^8$) by a 4-fold serial dilution. ELISA plates were coated with an IgE EMPD 1-39 peptide (SEQ ID NO: 5). The titer, expressed as $Log_{10}$, was calculated by interoperating a cutoff to a four-parameter logistic curve generated from the data of each tested serum. A cutoff was set at a 2-fold of the average $A_{450}$ of all serum samples at 1:100 dilution.

Figure 21:
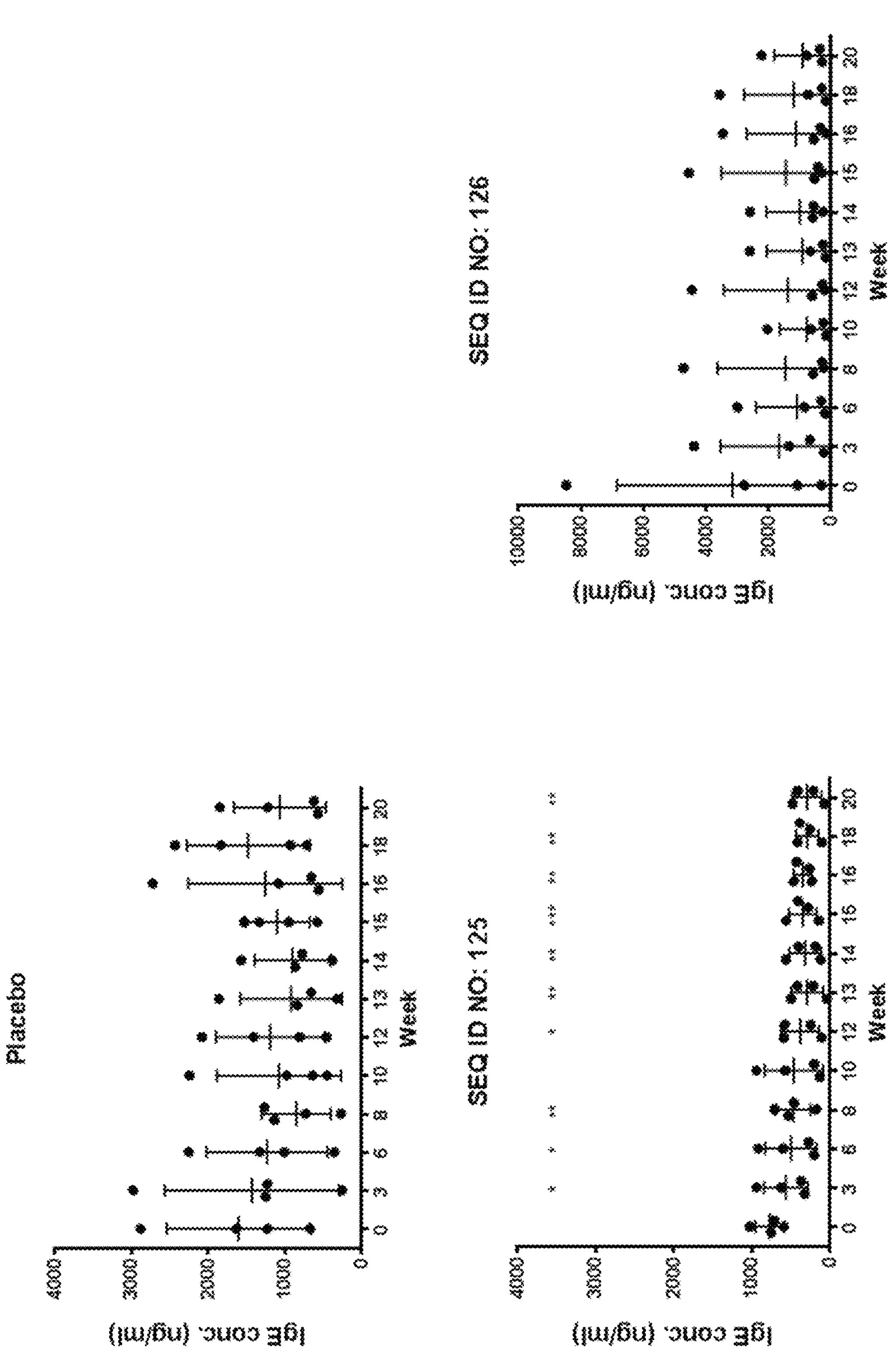

FIG. 21 are graphs that illustrate the changes of serum IgE level over a 20-week period in cynomolgus macaques (2 males and 2 females per group) intramuscularly immunized with an IgE EMPD immunogen construct (SEQ ID NO: 125 or 126) at 300 μg/mL (500 μL per immunization) three times at weeks 0, 3 and 6. Serum IgE level was measured in a macaque IgE quantitative ELISA. Macaque serum was diluted at 1:20. Macaque IgE was used to generate a standard curve. The IgE concentration was calculated by interpolating the $A_{450}$ to a standard curve generated by nonlinear regression using four parameter logistic curve-fit. Results are mean±SD. Paired t test with a two-tailed hypothesis was used to identify the statistical difference to week 0: *$P<0.05$, $P<0.01$ and *$P<0.001$.

DETAILED DESCRIPTION OF THE INVENTION

The present disclosure is directed to peptide immunogen constructs targeting the extracellular membrane proximal domain (EMPD) of membrane-bound IgE (or IgE EMPD). The present disclosure is also directed to compositions containing the peptide immunogen constructs, methods of making and using the peptide immunogen constructs, and antibodies produced by a host that is immunized by the peptide immunogen constructs.

The disclosed peptide immunogen constructs contain about 20 or more amino acids. The peptide immunogen constructs contain a B cell epitope from the 67 amino acid sequence of the full-length IgE EMPD (SEQ ID NO: 1). The B cell epitope can be linked to a heterologous T helper cell (Th) epitope derived from pathogen proteins through an optional heterologous spacer. The disclosed peptide immunogen constructs stimulate the generation of highly specific antibodies directed against IgE EMPD and can bind to recombinant IgE EMPD-containing protein, γ1-em67, and/or IgE EMPD on mIgE bearing B cells. The disclosed peptide immunogen constructs can be used as an allergen-independent, cost-effective, universal immunotherapy for global patients suffering from IgE mediated allergic diseases.

The B cell epitope portion of the peptide immunogen constructs have amino acid sequences from the full-length IgE EMPD sequence (SEQ ID NO: 1). In some embodiments, the B cell epitope has a sequence containing the internal intra-molecular loop of IgE EMPD formed by endogenous cysteines (C18-C39), according to numbering of the full-length IgE EMPD sequence (SEQ ID NO: 1). In certain specific embodiments, the B cell epitope has an amino acid sequence of IgE EMPD-1-39 (SEQ ID NO: 5), IgE EMPD-7-40 (SEQ ID NO: 6), IgE EMPD-19-38 (SEQ ID NO: 8), or IgE EMPD-1-40 (SEQ ID NO: 9).

The peptide immunogen constructs of the present disclosure can contain a heterologous Th epitope amino acid sequence derived from a pathogenic protein (e.g., SEQ ID NOs: 59 to 87). In certain embodiments, the heterologous Th epitope is derived from natural pathogens, such as Diphtheria Toxin (SEQ ID NO: 63), *Plasmodium Falciparum* (SEQ ID NO: 64), Cholera Toxin (SEQ ID NO: 66). In other embodiments, the heterologous Th epitope is an idealized artificial Th epitope derived from Measles Virus Fusion protein (MVF 1 to 5) or Hepatitis B Surface Antigen (HBsAg 1 to 3) in the form of either single sequence (e.g., SEQ ID NOs: 60, 67, 72, and 73) or combinatorial sequences (e.g., SEQ ID NOs: 70, 69, and 71).

In some embodiments, the peptide immunogen constructs contain a B cell epitope from IgE EMPD linked to a heterologous T helper cell (Th) epitope through an optional heterologous spacer. The optional heterologous spacer can be a molecule or chemical structure capable of linking two amino acids and/or peptides together. In certain embodiments, the spacer is a naturally occurring amino acid, a non-naturally occurring amino acid, or a combination thereof.

In certain embodiments, the peptide immunogen constructs contain a B cell antigenic site having more than about 20 amino acids from IgE EMPD-1-40 (SEQ ID NO: 9) linked to a heterologous Th epitope derived from a pathogenic protein (e.g., SEQ ID NOs: 59 to 87) through an optional heterologous spacer. In specific embodiments, the peptide immunogen constructs have the amino acid sequence of SEQ ID NOs: 88-95, 98-124, and 130.

The present disclosure is also directed to compositions containing an IgE EMPD peptide immunogen construct. In some embodiments, the disclosed compositions contain more than one IgE EMPD peptide immunogen constructs. In certain embodiments, the compositions contain a mixture of peptide immunogen constructs containing a B cell epitope portion of IgE EMPD-1-39 linked to different Th epitopes (e.g., any combination of SEQ ID NOs: 98-124) to cover a broad genetic background in patients. Compositions containing a mixture of peptide immunogen constructs can lead to a higher percentage in responder rate upon vaccine immunization for the treatment of IgE mediated allergic diseases compared to compositions containing only a single peptide immunogen construct.

The present disclosure is also directed to pharmaceutical compositions, including vaccine formulations, for the treatment and/or prevention of IgE mediated allergic diseases. In some embodiments, the pharmaceutical compositions contain the disclosed peptide immunogen constructs in the form of a stabilized immunostimulatory complex formed through electrostatic associations by mixing a CpG oligomer with a composition containing a peptide immunogen complex. Such stabilized immunostimulatory complexes are able to further enhance the immunogenicity of the peptide immunogen constructs. In some embodiments, the pharmaceutical compositions contain adjuvants such as mineral salts, including alum gel (ALHYDROGEL), aluminum phosphate (ADJUPHOS), or water-in-oil emulsions including MONTANIDE ISA 51 or 720.

The present disclosure is also directed to antibodies directed against the disclosed IgE EMPD peptide immunogen constructs. In particular, the peptide immunogen constructs of the present disclosure are able to stimulate the generation of highly specific antibodies that are cross-reactive with the IgE EMPD B cell epitope portion of the peptide immunogen constructs. The disclosed antibodies bind with high specificity to IgE EMPD without much, if any, directed to the heterologous Th epitopes employed for immunogenicity enhancement, which is in sharp contrast to antibodies produced using conventional proteins or other biological carriers used for such peptide antigenicity enhancement. Thus, the disclosed peptide immunogen constructs are capable of breaking the immune tolerance against self-antigen, with a high responder rate, compared to other peptide or protein immunogens.

In certain embodiments, antibodies are directed against and specifically bind to the IgE EMPD-1-52 amino acid sequence (SEQ ID NO: 2), the IgE EMPD-1-67 amino acid sequence (SEQ ID NO: 1), and fragments thereof (e.g., SEQ ID NOs: 5 and 6) when the peptide immunogen constructs are administered to a subject. The highly specific antibodies produced by the peptide immunogen constructs are cross-reactive with soluble IgE EMPD-containing peptides and proteins, IgE EMPD-containing fusion peptides and proteins, γ1-em67, and/or IgE EMPD on membrane-bound IgE bearing B cells. The generated antibodies are capable of binding to and crosslinking with the IgE B cell receptor (BCR) on mIgE-expressing B lymphocytes. Such crosslinking induces cytolytic effects like apoptosis and Antibody-Dependent Cell-mediated Cytotoxicity (ADCC), which leads to the reduction of serum IgE production.

Based on their unique characteristics and properties, the disclosed antibodies are capable of providing a universal immunotherapeutic approach to treating IgE mediated allergic diseases regardless of the causative allergen(s).

The present disclosure is also directed to methods of making the disclosed peptide immunogen constructs, compositions, and antibodies. The disclosed methods provide for the low cost manufacture and quality control of peptide immunogen constructs and compositions containing the constructs, which can be used in methods for treating IgE mediated allergic diseases regardless of the causative allergen(s).

The present disclosure also includes methods for treating and/or preventing IgE mediated allergic diseases, regardless of the causative allergen(s), using the disclosed peptide immunogen constructs and/or antibodies directed against the peptide immunogen constructs. In some embodiments, the methods for treating and/or preventing IgE mediated allergic diseases including administering to a host a composition containing a disclosed peptide immunogen construct. In certain embodiments, the compositions utilized in the methods contain a disclosed peptide immunogen construct in the form of a stable immunostimulatory complex with negatively charged oligonucleotides, such as CpG oligomers, through electrostatic association, which can be further supplemented with an adjuvant, for administration to patients with IgE mediated allergic diseases. The disclosed methods also include dosing regimens, dosage forms, and routes for administering the peptide immunogen constructs to a host at risk for, or with, IgE mediated allergic diseases.

The section headings used herein are for organizational purposes only and are not to be construed as limiting the subject matter described. All references or portions of references cited in this application are expressly incorporated by reference herein in their entirety for any purpose.

Unless otherwise explained, all technical and scientific terms used herein have the same meaning as commonly understood by one of ordinary skill in the art to which this invention belongs. The singular terms "a," "an," and "the" include plural referents unless context clearly indicates otherwise. Similarly, the word "or" is intended to include "and" unless the context clearly indicates otherwise. Hence, the phrase "comprising A or B" means including A, or B, or A and B. It is further to be understood that all amino acid sizes, and all molecular weight or molecular mass values, given for polypeptides are approximate, and are provided for description. Although methods and materials similar or equivalent to those described herein can be used in the practice or testing of the disclosed method, suitable methods and materials are described below. All publications, patent applications, patents, and other references mentioned herein are incorporated by reference in their entirety. In case of conflict, the present specification, including explanations of terms, will control. In addition, the materials, methods, and examples disclosed herein are illustrative only and not intended to be limiting.

IgE EMPD Peptide Immunogen Construct

The present disclosure provides peptide immunogen constructs containing a B cell epitope with an amino acid sequence from IgE EMPD covalently linked to a heterologous T helper cell (Th) epitope directly or through an optional heterologous spacer.

The phrase "IgE EMPD peptide immunogen construct" or "peptide immunogen construct", as used herein, refers to a peptide containing (a) a B cell epitope having about 20 or more amino acid residues from the 67 amino acid sequence of the full-length IgE EMPD (SEQ ID NO: 1); (b) a heterologous Th epitope; and (c) an optional heterologous spacer.

In certain embodiments, the IgE EMPD peptide immunogen construct can be represented by the formulae:

The IgE EMPD peptide immunogen construct can be represented by the formulae:

$(Th)_m$-$(A)_n$-(IgE EMPD fragment)-X or (IgE EMPD fragment)-$(A)_n$-$(Th)_m$-X or $(Th)_m$-$(A)_n$-(IgE EMPD fragment)-$(A)_n$-$(Th)_m$-X wherein Th is a heterologous T helper epitope;

A is a heterologous spacer;

(IgE EMPD fragment) is a B cell epitope having about 20 to about 40 amino acid residues from IgE EMPD;

X is an $\alpha$-COOH or $\alpha$-$CONH_2$ of an amino acid;

m is from 1 to about 4; and n is from 0 to about 10.

The IgE EMPD peptide immunogen constructs of the present disclosure were designed and selected based on a number of rationales. Several of these rationales include employing an IgE EMPD peptide immunogen construct that:

i. is non-immunogenic on its own, since it is a self-molecule;
ii. can be rendered immunogenic by a protein carrier or a potent T helper epitope(s);
iii. when rendered immunogenic and administered to a host:
   a. elicits high titer antibodies directed against the IgE EMPD peptide sequence (B cell epitope) and not against the protein carrier or T helper epitope(s);
   b. breaks immune tolerance in the immunized host and generates highly specific antibodies having cross-reactivity with the IgE EMPD (SEQ ID NO: 1) either as a recombinant protein purified from mIgE.FcL-expressing CHO cells or on the membrane of a mIgE bearing B cell (e.g., Ramos) transfected with recombinant DNA encoding mIgE.FcL;
   c. generates highly specific antibodies capable of inducing Antibody-Dependent Cellular Cytotoxicity (ADCC) and Apoptosis of IgE-expressing B lymphocytes in vitro (Example 6); and
   d. generates highly specific antibodies capable of leading to the in vivo reduction of basal level IgE in blood and also significant reduction of antigen-specific IgE level upon prime and boost with challenges by allergen (Examples 8 to 11).

The disclosed IgE EMPD peptide immunogen constructs and formulations thereof can effectively function as vaccines to reduce or eliminate the IgE-mediated allergic pathology in patients suffering from IgE mediated allergic diseases.

The various components of the disclosed IgE EMPD peptide immunogen construct are described in further detail below.

a. B Cell Epitope of IgE EMPD

The present disclosure is directed to a novel peptide composition for the generation of high titer polyclonal antibodies with specificity for the IgE EMPD peptide, with cross-reactivities to the membrane-bound IgE expressed on human B cells committed to the secretion of IgE. The site-specificity of the peptide composition through efforts of rational designs minimizes the generation of antibodies that are directed to irrelevant sites on carrier proteins.

Figure 1:
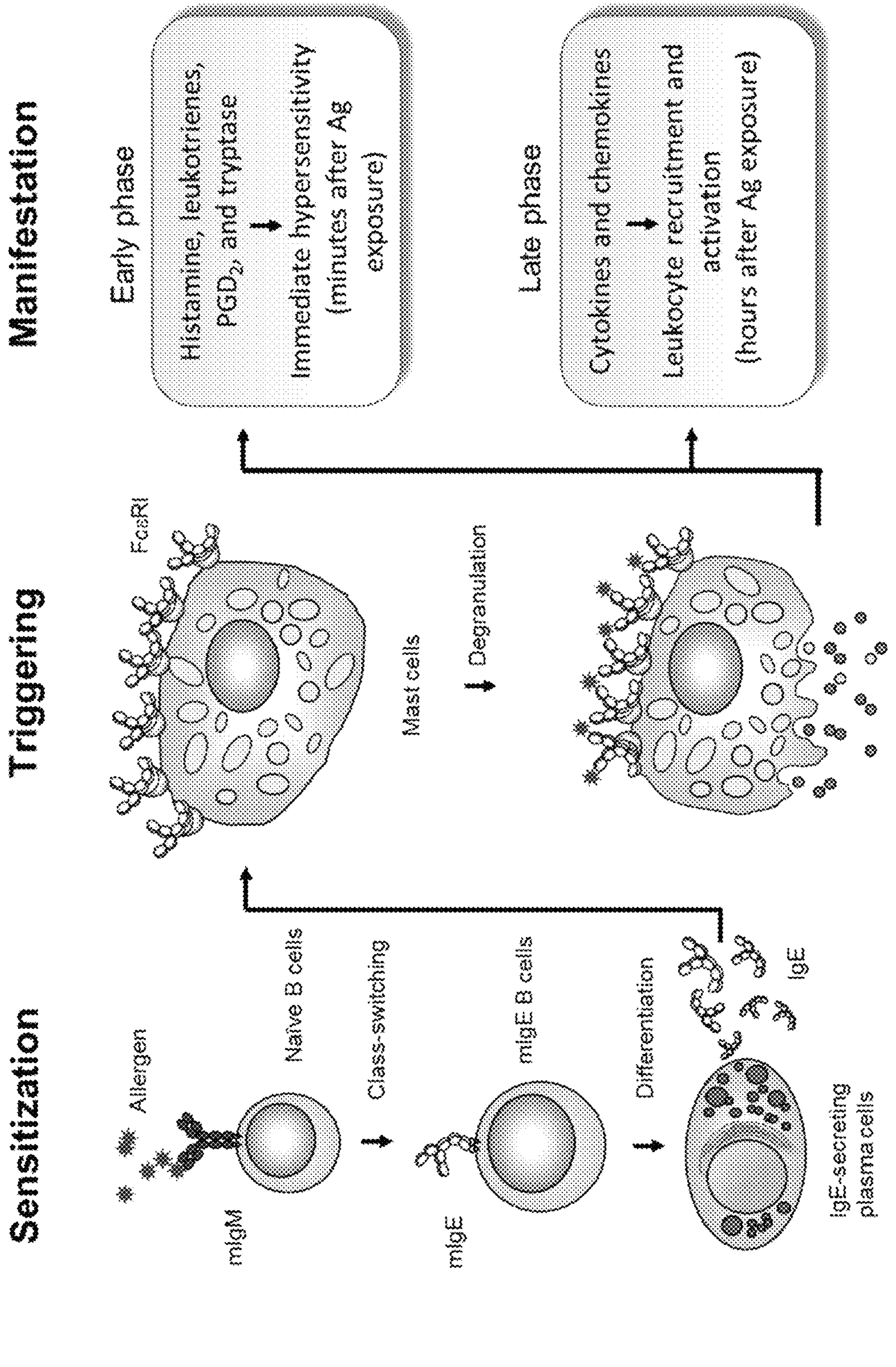
FIG. 1 is an illustration that depicts the mechanism of the IgE-mediated allergic disease pathway. Naïve mature B cells begin by expressing membrane-bound IgM (mIgE). Upon encountering an allergen, these cells become activated with the help of cognate helper T (TH) cells that provide the B cells with necessary co-stimulatory signals and cytokines. Activated allergen-specific B cells, helped by a plethora of cytokines, such as IL-4 and IL-13, become IgE-committed B cells expressing mIgE through class-switching recombination. Those IgE-committed B cells terminally differentiate into IgE-secreting plasma cells. Most of the IgE-secreting plasma cells are short-lived and migrate to the site of inflammation then die off; however, a few long-lived cells migrate to their corresponding niches in the bone marrow. The allergen-specific IgE that is secreted from the plasma cells binds to the high-affinity IgE.Fc receptor, FcεRI, on the surface of blood basophils and tissue mast cells. Allergen-induced aggregation of IgE bound to FcεRI stimulates basophil or mast cell degranulation and the release of mediators, such as histamine, leukotrienes, PGD2, tryptase, and various cytokines, which trigger immediate hypersensitivity and promote recruitment of various cell types, such as TH2 cells and eosinophils.
Figure 2A:
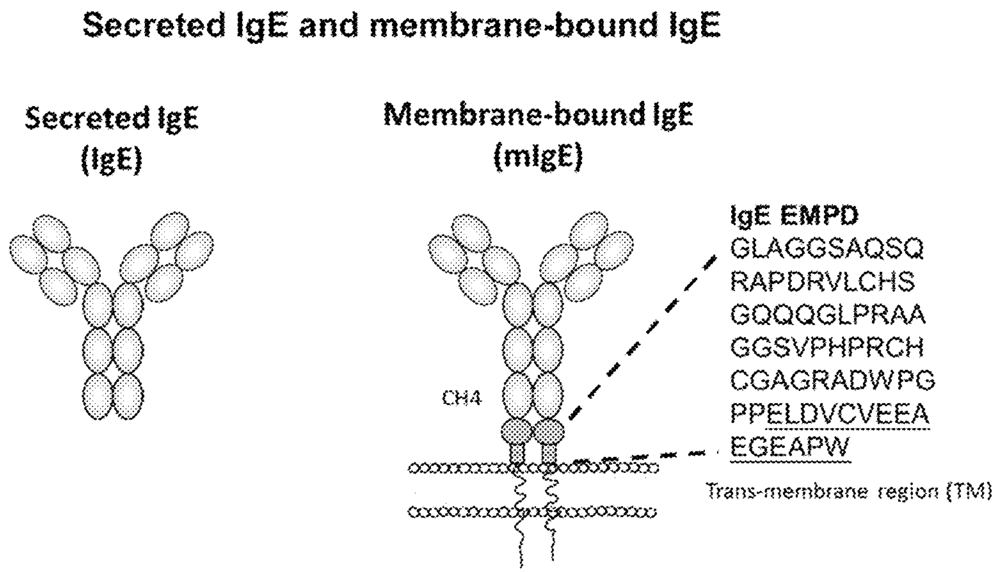
FIGS. 2A and 2B are illustrations showing the structural differences between secreted IgE and membrane bound IgE (mIgE) and the rationale of depleting mIgE B cells by targeting IgE EMPD.

The term "IgE", as used herein, refers to immunoglobulin E in any form, including secreted IgE, membrane-bound IgE, and fragments thereof. The secreted and membrane-bound forms of IgE are illustrated in FIG. 2A.

The term "mIgE", as used herein, refers specifically to the membrane-bound form of IgE and fragments thereof. In some embodiments, the mIgE is the membrane-bound form of IgE in humans having an amino acid sequence reported as Ig epsilon chain C region form 2-human (fragment); Accession Number PH1215. Membrane-bound IgE is illustrated in FIG. 2A (right side).

The term "IgE EMPD", as used herein, refers to the extracellular membrane proximal domain (EMPD) of membrane-bound IgE (mIgE) and fragments thereof. IgE EMPD is also referred to as CεmX, which is located between the CH4 domain and the C-terminal membrane-anchoring transmembrane peptide and is exclusively found on mIgE B cells. The EMPD of IgE results from an alternative splicing of the ε RNA transcript at 156-bp upstream of the splicing acceptor site used by the "short" isoform. The full-length "long" EMPD isoform of human IgE is 67 amino acids in length (SEQ ID NO: 1), which includes 52 amino acids (SEQ ID NO: 2) that are not present in the "short" isoform. Membrane-bound IgE is illustrated in FIG. 2A with the EMPD portion enhanced. The amino acid sequence of full-length IgE EMPD (SEQ ID NO: 1) and fragments thereof (SEQ ID NOs: 2-58 and 127) are shown in Table 1.

Figure 9:
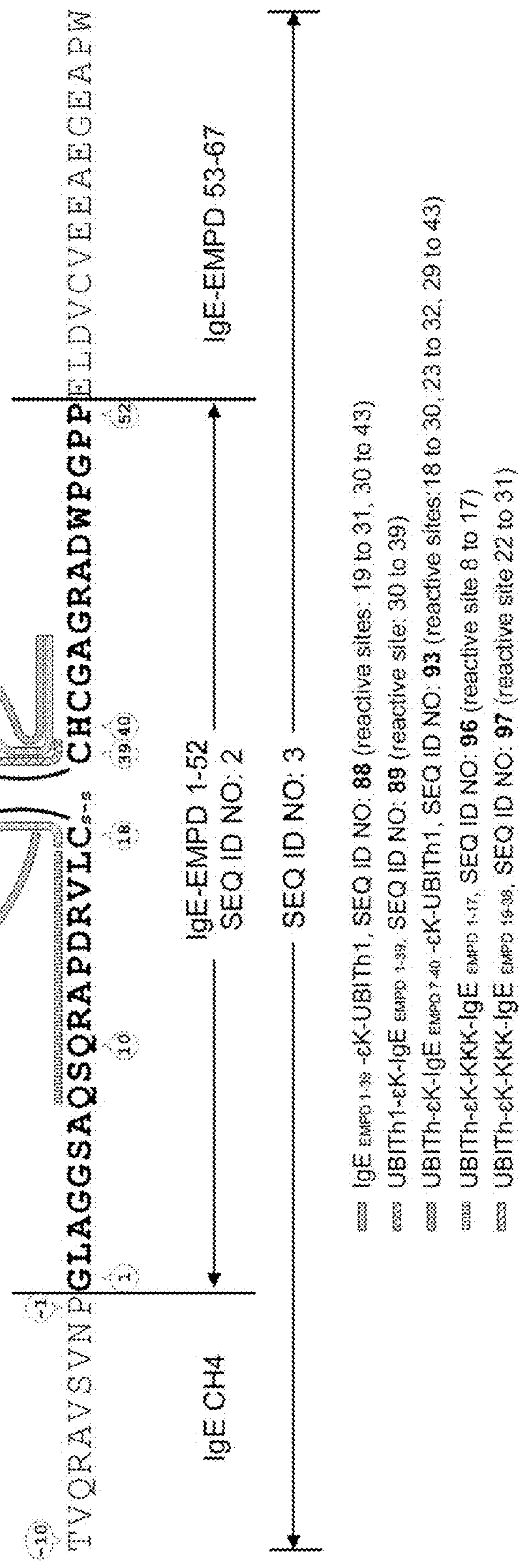
FIG. 9 is a schematic that illustrates epitope mapping for fine specificity analysis by ELISA using overlapping 10-mer peptides covering amino acids 9-50 of IgE EMPD by immune sera from guinea pigs. The predominant epitope recognized by antibodies in the serum samples was specific to the region representing the looped structure of IgE EMPD. This schematic illustrates an internal loop formed by an intramolecular disulfide bridge between amino acids C18 and C39 in the native IgE EMPD. Serum was diluted 1:1000 for epitope mapping. ELISA plates were coated with 10-mer peptides (0.5 μg peptide per well). Reactive sites were identified through epitope-mapping study using immune sera samples collected from guinea pigs previously immunized with immunogen constructs with SEQ ID NOs: 88, 89, 93, 96 and 97 and marked accordingly.

IgE EMPD contains an intra-molecular loop between endogenous cysteines (C18-C39), based on the amino acid numbering of the 67-amino acid and 52-amino acid sequences of IgE EMPD (SEQ ID NOs: 1 and 2, respectively). The internal intra-molecular loop of IgE is illustrated in FIG. 9.

The B cell epitope of the IgE EMPD peptide immunogen constructs contains the intra-molecular loop structure of IgE EMPD, or portions thereof. In certain embodiments, the B cell epitope contains from about 20 to about 40 amino acids of IgE EMPD.

In some embodiments, the amino acid sequence of the B cell epitope portion of the IgE EMPD peptide immunogen construct contains about 20 to about 40 amino acid residues from the full-length IgE EMPD (SEQ ID NO:1). In certain embodiments, the B cell epitope contains an amino acid sequence from the internal intra-molecular loop of IgE EMPD formed by endogenous cysteines (C18-C39) according to the numbering of the full-length IgE EMPD (SEQ ID NO: 1). In specific embodiments, the sequence of the B cell epitope ends with residue Arg (R) at 38, Cys (C) at 39, or His (H) at 40 at the C-terminus of the intra-molecular loop structure of IgE EMPD.

In some embodiments, the B cell epitope has an amino acid sequence of IgE EMPD-1-39 (SEQ ID NO: 5), IgE EMPD-7-40 (SEQ ID NO: 6), IgE EMPD-19-38 (SEQ ID NO: 8), or IgE EMPD-1-40 (SEQ ID NO: 9), as shown in Table 1.

The IgE EMPD fragment of the present disclosure also includes immunologically functional analogues or homologues of the IgE EMPD peptides (SEQ ID NOs: 5, 6, 8, and 9) and more than 20 amino acid fragments thereof. Functional immunological analogues or homologues of IgE EMPD peptide and more than 20 amino acid fragments thereof include variants that retain substantially the same immunogenicity as the original peptide. Immunologically functional analogues can have a conservative substitution in an amino acid position; a change in overall charge; a covalent attachment to another moiety; or amino acid additions, insertions, or deletions; and/or any combination thereof.

b. Heterologous T Helper Cell Epitopes (Th Epitopes)

The present disclosure provides peptide immunogen constructs containing a B cell epitope from IgE EMPD covalently linked to a heterologous T helper cell (Th) epitope directly or through an optional heterologous spacer.

The heterologous Th epitope in the IgE EMPD peptide immunogen construct enhances the immunogenicity of the IgE EMPD fragment, which facilitates the production of specific high titer antibodies directed against the optimized target B cell epitope (i.e., the IgE EMPD fragment) through rational design.

The term "heterologous", as used herein, refers to an amino acid Sequence that is derived from an amino acid Sequence that is not part of, or homologous with, the wild-type Sequence of IgE EMPD. Thus, a heterologous Th epitope is a Th epitope derived from an amino acid Sequence that is not naturally found in IgE EMPD (i.e., the Th epitope is not autologous to IgE EMPD). Since the Th epitope is heterologous to IgE EMPD, the natural amino acid sequence of IgE EMPD is not extended in either the N-terminal or C-terminal directions when the heterologous Th epitope is covalently linked to the IgE EMPD fragment.

The heterologous Th epitope of the present disclosure can be any Th epitope that does not have an amino acid sequence naturally found in IgE EMPD. The Th epitope can also have promiscuous binding motifs to MHC class II molecules of multiple species. In certain embodiments, the Th epitope comprises multiple promiscuous MHC class II binding motifs to allow maximal activation of T helper cells leading to initiation and regulation of immune responses. The Th epitope is preferably immunosilent on its own, i.e. little, if any, of the antibodies generated by the IgE EMPD peptide immunogen constructs will be directed towards the Th epitope, thus allowing a very focused immune response directed to the targeted B cell epitope of the IgE EMPD fragment.

Th epitopes of the present disclosure include, but are not limited to, amino acid sequences derived from foreign pathogens, as exemplified in Table 2 (SEQ ID NOs: 59-87). Further, Th epitopes include idealized artificial Th epitopes and combinatorial idealized artificial Th epitopes (e.g., SEQ ID NOs: 60 and 67-73). The heterologous Th epitope peptides presented as a combinatorial sequence (e.g., SEQ ID NOs: 68-71), contain a mixture of amino acid residues represented at specific positions within the peptide framework based on the variable residues of homologues for that particular peptide. An assembly of combinatorial peptides can be synthesized in one process by adding a mixture of the designated protected amino acids, instead of one particular amino acid, at a specified position during the synthesis process. Such combinatorial heterologous Th epitope peptides assemblies can allow broad Th epitope coverage for animals having a diverse genetic background. Representative combinatorial sequences of heterologous Th epitope peptides include SEQ ID NOs: 68-71 which are shown in Table 2. Th epitope peptides of the present invention provide broad reactivity and immunogenicity to animals and patients from genetically diverse populations.

IgE EMPD peptide immunogen constructs comprising Th epitopes are produced simultaneously in a single solid-phase peptide synthesis in tandem with the IgE EMPD fragment. Th epitopes also include immunological analogues of Th epitopes. Immunological Th analogues include immune-enhancing analogs, cross-reactive analogues and segments of any of these Th epitopes that are sufficient to enhance or stimulate an immune response to the IgE EMPD fragments.

Functional immunologically analogues of the Th epitope peptides are also effective and included as part of the present invention. Functional immunological Th analogues can include conservative substitutions, additions, deletions and insertions of from one to about five amino acid residues in the Th epitope which do not essentially modify the Th-stimulating function of the Th epitope. The conservative substitutions, additions, and insertions can be accomplished with natural or non-natural amino acids, as described above for the IgE EMPD fragments. Table 2 identifies another variation of a functional analogue for Th epitope peptide. In particular, SEQ ID NOs: 60 and 67 of MvF1 and MvF2 Th are functional analogues of SEQ ID NOs: 70 and 72 of MvF4 and MvF5 in that they differ in the amino acid frame by the deletion (SEQ ID NOs: 60 and 67) or the inclusion (SEQ ID NOs: 70 and 72) of two amino acids each at the N- and C-termini. The differences between these two series of analogous sequences would not affect the function of the Th epitopes contained within these sequences. Therefore, functional immunological Th analogues include several versions of the Th epitope derived from Measles Virus Fusion protein MvF1-4 Ths (SEQ ID NOs: 60, 67, 68, 70, and 72) and from Hepatitis Surface protein HBsAg 1-3 Ths (SEQ ID NOs: 69, 71, and 73).

The Th epitope in the IgE EMPD peptide immunogen construct can be covalently linked at either N- or C-terminal end of the IgE EMPD peptide fragment. In some embodiments, the Th epitope is covalently linked to the N-terminal end of the IgE EMPD peptide fragment. In other embodiments, the Th epitope is covalently linked to the C-terminal end of the IgE EMPD peptide fragment. In certain embodiments, more than one Th epitope is covalently linked to the IgE EMPD fragment. When more than one Th epitope is linked to the IgE EMPD fragment, each Th epitope can have the same amino acid Sequence or different amino acid Sequences. In addition, when more than one Th epitope is linked to the IgE EMPD fragment, the Th epitopes can be arranged in any order. For example, the Th epitopes can be consecutively linked to the N-terminal end of the IgE EMPD fragment, or consecutively linked to the C-terminal end of the IgE EMPD fragment, or a Th epitope can be covalently linked to the N-terminal end of the IgE EMPD fragment while a separate Th epitope is covalently linked to the C-terminal end of the IgE EMPD fragment. There is no limitation in the arrangement of the Th epitopes in relation to the IgE EMPD fragment.

In some embodiments, the Th epitope is covalently linked to the IgE EMPD fragment directly. In other embodiments, the Th epitope is covalently linked to the IgE EMPD fragment through a heterologous spacer described in further detail below.

c. Heterologous Spacer

The disclosed IgE EMPD peptide immunogen constructs optionally contain a heterologous spacer that covalently links the B cell epitope from IgE EMPD to the heterologous T helper cell (Th) epitope.

As discussed above, the term "heterologous", refers to an amino acid sequence that is derived from an amino acid sequence that is not part of, or homologous with, the natural type sequence of IgE EMPD. Thus, the natural amino acid sequence of IgE EMPD is not extended in either the N-terminal or C-terminal directions when the heterologous spacer is covalently linked to the B cell epitope from IgE EMPD because the spacer is heterologous to the IgE EMPD sequence.

The spacer is any molecule or chemical structure capable of linking two amino acids and/or peptides together. The spacer can vary in length or polarity depending on the application. The spacer attachment can be through an amide- or carboxyl-linkage but other functionalities are possible as well. The spacer can include a chemical compound, a naturally occurring amino acid, or a non-naturally occurring amino acid.

The spacer can provide structural features to the IgE EMPD peptide immunogen construct. Structurally, the spacer provides a physical separation of the Th epitope from the B cell epitope of the IgE EMPD fragment. The physical separation by the spacer can disrupt any artificial secondary structures created by joining the Th epitope to the B cell epitope. Additionally, the physical separation of the epitopes by the spacer can eliminate interference between the Th cell and/or B cell responses. Furthermore, the spacer can be designed to create or modify a secondary structure of the peptide immunogen construct. For example, a spacer can be designed to act as a flexible hinge to enhance the separation of the Th epitope and B cell epitope. A flexible hinge spacer can also permit more efficient interactions between the presented peptide immunogen and the appropriate Th cells and B cells to enhance the immune responses to the Th epitope and B cell epitope. Examples of sequences encoding flexible hinges are found in the immunoglobulin heavy chain hinge region, which are often proline rich. One particularly useful flexible hinge that can be used as a spacer is provided by the sequence Pro-Pro-Xaa-Pro-Xaa-Pro (SEQ ID NO: 128), where Xaa is any amino acid, and preferably aspartic acid.

The spacer can also provide functional features to the IgE EMPD peptide immunogen construct. For example, the spacer can be designed to change the overall charge of the IgE EMPD peptide immunogen construct, which can affect the solubility of the peptide immunogen construct. Additionally, changing the overall charge of the IgE EMPD peptide immunogen construct can affect the ability of the peptide immunogen construct to associate with other compounds and reagents. As discussed in further detail below, the IgE EMPD peptide immunogen construct can be formed into a stable immunostimulatory complex with a highly charged oligonucleotide, such as CpG oligomers through electrostatic association. The overall charge of the IgE EMPD peptide immunogen construct is important for the formation of these stable immunostimulatory complexes.

Chemical compounds that can be used as a spacer include, but are not limited to, (2-aminoethoxy) acetic acid (AEA), 5-aminovaleric acid (AVA), 6-aminocaproic acid (Ahx), 8-amino-3,6-dioxaoctanoic acid (AEEA, mini-PEG1), 12-amino-4,7,10-trioxadodecanoic acid (mini-PEG2), 15-amino-4,7,10,13-tetraoxapenta-decanoic acid (mini-PEG3), trioxatridecan-succinamic acid (Ttds), 12-amino-dodecanoic acid, Fmoc-5-amino-3-oxapentanoic acid (O1Pen), and the like.

Naturally-occurring amino acids include alanine, arginine, asparagine, aspartic acid, cysteine, glutamic acid, glutamine, glycine, histidine, isoleucine, leucine, lysine, methionine, phenylalanine, proline, serine, threonine, tryptophan, tyrosine and valine.

Non-naturally occurring amino acids include, but are not limited to, ε-N Lysine, ß-alanine, ornithine, norleucine, norvaline, hydroxyproline, thyroxine, γ-amino butyric acid, homoserine, citrulline, aminobenzoic acid, 6-aminocaproic acid (Aca; 6-Aminohexanoic acid), hydroxyproline, mercaptopropionic acid (MPA), 3-nitro-tyrosine, pyroglutamic acid, and the like.

The spacer in the IgE EMPD peptide immunogen construct can be covalently linked at either N- or C-terminal end of the Th epitope and the IgE EMPD peptide. In some embodiments, the spacer is covalently linked to the C-terminal end of the Th epitope and to the N-terminal end of the IgE EMPD peptide. In other embodiments, the spacer is covalently linked to the C-terminal end of the IgE EMPD peptide and to the N-terminal end of the Th epitope. In certain embodiments, more than one spacer can be used, for example, when more than one Th epitope is present in the peptide immunogen construct. When more than one spacer is used, each spacer can be the same as each other or different. Additionally, when more than one Th epitope is present in the peptide immunogen construct, the Th epitopes can be separated with a spacer, which can be the same as, or different from, the spacer used to separate the Th epitope from the B cell epitope. There is no limitation in the arrangement of the spacer in relation to the Th epitope or the IgE EMPD fragment.

In certain embodiments, the heterologous spacer is a naturally occurring amino acid or a non-naturally occurring amino acid. In other embodiments, the spacer contains more than one naturally occurring or non-naturally occurring amino acid. In specific embodiments, the spacer is Lys-, Gly-, Lys-Lys-Lys-, (α, ε-N) Lys, or ε-N-Lys-Lys-Lys-Lys (SEQ ID NO: 129).

d. Specific Embodiments of the IgE EMPD Peptide Immunogen Constructs

In certain embodiments, the IgE EMPD peptide immunogen constructs can be represented by the following formulae:

$(Th)_m$-$(A)_n$-(IgE EMPD fragment)-X or (IgE EMPD fragment)-$(A)_n$-$(Th)_m$-X or $(Th)_m$-$(A)_n$-(IgE EMPD fragment)-$(A)_n$-$(Th)_m$-X wherein Th is a heterologous T helper epitope;

A is a heterologous spacer;

(IgE EMPD fragment) is a B cell epitope having about 20 to about 40 amino acid residues from IgE EMPD;

X is an α-COOH or α-$CONH_2$ of an amino acid;

m is from 1 to about 4; and n is from 0 to about 10.

In certain embodiments, the heterologous Th epitope in the IgE EMPD peptide immunogen construct has an amino acid sequence selected from any of SEQ ID NOs: 59-87 and combinations thereof, shown in Table 2. In some embodiments, the IgE EMPD peptide immunogen construct contains more than one Th epitope.

In certain embodiments, the optional heterologous spacer is selected from any of Lys-, Gly-, Lys-Lys-Lys-, (α, ε-N) Lys, ε-N-Lys-Lys-Lys-Lys (SEQ ID NO: 129), and combinations thereof. In specific embodiments, the heterologous spacer is ε-N-Lys-Lys-Lys-Lys (SEQ ID NO: 129).

In certain embodiments, the IgE EMPD fragment has about 20 to about 40 amino acid residues from IgE EMPD of SEQ ID NO: 1 or 2. In specific embodiments, the IgE EMPD fragment contains an amino acid sequence from the internal intra-molecular loop of IgE EMPD formed by endogenous cysteines (C18-C39) according to the numbering of the full-length IgE EMPD (SEQ ID NO: 1). In specific embodiments, the IgE EMPD fragment has an amino acid sequence of IgE EMPD-1-39 (SEQ ID NO: 5), IgE EMPD-7-40 (SEQ ID NO: 6), IgE EMPD-19-38 (SEQ ID NO: 8), or IgE EMPD-1-40 (SEQ ID NO: 9), as shown in Table 1.

In certain embodiments, the IgE EMPD peptide immunogen construct has an amino acid sequence selected from any of SEQ ID NOs: 88-130, as shown in Table 3. In specific embodiments, the IgE EMPD peptide immunogen construct has an amino acid sequence selected from any of SEQ ID NOs: 88-95, 98-124, and 130.

e. Variants, Homologues, and Functional Analogues

Variants and analogs of the above immunogenic peptides that induce and/or cross-react with antibodies to the preferred epitopes of IgE EMPD can also be used. Analogs, including allelic, species, and induced variants, typically differ from naturally occurring peptides at one, two, or a few positions, often by virtue of conservative substitutions. Analogs typically exhibit at least 80 or 90% sequence identity with natural peptides. Some analogs also include unnatural amino acids or modifications of N- or C-terminal amino acids at one, two, or a few positions.

Variants that are functional analogues can have a conservative substitution in an amino acid position; a change in overall charge; a covalent attachment to another moiety; or amino acid additions, insertions, or deletions; and/or any combination thereof.

Conservative substitutions are when one amino acid residue is substituted for another amino acid residue with similar chemical properties. For example, the nonpolar (hydrophobic) amino acids include alanine, leucine, isoleucine, valine, proline, phenylalanine, tryptophan and methionine; the polar neutral amino acids include glycine, serine, threonine, cysteine, tyrosine, asparagine, and glutamine; the positively charged (basic) amino acids include arginine, lysine and histidine; and the negatively charged (acidic) amino acids include aspartic acid and glutamic acid.

In a particular embodiment, the functional analogue has at least 50% identity to the original amino acid sequence. In another embodiment, the functional analogue has at least 80% identity to the original amino acid sequence. In yet another embodiment, the functional analogue has at least 85% identity to the original amino acid sequence. In still another embodiment, the functional analogue has at least 90% identity to the original amino acid sequence.

Variants also include variations to the phosphorylated residues. For example, variants can include different residues within the peptides that are phosphorylated. Variant immunogenic IgE EMPD peptides can also include pseudo-phosphorylated peptides. The pseudo-phosphorylated peptides are generated by substituting one or more of the phosphorylated serine, threonine, and tyrosine residues of the IgE EMPD peptides with acidic amino acid residues such as glutamic acid and aspartic acid.

Compositions

The present disclosure also provides compositions comprising the disclosed IgE EMPD immunogen construct.

a. Peptide Compositions

Compositions containing the disclosed IgE EMPD peptide immunogen construct can be in liquid or solid form. Liquid compositions can include water, buffers, solvents, salts, and/or any other acceptable reagent that does not alter the structural or functional properties of the IgE EMPD peptide immunogen construct. Peptide compositions can contain one or more of the disclosed IgE EMPD peptide immunogen constructs.

b. Pharmaceutical Compositions

The present disclosure is also directed to pharmaceutical compositions containing the disclosed IgE EMPD peptide immunogen construct.

Pharmaceutical compositions can contain carriers and/or other additives in a pharmaceutically acceptable delivery system. Accordingly, pharmaceutical compositions can contain a pharmaceutically effective amount of an IgE EMPD peptide immunogen construct together with pharmaceutically-acceptable carrier, adjuvant, and/or other excipients such as diluents, additives, stabilizing agents, preservatives, solubilizing agents, buffers, and the like.

Pharmaceutical compositions can contain one or more adjuvant that act(s) to accelerate, prolong, or enhance the immune response to the IgE EMPD peptide immunogen construct without having any specific antigenic effect itself. Adjuvants used in the pharmaceutical composition can include oils, oil emulsions, aluminum salts, calcium salts, immune stimulating complexes, bacterial and viral derivatives, virosomes, carbohydrates, cytokines, polymeric microparticles. In certain embodiments, the adjuvant can be selected from alum (potassium aluminum phosphate), aluminum phosphate (e.g. ADJU-PHOS®), aluminum hydroxide (e.g. ALHYDROGEL®), calcium phosphate, incomplete Freund's adjuvant (IFA), Freund's complete adjuvant, MF59, adjuvant 65, Lipovant, ISCOM, liposyn, saponin, squalene, L121, Emulsigen®, monophosphoryl lipid A (MPL), Quil A, QS21, MONTANIDE® ISA 35, ISA 50V, ISA 50V2, ISA 51, ISA 206, ISA 720, liposomes, phospholipids, peptidoglycan, lipopolysaccahrides (LPS), ASO1, ASO2, ASO3, ASO4, AF03, lipophilic phospholipid (lipid A), gamma inulin, algammulin, glucans, dextrans, glucomannons, galactomannans, levans, xylans, dimethyldioctadecylammonium bromide (DDA), as well as the other adjuvants and emulsifiers.

In some embodiments, the pharmaceutical composition contains Montanide™ ISA 51 (an oil adjuvant composition comprised of vegetable oil and mannide oleate for production of water-in-oil emulsions), Tween® 80 (also known as: Polysorbate 80 or Polyoxyethylene (20) sorbitan monooleate), a CpG oligonucleotide, and/or any combination thereof. In other embodiments, the pharmaceutical composition is a water-in-oil-in-water (i.e. w/o/w) emulsion with Emulsigen or Emulsigen D as the adjuvant.

Pharmaceutical compositions can also include pharmaceutically acceptable additives or excipients. For example, pharmaceutical compositions can contain antioxidants, binders, buffers, bulking agents, carriers, chelating agents, coloring agents, diluents, disintegrants, emulsifying agents, fillers, gelling agents, pH buffering agents, preservatives, solubilizing agents, stabilizers, and the like.

Pharmaceutical compositions can be formulated as immediate release or for sustained release formulations. Additionally the pharmaceutical compositions can be formulated for induction of systemic, or localized mucosal, immunity through immunogen entrapment and co-administration with microparticles. Such delivery systems are readily determined by one of ordinary skill in the art.

Pharmaceutical compositions can be prepared as injectables, either as liquid solutions or suspensions. Liquid vehicles containing the IgE EMPD peptide immunogen construct can also be prepared prior to injection. The pharmaceutical composition can be administered by any suitable mode of application, for example, i.d., i.v., i.p., i.m., intranasally, orally, subcutaneously, etc. and in any suitable delivery device. In certain embodiments, the pharmaceutical composition is formulated for intravenous, subcutaneous, intradermal, or intramuscular administration. Pharmaceutical compositions suitable for other modes of administration can also be prepared, including oral and intranasal applications.

Pharmaceutical compositions can also formulated in a suitable dosage unit form. In some embodiments, the pharmaceutical composition contains from about 0.1 μg to about 1 mg of the IgE EMPD peptide immunogen construct per kg body weight. Effective doses of the pharmaceutical compositions vary depending upon many different factors, including means of administration, target site, physiological state of the patient, whether the patient is human or an animal, other medications administered, and whether treatment is prophylactic or therapeutic.

Usually, the patient is a human but nonhuman mammals including transgenic mammals can also be treated. When delivered in multiple doses, the pharmaceutical compositions may be conveniently divided into an appropriate amount per dosage unit form. The administered dosage will depend on the age, weight and general health of the subject as is well known in the therapeutic arts.

In some embodiments, the pharmaceutical composition contains more than one IgE EMPD peptide immunogen construct. A pharmaceutical composition containing a mixture of more than one IgE EMPD peptide immunogen construct to allow for synergistic enhancement of the immunoefficacy of the constructs. Pharmaceutical compositions containing more than one IgE EMPD peptide immunogen construct can be more effective in a larger genetic population due to a broad MHC class II coverage thus provide an improved immune response to the IgE EMPD peptide immunogen constructs.

In some embodiments, the pharmaceutical composition contains an IgE EMPD peptide immunogen construct selected from SEQ ID NOs: 88-95, 98-124, and 130 (Table 3), as well as homologues, analogues and/or combinations thereof.

In certain embodiments, IgE EMPD peptide immunogen constructs (SEQ ID NOs: 107 and 108) with heterologous Th epitopes derived from MVF and HBsAg in a combinatorial form (SEQ ID NOs: 68 and 69) were mixed in an equimolar ratio for use in a vaccine formulation to allow for maximal coverage of the vaccine host population having a diverse genetic background. Synergistic enhancement in IgE EMPD G1-C39 and A7-C40 immunogen constructs (SEQ ID NOs: 88 to 95) was observed in the peptide compositions of this invention and the antibody response elicited by such constructs (e.g. SEQ ID NO: 95) was mostly (>90%) focused on the desired cross-reactivity against the B cell epitope peptide of IgE EMPD (SEQ ID NO: 2) without much, if any, directed to the heterologous Th epitopes employed for immunogenicity enhancement (Example 7, Table 7). This is in sharp contrast to the conventional protein such as KLH or other biological protein carriers used for such peptide antigenicity enhancement.

In other embodiments, pharmaceutical compositions comprising a peptide composition of for example a mixture of the IgE EMPD peptide immunogen constructs in contact with mineral salts including Alum gel (ALHYDROGEL) or Aluminum phosphate (ADJUPHOS) as adjuvant to form a suspension vaccine formulation was used for administration to vaccine hosts.

Pharmaceutical compositions containing an IgE EMPD peptide immunogen construct can be used to elicit an immune response and produce antibodies in a host upon administration.

c. Immunostimulatory Complexes

The present disclosure is also directed to pharmaceutical compositions containing an IgE EMPD peptide immunogen construct in the form of an immunostimulatory complex with a CpG oligonucleotide. Such immunostimulatory complexes are specifically adapted to act as an adjuvant and as a peptide immunogen stabilizer. The immunostimulatory complexes are in the form of a particulate, which can efficiently present the IgE EMPD peptide immunogen to the cells of the immune system to produce an immune response. The immunostimulatory complexes may be formulated as a suspension for parenteral administration. The immunostimulatory complexes may also be formulated in the form of w/o emulsions, as a suspension in combination with a mineral salt or with an in-situ gelling polymer for the efficient delivery of the IgE EMPD peptide immunogen to the cells of the immune system of a host following parenteral administration.

The stabilized immunostimulatory complex can be formed by complexing an IgE EMPD peptide immunogen construct with an anionic molecule, oligonucleotide, polynucleotide, or combinations thereof via electrostatic association. The stabilized immunostimulatory complex may be incorporated into a pharmaceutical composition as an immunogen delivery system.

In certain embodiments, the IgE EMPD peptide immunogen construct is designed to contain a cationic portion that is positively charged at a pH in the range of 5.0 to 8.0. The net charge on the cationic portion of the IgE EMPD peptide immunogen construct, or mixture of constructs, is calculated by assigning a +1 charge for each lysine (K), arginine (R) or histidine (H), a −1 charge for each aspartic acid (D) or glutamic acid (E) and a charge of 0 for the other amino acid within the sequence. The charges are summed within the cationic portion of the IgE EMPD peptide immunogen construct and expressed as the net average charge. A suitable peptide immunogen has a cationic portion with a net average positive charge of +1. Preferably, the peptide immunogen has a net positive charge in the range that is larger than +2. In some embodiments, the cationic portion of the IgE EMPD peptide immunogen construct is the heterologous spacer. In certain embodiments, the cationic portion of the IgE EMPD peptide immunogen construct has a charge of +4 when the spacer sequence is (α, ε-N) Lys, ε-N-Lys-Lys-Lys-Lys (SEQ ID NO: 129).

An "anionic molecule" as described herein refers to any molecule that is negatively charged at a pH in the range of 5.0-8.0. In certain embodiments, the anionic molecule is an oligomer or polymer. The net negative charge on the oligomer or polymer is calculated by assigning a −1 charge for each phosphodiester or phosphorothioate group in the oligomer. A suitable anionic oligonucleotide is a single-stranded DNA molecule with 8 to 64 nucleotide bases, with the number of repeats of the CpG motif in the range of 1 to 10. Preferably, the CpG immunostimulatory single-stranded DNA molecules contain 18-48 nucleotide bases, with the number of repeats of CpG motif in the range of 3 to 8.

More preferably the anionic oligonucleotide is represented by the formula: 5' $X^1CGX^2$ 3' wherein C and G are unmethylated; and $X^1$ is selected from the group consisting of A (adenine), G (guanine) and T (thymine); and $X^2$ is C (cytosine) or T (thymine). Or, the anionic oligonucleotide is represented by the formula: 5' $(X^3)_2CG(X^4)_2$ 3' wherein C and G are unmethylated; and $X^3$ is selected from the group consisting of A, T or G; and $X^4$ is C or T.

The resulting immunostimulatory complex is in the form of particles with a size typically in the range from 1-50 microns and is a function of many factors including the relative charge stoichiometry and molecular weight of the interacting species. The particulated immunostimulatory complex has the advantage of providing adjuvantation and upregulation of specific immune responses in vivo. Additionally, the stabilized immunostimulatory complex is suitable for preparing pharmaceutical compositions by various processes including water-in-oil emulsions, mineral salt suspensions and polymeric gels.

The present disclosure is also directed to pharmaceutical compositions, including vaccine formulations, for treatment and prevention of IgE mediated allergic diseases. In some embodiments, pharmaceutical compositions comprising a stabilized immunostimulatory complex, which is formed through mixing a CpG oligomer with a peptide composition containing a mixture of the IgE EMPD peptide immunogen constructs (e.g., SEQ ID NOs: 88-95, 98-124, and 130) through electrostatic association, to further enhance the IgE EMPD peptide immunogenicity and elicit antibodies against the IgE EMPD peptide of SEQ ID NOs: 1 or 2 to bind to mIgE-expressing B cells and induce their Antibody-Dependent Cellular Cytotoxicity (ADCC) and Apoptosis (Example 6).

In yet other embodiments, pharmaceutical compositions contain a mixture of the IgE EMPD peptide immunogen constructs (e.g., any combination of SEQ ID NOs: 8-90, 94, 95, 98-124, and 130) in the form of a stabilized immunostimulatory complex with CpG oligomers that are, optionally, mixed with mineral salts, including Alum gel (ALHYDROGEL) or Aluminum phosphate (ADJUPHOS) as an adjuvant with high safety factor, to form a suspension vaccine formulation for administration to vaccine hosts.

Antibodies

The present disclosure also provides antibodies elicited by the IgE EMPD peptide immunogen construct.

The present disclosure provides IgE EMPD peptide immunogen constructs and formulations thereof, cost effective in manufacturing, optimal in their design that are capable of eliciting high titer antibodies targeting the membrane-bound IgE that is capable of breaking the immune tolerance against self-antigen with a high responder rate in vaccinated hosts. The antibodies generated by the IgE EMPD peptide immunogen constructs have high affinity towards the IgE-EMPD protein either as a soluble peptide, a fusion protein, or IgE present on the IgE bearing B cells. The generated antibodies are capable of binding and cross-linking the IgE BCR on mIgE-expressing B lymphocytes to induce cytolytic effects like apoptosis and ADCC. Apoptotic depletion of membrane bound IgE B lymphocytes further results in reduction of serum IgE production. Therefore, targeting human mIgE B cells with apoptosis-inducing IgE EMPD specific antibodies generated by the disclosed IgE EMPD peptide immunogen constructs and formulations thereof provide a novel therapy for, and vaccine against, IgE mediated allergic diseases.

In some embodiments, IgE EMPD peptide immunogen constructs for eliciting antibodies comprise a hybrid of an IgE EMPD peptide having a B cell epitope containing between 20 to 40 amino acids covering the central intramolecular loop structure derived from the IgE EMPD peptide (SEQ ID NO: 1) (e.g., IgE EMPD peptides of IgE EMPD G1-C39 (SEQ ID NO: 5), IgE EMPD A7-H40 (SEQ ID NO: 6), IgE EMPD H19-R38 (SEQ ID NO: 8), and IgE EMPD G1-H40 (SEQ ID NO: 9)) linked to a heterologous Th epitope derived from pathogenic proteins such as Measles Virus Fusion (MVF) protein (SEQ ID NO: 73) and others (SEQ ID NOs: 59 to 87) through an optional spacer. The B cell epitope and Th epitope of the IgE EMPD peptide immunogen constructs act together to stimulate the generation of highly specific antibodies cross-reactive with the IgE EMPD 1-52 peptide (SEQ ID NO: 2), IgE EMPD 1-67 protein (SEQ ID NO: 1), either as a recombinant IgE EMPD-containing protein (e.g., purified from a stable Flp-In CHO cell line transfected with recombinant DNA encoding the Fc portion of human IgG1 and the IgE EMPD of human membrane-bound IgE, γ1-em67) or on the membrane of a membrane-bound IgE bearing cell (e.g., a Ramos cell line transfected with recombinant DNA encoding mIgE.FcL).

Traditional methods for immunopotentiating a peptide, such as through chemical coupling to a carrier protein, for example, Keyhole Limpet Hemocyanin (KLH) or other carrier proteins such as Diphtheria toxoid (DT) and Tetanus Toxoid (TT) proteins, typically result in the generation of a large amount of antibodies directed against the carrier protein. Thus, a major deficiency of such peptide-carrier protein vaccines is that most (>90%) of antibodies generated by the immunogen are the non-functional antibodies directed against the carrier protein KLH, DT or TT, which can lead to epitopic suppression.

Unlike the traditional method for immunopotentiating a peptide, the antibodies generated by the disclosed IgE EMPD peptide immunogen constructs bind with highly specificity to the IgE EMPD fragment with little, if any, antibodies directed against the heterologous Th epitope or optional heterologous spacer. In particular, the polyclonal antibodies elicited in vaccinated animals bind, with high specificity, to the central region covering a loop structure of the IgE EMPD, shown in FIG. 9.

Methods

The present disclosure is also directed to methods for making and using the IgE EMPD peptide immunogen constructs, compositions, and pharmaceutical compositions.

a. Methods for Manufacturing the IgE EMPD Peptide Immunogen Construct

The IgE EMPD peptide immunogen constructs of this disclosure can be made by chemical synthesis methods well known to the ordinarily skilled artisan (see, e.g., Fields et al., Chapter 3 in Synthetic Peptides: A User's Guide, ed. Grant, W. H. Freeman & Co., New York, NY, 1992, p. 77). The IgE EMPD peptide immunogen constructs can be synthesized using the automated Merrifield techniques of solid phase synthesis with the α-NH2 protected by either t-Boc or F-moc chemistry using side chain protected amino acids on, for example, an Applied Biosystems Peptide Synthesizer Model 430A or 431. Preparation of IgE EMPD peptide immunogen constructs comprising combinatorial library peptides for Th epitopes can be accomplished by providing a mixture of alternative amino acids for coupling at a given variable position.

After complete assembly of the desired IgE EMPD peptide immunogen construct, the resin can be treated according to standard procedures to cleave the peptide from the resin and the functional groups on the amino acid side chains can be deblocked. The free peptide can be purified by HPLC and characterized biochemically, for example, by amino acid analysis or by sequencing. Purification and characterization methods for peptides are well known to one of ordinary skill in the art.

The quality of peptides produced by this chemical process can be controlled and defined and, as a result, reproducibility of IgE EMPD peptide immunogen constructs, immunogenicity, and yield can be assured. Detailed description of the manufacturing of the IgE EMPD peptide immunogen construct through solid phase peptide synthesis is shown in Example 1.

The range in structural variability that allows for retention of an intended immunological activity has been found to be far more accommodating than the range in structural variability allowed for retention of a specific drug activity by a small molecule drug or the desired activities and undesired toxicities found in large molecules that are co-produced with biologically-derived drugs. Thus, peptide analogues, either intentionally designed or inevitably produced by errors of the synthetic process as a mixture of deletion sequence byproducts that have chromatographic and immunologic properties similar to the intended peptide, are frequently as effective as a purified preparation of the desired peptide. Designed analogues and unintended analogue mixtures are effective as long as a discerning QC procedure is developed to monitor both the manufacturing process and the product evaluation process so as to guarantee the reproducibility and efficacy of the final product employing these peptides.

The IgE EMPD peptide immunogen constructs can also be made using recombinant DNA technology including nucleic acid molecules, vectors, and/or host cells. As such, nucleic acid molecules encoding the IgE EMPD peptide immunogen construct and immunologically functional analogues thereof are also encompassed by the present disclosure as part of the present invention. Similarly, vectors, including expression vectors, comprising nucleic acid molecules as well as host cells containing the vectors are also encompassed by the present disclosure as part of the present invention.

Various exemplary embodiments also encompass methods of producing the IgE EMPD peptide immunogen construct and immunologically functional analogues thereof. For example, methods can include a step of incubating a host cell containing an expression vector containing a nucleic acid molecule encoding an IgE EMPD peptide immunogen construct and/or immunologically functional analogue thereof under such conditions where the peptide and/or analogue is expressed. The longer synthetic peptide immunogens can be synthesized by well-known recombinant DNA techniques. Such techniques are provided in well-known standard manuals with detailed protocols. To construct a gene encoding a peptide of this invention, the amino acid sequence is reverse translated to obtain a nucleic acid sequence encoding the amino acid sequence, preferably with codons that are optimum for the organism in which the gene is to be expressed. Next, a synthetic gene is made typically by synthesizing oligonucleotides which encode the peptide and any regulatory elements, if necessary. The synthetic gene is inserted in a suitable cloning vector and transfected into a host cell. The peptide is then expressed under suitable conditions appropriate for the selected expression system and host. The peptide is purified and characterized by standard methods.

b. Methods for the Manufacturing of Immunostimulatory Complexes

Various exemplary embodiments also encompass methods of producing the Immunostimulatory complexes comprising IgE EMPD peptide immunogen constructs and CpG oligodeoxynucleotide (ODN) molecule. Stabilized immunostimulatory complexes (ISC) are derived from a cationic portion of the IgE EMPD peptide immunogen construct and a polyanionic CpG ODN molecule. The self-assembling system is driven by electrostatic neutralization of charge. Stoichiometry of the molar charge ratio of cationic portion of the IgE EMPD peptide immunogen construct to anionic oligomer determines extent of association. The non-covalent electrostatic association of IgE EMPD peptide immunogen construct and CpG ODN is a completely reproducible process. The peptide/CpG ODN immunostimulatory complex aggregates, which facilitate presentation to the "professional" antigen-presenting cells (APC) of the immune system thus further enhancing of the immunogenicity of the complexes. These complexes are easily characterized for quality control during manufacturing. The peptide/CpG ISC are well tolerated in vivo. This novel particulate system comprising CpG ODN and IgE EMPD fragment derived peptide immunogen constructs was designed to take advantage of the generalized B cell mitogenicity associated with CpG ODN use, yet promote balanced Th-1/Th-2 type responses.

The CpG ODN in the disclosed pharmaceutical compositions is 100% bound to immunogen in a process mediated by electrostatic neutralization of opposing charge, resulting in the formation of micron-sized particulates. The particulate form allows for a significantly reduced dosage of CpG from the conventional use of CpG adjuvants, less potential for adverse innate immune responses, and facilitates alternative immunogen processing pathways including antigen-presenting cells (APC). Consequently, such formulations are novel conceptually and offer potential advantages by promoting the stimulation of immune responses by alternative mechanisms.

c. Methods for the Manufacturing Pharmaceutical Compositions

Various exemplary embodiments also encompass pharmaceutical compositions containing IgE EMPD peptide immunogen constructs. In certain embodiments, the pharmaceutical compositions employ water in oil emulsions and in suspension with mineral salts.

In order for a pharmaceutical composition to be used by a large population and with prevention of IgE EMPD aggregation also being part of the goal for administration, safety becomes another important factor for consideration. Despite the use of water-in-oil emulsions in humans for many formulations in clinical trials, Alum remains the major adjuvant for use in formulations due to its safety. Alum or its mineral salts Aluminum phosphate (ADJUPHOS) are, therefore, frequently used as adjuvants in preparation for clinical applications.

Other adjuvants and immunostimulating agents include 3 De-O-acylated monophosphoryl lipid A (MPL) or 3-DMP, polymeric or monomeric amino acids, such as polyglutamic acid or polylysine. Such adjuvants can be used with or without other specific immunostimulating agents, such as muramyl peptides (e.g., N-acetylmuramyl-L-threonyl-D-isoglutamine (thr-MDP), N-acetyl-normuramyl-L-alanyl-D-isoglutamine (nor-MDP), N-acetylmuramyl-L-alanyl-D-isoglutaminyl-L-alanine-2-(1'-2' dipalmitoyl-sn-glycero-3-hydroxyphosphoryloxy)-ethylamine (MTP-PE), N-acetylglucsaminyl-N-acetylmuramyl-L-Al-D-isoglu-L-Ala-dipalmitoxy propylamide (DTP-DPP) Theramide™), or other bacterial cell wall components. Oil-in-water emulsions include MF59 (see WO 90/14837 to Van Nest et al., which is hereby incorporated by reference in its entirety), containing 5% Squalene, 0.5% Tween 80, and 0.5% Span 85 (optionally containing various amounts of MTP-PE) formulated into submicron particles using a microfluidizer; SAF, containing 10% Squalene, 0.4% Tween 80, 5% pluronic-blocked polymer L121, and thr-MDP, either microfluidized into a submicron emulsion or vortexed to generate a larger particle size emulsion; and the Ribi™ adjuvant system (RAS) (Ribi ImmunoChem, Hamilton, Mont.) containing 2% squalene, 0.2% Tween 80, and one or more bacterial cell wall components selected from the group consisting of monophosphoryllipid A (MPL), trehalose dimycolate (TDM), and cell wall skeleton (CWS), preferably MPL+CWS (Detox™). Other adjuvants include Complete Freund's Adjuvant (CFA), Incomplete Freund's Adjuvant (IFA), and cytokines, such as interleukins (IL-1, IL-2, and IL-12), macrophage colony stimulating factor (M-CSF), and tumor necrosis factor (TNF).

The choice of an adjuvant depends on the stability of the immunogenic formulation containing the adjuvant, the route of administration, the dosing schedule, the efficacy of the adjuvant for the species being vaccinated, and, in humans, a pharmaceutically acceptable adjuvant is one that has been approved or is approvable for human administration by pertinent regulatory bodies. For example, alum, MPL or Incomplete Freund's adjuvant (Chang et al., Advanced Drug Delivery Reviews 32:173-186 (1998), which is hereby incorporated by reference in its entirety) alone or optionally all combinations thereof are suitable for human administration.

The compositions can include pharmaceutically-acceptable, non-toxic carriers or diluents, which are defined as vehicles commonly used to formulate pharmaceutical compositions for animal or human administration. The diluent is selected so as not to affect the biological activity of the combination. Examples of such diluents are distilled water, physiological phosphate-buffered saline, Ringer's solutions, dextrose solution, and Hank's solution. In addition, the pharmaceutical composition or formulation may also include other carriers, adjuvants, or nontoxic, nontherapeutic, non-immunogenic stabilizers, and the like.

Pharmaceutical compositions can also include large, slowly metabolized macromolecules, such as proteins, polysaccharides like chitosan, polylactic acids, polyglycolic acids and copolymers (e.g., latex functionalized sepharose, agarose, cellulose, and the like), polymeric amino acids, amino acid copolymers, and lipid aggregates (e.g., oil droplets or liposomes). Additionally, these carriers can function as immunostimulating agents (i.e., adjuvants). The pharmaceutical compositions of the present invention can further include a suitable delivery vehicle. Suitable delivery vehicles include, but are not limited to viruses, bacteria, biodegradable microspheres, microparticles, nanoparticles, liposomes, collagen minipellets, and cochleates.

d. Methods Using Pharmaceutical Compositions

The present disclosure also includes methods of using pharmaceutical compositions containing IgE EMPD peptide immunogen constructs.

In certain embodiments, the pharmaceutical compositions containing IgE EMPD peptide immunogen constructs can be used for the treatment and/or prevention of Immunoglobulin E (IgE) mediated allergic diseases, including, but not limited to, drug-, food-, and insect-allergy, allergic rhinitis (hay fever), atopic dermatitis, allergic asthma, conjunctivitis, eczema, urticaria (hives), and anaphylaxis.

In some embodiments, the methods comprise administering a pharmaceutical composition comprising a pharmacologically effective amount of an IgE EMPD peptide immunogen construct to a host in need thereof. In certain embodiments, the methods comprise administering a pharmaceutical composition comprising a pharmacologically effective amount of an IgE EMPD peptide immunogen construct to a warm-blooded animal (e.g., humans, Cynomolgus macaques, mice) to elicit highly specific antibodies cross-reactive with the IgE EMPD 1-52 peptide (SEQ ID NO: 2), IgE EMPD 1-67 protein (SEQ ID NO: 1), either as a recombinant IgE EMPD-containing protein (e.g., purified from a stable Flp-In CHO cell line transfected with recombinant DNA encoding the Fc portion of human IgG1 and the IgE EMPD of human membrane-bound IgE, γ1-em67) or on the membrane of a membrane-bound IgE bearing cell (e.g., a Ramos cell line transfected with recombinant DNA encoding mIgE.FcL).

In certain embodiments, the pharmaceutical compositions containing IgE EMPD peptide immunogen constructs can be used to treat and/or prevent IgE mediated diseases by eliciting antibodies directed against IgE EMPD. Such antibodies are able to (a) bind to mIgE-expressing B cells and induce Antibody-Dependent Cellular Cytotoxicity (ADCC) and Apoptosis; (b) lead to the in vivo reduction of basal level IgE in the blood; (c) lead to the in vivo reduction of antigen-specific IgE level in the blood; and (d) reduce or eliminate the IgE-mediated allergic pathology in patients suffering from IgE mediated allergic diseases.

e. In Vitro Functional Assays and In Vivo Proof of Efficacy Concept Studies

Antibodies produced by the IgE EMPD peptide immunogen constructs can be used in in vitro functional assays. These functional assays include, but are not limited to:

(a) in vitro binding to IgE EMPD 1-52 peptide (SEQ ID NO: 1) as a recombinant protein purified from mIgE.FcL-expressing CHO cells (Example 3);

(b) in vitro binding to a membrane-bound IgE bearing cell from a B cell line, Ramos, that was transfected with recombinant DNA encoding IgE.FcL (Example 3);

(c) in vitro of Antibody-Dependent Cellular Cytotoxicity (ADCC) (Example 6);

(d) induction in vitro of apoptosis of IgE bearing B lymphocytes (Example 6);

(e) in vivo proof of efficacy by showing reduction of basal level IgE in blood of vaccinated hosts (Examples 8 to 10);

(f) in vivo proof of efficacy by showing reduction of antigen-specific IgE level upon prime and boost with challenges by allergen (Examples 8 to 10).

By the present disclosure, the IgE EMPD peptide immunogen constructs and formulations thereof can effectively function as vaccines to reduce or eliminate the IgE-mediated allergic pathology in patients suffering from IgE mediated allergic diseases.

Specific Embodiments (1) An IgE EMPD peptide immunogen construct represented by the formulae:

$(Th)_m$-$(A)_n$-(IgE EMPD fragment)-X or (IgE EMPD fragment)-$(A)_n$-$(Th)_m$-X or $(Th)_m$-$(A)_n$-(IgE EMPD fragment)-$(A)_n$-$(Th)_m$-X wherein Th is a heterologous T helper epitope;

A is a heterologous spacer;

(IgE EMPD fragment) is a B cell epitope having about 20 to about 40 amino acid residues from the central intramolecular loop of IgE EMPD;

X is an α-COOH or α-$CONH_2$ of an amino acid;

m is from 1 to about 4; and n is from 0 to about 10.

(2) The IgE EMPD peptide immunogen construct according to (1), wherein the IgE EMPD fragment is selected from the group consisting of SEQ ID NOs: 5, 6, 8, and 9.

(3) The IgE EMPD peptide immunogen construct according to any of (1) or (2), wherein the Th epitope is selected from the group consisting of SEQ ID NOs: 59-87.

(4) The IgE EMPD peptide immunogen construct according to (1), wherein the peptide immunogen construct is selected from the group consisting of SEQ ID NOs: 88-95, 98-124, and 130.

(5) An IgE EMPD peptide immunogen construct comprising:

a B cell epitope comprising about 20 to about 40 amino acid residues from the IgE EMPD sequence of SEQ ID NO: 1 or SEQ ID NO: 2;

a T helper epitope comprising an amino acid sequence selected from the group consisting of SEQ ID NOs: 59-87; and an optional heterologous spacer selected from the group consisting of an amino acid, Lys-, Gly-, Lys-Lys-Lys-, (α, ε-N) Lys, and ε-N-Lys-Lys-Lys-Lys (SEQ ID NO: 129), wherein the B cell epitope is covalently linked to the T helper epitope directly or through the optional heterologous spacer.

(6) The IgE EMPD peptide immunogen construct of (5), wherein the B cell epitope is selected from the group consisting of SEQ ID NOs: 5, 6, 8, and 9.

(7) The IgE EMPD peptide immunogen construct of (5), wherein the T helper epitope is selected from the group consisting of SEQ ID NOs: 59-87.

(8) The IgE EMPD peptide immunogen construct of (5), wherein the optional heterologous spacer is (α, ε-N) Lys or ε-N-Lys-Lys-Lys-Lys (SEQ ID NO: 129).

(9) The IgE EMPD peptide immunogen construct of (5), wherein the T helper epitope is covalently linked to the amino terminus of the B cell epitope.

(10) The IgE EMPD peptide immunogen construct of (5), wherein the T helper epitope is covalently linked to the amino terminus of the B cell epitope through the optional heterologous spacer.

(11) A composition comprising a peptide immunogen construction according to any of (1) to (10).

(12) A pharmaceutical composition comprising:

a. a peptide immunogen construct according to any of (1) to (10); and b and a pharmaceutically acceptable delivery vehicle and/or adjuvant.

(13) The pharmaceutical composition of (12), wherein a. the IgE EMPD peptide immunogen construct is selected from the group consisting of SEQ ID NOs: 88-95, 98-124, and 130; and b. the IgE EMPD peptide immunogen construct is mixed with an CpG oligodeoxynucleotide (ODN) to form a stabilized immunostimulatory complex.

(14) An isolated antibody or epitope-binding fragment thereof that specifically binds to the B cell epitope of the IgE EMPD peptide immunogen construct according to any of (1) to (10).

(15) The isolated antibody or epitope-binding fragment thereof according to (14) bound to the IgE EMPD peptide immunogen construct.

(16) An isolated antibody or epitope-biding fragment thereof that specifically binds to the B cell epitope of the IgE EMPD peptide immunogen construct according to any of (1) to (10).

(17) A composition comprising the isolated antibody or epitope-binding fragment thereof according to any of claims (14) to (16).

A detailed description of the procedures used is provided in the following examples. The following examples serve to illustrate the present invention and are not to be used to limit the scope of the invention.

Example 1

Synthesis of IgE EMPD Related Peptides and Preparation of Formulations Thereof a. Synthesis of IgE EMPD Related Peptides

Methods for synthesizing designer IgE EMPD related peptides that were included in the development effort of IgE EMPD peptide immunogen constructs are described. The peptides were synthesized in small-scale amounts that are useful for serological assays, laboratory pilot and field studies, as well as large-scale (kilogram) amounts, which are useful for industrial/commercial production of pharmaceutical compositions. A large repertoire of IgE EMPD related antigenic peptides having sequences with lengths from approximately 20 to 70 amino acids were designed for the screening and selection of the most optimal peptide constructs for use in an efficacious IgE based allergy vaccine.

Representative full-length IgE EMPD 1-67 (SEQ ID NO: 1), IgE EMPD 1-52 (SEQ ID NO: 2), and IgE EMPD segments, including IgE EMPD 1-17 (SEQ ID NO: 7), IgE EMPD 19-38 (SEQ ID NO: 8), and various 10-mer peptides (SEQ ID NOs: 10-58), employed for epitope mapping in various serological assays are shown in Table 1 (SEQ ID NOs: 1 to 58).

Select IgE EMPD B cell epitope peptides were made into IgE EMPD peptide immunogen constructs by synthetically linking to a carefully designed helper T cell (Th) epitope derived from pathogen proteins including, Measles Virus Fusion protein (MVF), Hepatitis B Surface Antigen protein (HBsAg) influenza, *Clostridum tetani*, and Epstein-Barr virus (EBV), as shown in Table 2 (SEQ ID NOs: 59-87). The Th epitopes were used either in a single sequence (SEQ ID NOs: 59-67 and 72-87) or a combinatorial library (SEQ ID NOs: 68-71) to enhance the immunogenicity of their respective IgE EMPD peptide immunogen constructs.

Representative IgE EMPD peptide immunogen constructs selected from over 100 peptide constructs are identified in Table 3 (SEQ ID NOs: 88-124 and 130).

All peptides used for immunogenicity studies or related serological tests for detection and/or measurement of anti-IgE EMPD antibodies were synthesized on a small scale using F-moc chemistry by peptide synthesizers of Applied BioSystems Models 430A, 431 and/or 433. Each peptide was produced by an independent synthesis on a solid-phase support, with F-moc protection at the N-terminus and side chain protecting groups of trifunctional amino acids. Completed peptides were cleaved from the solid support and side chain protecting groups were removed by 90% Trifluoroacetic acid (TFA). Synthetic peptide preparations were evaluated by Matrix-Assisted Laser Desorption/Ionization-Time-Of-Flight (MALDI-TOF) Mass Spectrometry to ensure correct amino acid content. Each synthetic peptide was also evaluated by Reverse Phase HPLC (RP-HPLC) to confirm the synthesis profile and concentration of the preparation. Despite rigorous control of the synthesis process (including stepwise monitoring the coupling efficiency), peptide analogues were also produced due to unintended events during elongation cycles, including amino acid insertion, deletion, substitution, and premature termination. Thus, synthesized preparations typically included multiple peptide analogues along with the targeted peptide.

Despite the inclusion of such unintended peptide analogues, the resulting synthesized peptide preparations were nevertheless suitable for use in immunological applications including immunodiagnosis (as antibody capture antigens) and pharmaceutical compositions (as peptide immunogens). Typically, such peptide analogues, either intentionally designed or generated through synthetic process as a mixture of byproducts, are frequently as effective as a purified preparation of the desired peptide, as long as a discerning QC procedure is developed to monitor both the manufacturing process and the product evaluation process to guarantee the reproducibility and efficacy of the final product employing these peptides. Large scale peptide syntheses in the multi-hundred to kilo gram quantities were conducted on a customized automated peptide synthesizer UBI2003 or the like at 15 mmole to 50 mmole scale.

For active ingredients used in the final pharmaceutical composition for clinical trials, IgE EMPD related peptide constructs were purified by preparative RP-HPLC under a shallow elution gradient and characterized by MALDI-TOF mass spectrometry, amino acid analysis and RP-HPLC for purity and identity.

b. Preparation of Compositions Containing IgE EMPD Peptide Immunogen Constructs Formulations employing water in oil emulsions and in suspension with mineral salts were prepared. In order for a pharmaceutical composition designed to be used by a large population and with prevention also being part of the goal for administration, safety becomes another important factor for consideration. Despite the use of water-in-oil emulsions in humans for many pharmaceutical compositions in clinical trials, Alum remains the major adjuvant for use in pharmaceutical composition due to its safety. Alum or its mineral salts ADJUPHOS (Aluminum phosphate) are therefore frequently used as adjuvants in preparation for clinical applications.

Briefly, the formulations specified in each of the study groups described below generally contained all types of designer the IgE EMPD peptide immunogen constructs. Over 100 designer IgE EMPD peptide immunogen constructs were initially evaluated in guinea pigs for their relative immunogenicity with the corresponding IgE EMPD peptide representative of the immunogen's B cell epitope peptide and also for assessment of serological cross-reactivities among the various homologous peptides by ELISA assays with plates coated with different peptides selected from those of SEQ ID NOs: 1-126.

The IgE EMPD peptide immunogen constructs were prepared (i) in a water-in-oil emulsion with Seppic Montanide™ ISA 51 as the approved oil for human use, or (ii) mixed with mineral salts ADJUPHOS (Aluminum phosphate) or ALHYDROGEL (Alum), at varying amounts of peptide constructs, as specified. Compositions were typically prepared by dissolving the IgE EMPD peptide immunogen constructs in water at about 20 to 800 μg/mL and formulated with Montanide™ ISA 51 into water-in-oil emulsions (1:1 in volume) or with mineral salts or ALHYDROGEL (Alum) (1:1 in volume). The compositions were kept at room temperature for about 30 min and mixed by vortex for about 10 to 15 seconds prior to immunization. Some animals were immunized with 2 to 3 doses of a specific composition, which were administered at time 0 (prime) and 3 week post initial immunization (wpi) (booster), optionally 5 or 6 wpi for a second boost, by intramuscular route. These immunized animals were then tested with selected B cell epitope peptide(s) to evaluate the immunogenicity of the various IgE EMPD peptide immunogen constructs present in the formulation as well as their cross-reactivity with related target peptides or proteins. Those IgE EMPD peptide immunogen constructs with potent immunogenicity in the initial screening in guinea pigs were then further tested in both water-in-oil emulsion, mineral salts, and alum-based formulations in primates for dosing regimens over a specified period as dictated by the immunizations protocols.

Only the most promising IgE EMPD peptide immunogen constructs were further assessed extensively prior to being incorporated into final formulations for immunogenicity, duration, toxicity and efficacy studies in GLP guided preclinical studies in preparation for submission of an Investigational New Drug application and clinical trials in patients with IgE mediated diseases.

Example 2

Serological Assays and Reagents

Serological assays and reagents for evaluating functional immunogenicity of the synthetic peptide constructs and formulations thereof are described in details below.

a. IgE EMPD 1-52, IgE EMPD 1-39, IgE EMPD 1-17, IgE EMPD 19-38, IgE EMPD 7-40 Peptide-Based ELISA Tests for Antibody Specificity Analysis ELISA assays for evaluating immune serum samples described in the following examples were developed and described below. The wells of 96-well plates were coated individually for 1 hour at 37° C. with 100 μL of target peptide IgE EMPD 1-52, IgE EMPD 1-39, IgE EMPD 1-17, IgE EMPD 19-38, IgE EMPD 7-40 peptide etc. (e.g., SEQ ID NOs: 2 and 5 to 8), at 2 μg/mL (unless noted otherwise), in 10 mM $NaHCO_3$ buffer, pH 9.5 (unless noted otherwise).

The peptide-coated wells were incubated with 250 μL of 3% by weight of gelatin in PBS in 37° C. for 1 hour to block non-specific protein binding sites, followed by three washes with PBS containing 0.05% by volume of TWEEN® 20 and dried. Sera to be analyzed were diluted 1:20 (unless noted otherwise) with PBS containing 20% by volume normal goat serum, 1% by weight gelatin and 0.05% by volume TWEEN® 20. One hundred microliters (100 μL) of the diluted specimens (e.g., serum, plasma) were added to each of the wells and allowed to react for 60 minutes at 37° C. The wells were then washed six times with 0.05% by volume TWEEN® 20 in PBS in order to remove unbound antibodies. Horseradish peroxidase (HRP)-conjugated species (e.g., mouse, guinea pig, or human) specific goat anti-IgG, IgA or IgM was used as a labeled tracer to bind with the antibody/peptide antigen complex formed in positive wells. One hundred microliters of the peroxidase-labeled goat anti-IgG, at a pre-titered optimal dilution and in 1% by volume normal goat serum with 0.05% by volume TWEEN® 20 in PBS, was added to each well and incubated at 37° C. for another 30 minutes. The wells were washed six times with 0.05% by volume TWEEN® 20 in PBS to remove unbound antibody and reacted with 100 μL of the substrate mixture containing 0.04% by weight 3', 3', 5', 5'-Tetramethylbenzidine (TMB) and 0.12% by volume hydrogen peroxide in sodium citrate buffer for another 15 minutes. This substrate mixture was used to detect the peroxidase label by forming a colored product. Reactions were stopped by the addition of 100 μL of 1.0M $H_2SO_4$ and absorbance at 450 nm ($A_{450}$) was determined. For the determination of antibody titers of the vaccinated animals that received the various IgE EMPD peptide vaccine formulations, a 10-fold serial dilutions of sera from 1:100 to 1:10,000 or a 4-fold serial dilutions of sera from 1:100 to 1:4.19×$10^8$ were tested, and the titer of a tested serum, expressed as $Log_{10}$, was calculated by linear regression analysis of the $A_{450}$ with the cutoff $A_{450}$ set at 0.5.

b. Assessment of Antibody Reactivity Towards Th Peptide by Th Peptide Based ELISA Tests The wells of 96-well ELISA plates were coated individually for 1 hour at 37° C. with 100 μL of Th peptide at 2 μg/mL (unless noted otherwise), in 10 mM $NaHCO_3$ buffer, pH 9.5 (unless noted otherwise) in similar ELISA method and performed as described above. For the determination of antibody titers of the vaccinated animals that received the various IgE EMPD peptide vaccine formulations, 10-fold serial dilutions of sera from 1:100 to 1:10,000 were tested, and the titer of a tested serum, expressed as Log 10, was calculated by linear regression analysis of the $A_{450}$ with the cutoff $A_{450}$ set at 0.5.

c. Assessment of Fine Specificity Analysis and Epitope Mapping Towards IgE EMPD and IgE CH4 (Human IgE CH4 to Membrane) by B Cell Epitope Cluster 10-mer Peptide-Based ELISA Tests Fine specificity analyses of anti-IgE EMPD antibodies in immunized hosts were determined by epitope mapping. Briefly, the wells of 96-well plates were coated with individual IgE EMPD 10-mer peptides (SEQ ID NOs: 10 to 58) at 0.5 ug per 0.1 mL per well and then 100 μL serum samples (1:100 dilution in PBS) were incubated in 10-mer plate wells in duplicate following the steps of the antibody ELISA method described above. The B cell epitope of the IgE EMPD peptide immunogen construct and related fine specificity analyses of anti-IgE EMPD antibodies from immune sera of immunized hosts were tested with the corresponding IgE EMPD 1-52 peptide without the spacer or Th sequences (SEQ ID NO: 1), or with non-relevant control peptide for additional reactivity and specificity confirmation.

d. Immunogenicity Evaluation

Preimmune and immune serum samples from animal or human subjects or animals were collected according to experimental vaccination protocols and heated at 56° C. for 30 minutes to inactivate serum complement factors. Following the administration of the vaccine formulations, blood samples were obtained according to protocols and their immunogenicity against specific target site(s) evaluated. Serially diluted sera were tested and positive titers were expressed as $Log_{10}$ of the reciprocal dilution. Immunogenicity of a particular vaccine formulation was assessed by its ability to elicit high titer antibodies directed against the desired B cell epitope sequence within the target antigen while maintaining a low to negligible antibody reactivity towards the helper T cell epitope sequence employed to provide enhancement of the desired B cell responses.

e. Immunoassay for Assessment of Human IgE Level in Mouse Sera

Human IgE levels in huIGHE knockin mice were measured by a sandwich ELISA using anti-human IgE, HP6061 (Abcam), as capture antibody and biotin-labeled anti-human IgE, HP6029 (Abcam), as detection antibody. Briefly, the HP6061 was immobilized on 96-well plates at 100 ng/well in coating buffer (15 mM $Na_2CO_3$, 35 mM $NaHCO_3$, pH 9.6) and incubated at 4° C. overnight. Coated wells were blocked by 200 μL/well of assay diluents (0.5% BSA, 0.05% Tween-20, 0.02% ProClin 300 in PBS) at room temperature for 1 hour. Plates were washed 3 times with 200 μL/well of wash buffer (PBS with 0.05% Tween-20). Purified U266 IgE was used to generate a standard curve (range 0 to 800 ng/ml by 2-fold serial dilution) in assay diluent with 5% mouse sera. 50 μL of the diluted sera (1:20) and standards were added to coated wells. The incubation was carried out at room temperature for 1 hour. All wells were aspirated and washed 6 times with 200 μL/well of wash buffer. The captured human IgE was incubated with 100 μL of detection antibody solution (50 ng/ml of biotin labeled HP6029 in assay diluent) at room temperature for 1 hour. Then, the bound biotin-HP6029 was detected using streptavidin poly-HRP (1:10,000 dilution, Thermo Pierce) for 1 hour (100 μL/well). All wells were aspirated and washed 6 times with 200 μL/well of wash buffer. Finally, wells were developed by 100 μL/well of NeA-Blue TMB substrate (Clinical Scientific Products) and the reaction was stopped by addition of 100 μL/well of 1M $H_2SO_4$. The standard curve was created by using the SoftMax Pro software (Molecular Devices) to generate a four parameter logistic curve-fit and used to calculate the concentrations of IgE in all tested samples. Student t tests were used to compare data by using the Prism software.

f. Immunoassay for Assessment of Papain Specific IgE Level in Mouse Sera

Papain-specific IgE developed in huIGHE knockin mice were measured by a direct ELISA using papain as coating material and biotin-labeled anti-human IgE, HP6029 (Abcam) as detection antibody. Briefly, papain was immobilized on 96-well plates at 500 ng/well in coating buffer (15 mM $Na_2CO_3$, 35 mM $NaHCO_3$, pH 9.6) and incubated at 4° C. overnight. Coated wells were blocked by 200 μL/well of assay diluents (0.5% BSA, 0.05% Tween-20, 0.02% ProClin 300 in PBS) at room temperature for 1 hour. Plates were washed 3 times with 200 μL/well of wash buffer (PBS with 0.05% Tween-20). A monoclonal human chimeric papain-specific IgE (AllerMAbs Co., Ltd.) was used to generate a standard curve (range 0 to 30 ng/ml by 2-fold serial dilution) in assay diluent with 10% mouse sera. 50 μL of the diluted sera (1:10) and standards were added to coated wells. The incubation was carried out at room temperature for 1 hour. All wells were aspirated and washed 6 times with 200 μL/well of wash buffer. The captured human IgE was incubated with 100 μL of detection antibody solution (50 ng/ml of biotin labeled HP6029 in assay diluent) at room temperature for 1 hour. Then, the bound biotin-HP6029 was detected using streptavidin poly-HRP (1:10,000 dilution, Thermo Pierce) for 1 hour (100 μL/well). All wells were aspirated and washed 6 times with 200 μL/well of wash buffer. Finally, wells were developed by 100 μL/well of NeA-Blue TMB substrate (Clinical Science Products) and the reaction was stopped by addition of 100 μL/well of 1M $H_2SO_4$. The standard curve was created by using the SoftMax Pro software (Molecular Devices) to generate a four parameter logistic curve-fit and used to calculate the concentrations of papain-specific IgE in all tested samples. Student t tests were used to compare data by using the Prism software.

g. Immunoassay for Assessment of IgE Level in Macaque Sera

Macaque IgE levels in Cynomolus macaques were measured by a sandwich ELISA using anti-human IgE, MB10-5C4 (Miltenyi Biotec), as capture antibody and biotin-labeled polyclonal anti-macaque IgE (Alpha Diagnostic International Inc.), as detection antibody. Briefly, the MB10-5C4 was immobilized on 96-well plates at 100 ng/well in coating buffer (15 mM $Na_2CO_3$, 35 mM $NaHCO_3$, pH 9.6) and incubated at 4° C. overnight. Coated wells were blocked by 200 μL/well of assay diluents (0.5% BSA, 0.05% Tween-20, 0.02% ProClin 300 in PBS) at room temperature for 1 hour. Plates were washed 3 times with 200 μL/well of wash buffer (PBS with 0.05% Tween-20). Purified macaque IgE was used to generate a standard curve (range 0 to 10,000 ng/ml by a 2-fold serial dilution) in assay diluent with 10% macaque sera. 100 μL of the diluted sera (1:10) and standards were added to coated wells. The incubation was carried out at room temperature for 1 hour. All wells were aspirated and washed 6 times with 200 μL/well of wash buffer. The captured human IgE was incubated with 100 μL of detection antibody solution (50 ng/ml of biotin labeled HP6029 in assay diluent) at room temperature for 1 hour. Then, the bound biotin-HP6029 was detected using streptavidin poly-HRP (1:10,000 dilution, Thermo Pierce) for 1 hour (100 μL/well). All wells were aspirated and washed 6 times with 200 μL/well of wash buffer. Finally, wells were developed by 100 μL/well of NeA-Blue TMB substrate (Clinical Science Products) and the reaction was stopped by addition of 100 μL/well of IM $H_2SO_4$. The standard curve was created by using the SoftMax Pro software (Molecular Devices) to generate a four parameter logistic curve-fit and used to calculate the concentrations of IgE in all tested samples. Student t tests were used to compare data by using the Prism software.

Example 3

Assessment of Functional Properties of Antibodies Elected by the IgE EMPD Peptide Immunogen Constructs and Formulations Thereof in Animals Immune sera or purified Anti-IgE EMPD antibodies from immunized hosts were tested for their ability to bind to recombinant soluble IgE EMPD protein and Ramos cell lines that were transfected with either recombinant DNA encoding mIgE.$Fc_L$ (CH2 to CM including the EMPD) or mIgE.$Fc_S$ (CH2 to CM without the EMPD).

a. Cells

The Ramos cell line was purchased from the American Type Culture Collection (ATCC, Manassas, VA) and grown in RPMI 1640 medium (Invitrogen, Carlsbad, CA) supplemented with 10% heat-inactivated FBS (Invitrogen), 4 mM L-glutamine, 25 mM HEPES, and 1 mM sodium pyruvate (Invitrogen; complete RPMI medium). Ramos cells were transfected with recombinant DNA encoding mIgE.$Fc_L$. or mIgE.$Fc_S$. Ramos cells expressing mIgE.$Fc_L$ were transfected with a DNA segment encoding the segment of the long isoform of the mIgE & chain spanning from the CH2 to the cytoplasmic peptide, including the EMPD. Ramos cells expressing mIgE.$Fc_S$ were transfected with a DNA segment encoding the segment of the short or conventional isoform of the mIgE ε chain spanning from the CH2 to the cytoplasmic peptide, excluding the EMPD. Stable transfectants of Ramos cells expressing mIgE.$Fc_L$ or mIgE.$Fc_S$ were maintained in complete RMPI 1640 medium supplemented with 400 mg/ml Zeocin (Invitrogen).

b. Preparation of Recombinant Soluble IgE EMPD Protein for ELISA Testing

The Flp-In CHO cells expressing recombinant soluble IgE EMPD protein were transfected with a DNA segment encoding the Fc portion of human IgG1 and the IgE EMPD of human membrane-bound IgE, γ1-em67. Stable Flp-In CHO transfectants were maintained in IMDM medium (Invitrogen, Carlsbad, CA) supplemented with 10% heat-inactivated FBS (Invitrogen), 4 mM L-glutamine, 25 mM HEPES, and 1 mM sodium pyruvate (Invitrogen; complete IMDM medium). The γ1-em67 protein was purified from the culture medium using protein A Sepharose (GE Healthcare) according to the manufacturer's instructions.

c. Purification of Polyclonal Antibodies from Immune Sera

Polyclonal IgGs from various immune sera were purified using protein A Sepharose (GE Healthcare) according to the manufacturer's instructions.

d. Binding by Polyclonal Antibodies to Soluble IgE EMPD Protein or mIgE.$Fc_L$ on B Cells Purified polyclonal antibodies from each of the immunized animals were examined for their relative activities for binding to (a) recombinant γ1-em67 protein (described above) by ELISA, or (b) Ramos cells expressing mIgE.$Fc_L$ by fluorescence flow cytometric analysis. The 96-well microplate was from Nalge NUNC International, flat-bottomed (Cat. 442404) for optical reading and V-bottomed for cell incubation (Cat. 249570). Optical density was read on VersaMax microplate reader (Molecular Devices). Fluorescencing stainers were detected by BD FACSCanto II cytometer (DB Biosciences); and the resultant data were acquired by the associated FACSDiva software. Binding data from ELISA & FACS were imported to Prism 6 software for quantitative analysis. More specifically, on V-bottomed microplates, aliquots of $2\times10^5$ cells in 0.1 mL per well were added, centrifuged, and liquid discarded. The cells were incubated on ice for 1 hr with aliquots of 100 μL of antibody sample at various concentrations. The cells were washed once, centrifuged at 300 g for 5 min, and stained on ice for 30 min with 100 μL of goat $F(ab)_2$ anti-species specific IgG Fc-FITC (250 ng/mL). The cells were washed once and the liquid discarded after centrifugation. To each well, aliquots of 200 μL of binding buffer were added and transferred to microdilution tubes for flow cytometric analysis. The binding intensity (geometric mean of fluorescence intensity, GeoMFI), based on an inlet of 10,000 cells per sample, was read on FACS.

e. Apoptosis Assays

Ramos cells stably expressing mIgE.$Fc_L$ ($5\times10^5$ cells/mL) were incubated with purified immune or control antibodies in complete RPMI 1640 medium for 1 h at 37° C. The cells were then treated with the secondary antibody, goat $F(ab')_2$ specific for Fc of guinea pig IgG (Jackson ImmunoResearch Laboratories, West Grove, PA), at a final concentration of 10 μg/mL and incubated for an additional 24 h at 37° C. The extent of apoptosis of the cells was analyzed in the following way. For assays with annexin V, the phosphatidylserine (PS) exposure was measured by resuspending cells in a staining solution for 15 min in dark at room temperature. The staining solution contained FITC-labeled annexin V (Biovision, Mountain View, CA), diluted 1/200, and 2.5 μg/ml propidium iodide (PI) in a buffer with 10 mM HEPES/NaOH (pH 7.4), 140 mM NaCl, and 5 mM $CaCl_2$). The stained cells were analyzed on a FACSCanto II flow cytometer (BD Biosciences, San Jose, CA). The percentage of apoptotic cells, defined as annexin V-positive and PI-negative, was obtained in a dot plot analysis.

f. Antibody-Dependent Cellular Cytotoxicity Assay (ADCC)

Splenic lymphocytes were isolated from the spleen of Balb/c mice (female, 6 to 8 weeks old) by repeated hypotonic shocks of red blood cells using a RBC lysis buffer (Thermo Fisher Scientific Inc.). After removing red blood cells, the splenic lymphocytes were cultured at $3\times10^6$ cells/mL for 3 days in complete RPMI medium supplemented with 50 μM 2-ME and 100 U/mL recombinant human IL-2 (PeproTech, Inc). Ramos cells expressing mIgE.$Fc_L$ (target cells) were labeled with CFSE (Invitrogen) in PBS/0.1% BSA for 10 min at 37° C. After three washes with cold complete RPMI 1640 medium, cells were adjusted to $10^5$ cells/mL. Aliquots of 20,000 labeled cells in 200 μl of complete RPMI medium were coated with purified polyclonal IgG antibodies from corresponding immune sera at 10 μg/mL for 30 min at 37° C., and then combined with IL-2 activated splenic lymphocytes (effector cells) at an E/T ratio of 30. After 24 h incubation, the total cells were stained with 7 amino actinomycin D (7-AAD, Invitrogen) at 2.5 μg/mL for 15 min on ice and then analyzed on a Becton Dickinson FACS Canto II flow cytometer (BD Biosciences). Living target cells were defined as CFSE-positive and 7-AAD-negative in a dot-plot analysis. The percentage of lysed target cells at a given E/T ratio was: 100×[(percentage of live target cells in antibody-independent control−percentage of live target cells in the sample)/percentage of live target cells in the antibody-independent control].

Example 4

Animals Used in Safety, Immunogenicity, Toxicity and Efficacy Studies a. Guinea Pigs Immunogenicity studies were conducted in mature, naïve, adult male and female Duncan-Hartley guinea pigs (300-350 g/BW). The experiments utilized at least 3 Guinea pigs per group. Protocols involving Duncan-Hartley guinea pigs (8-12 weeks of age; Covance Research Laboratories, Denver, PA, USA), were performed under approved IACUC applications at the contracted animal facility as well as at United Biomedical, Inc. (UBI), as sponsor.

b. Cynomolgus Macaques

Immunogenicity and repeated dose toxicity studies in adult male and female monkeys (*Macaca fascicularis*, approximately 4 years of age; Joinn Laboratories, Suzhou, China) were conducted under approved IACUC applications at the contracted animal facility as well as at UBI, as sponsor.

c. hIGHE Knockin Mice

A mouse strain of which IGHG1 gene is replaced with human IGHE gene by homologous gene targeting in C57BL/B6 genetic background expresses human secretory and membrane-bound IgE (Lu, el al., 2015). The hIGHE mice express human IgE under the regulatory control of the murine IGHG1 transcription elements and express human membrane-bound IgE through alternative RNA splicing of human regulatory elements. The serum IgE was detected as early as 8 to 10 weeks of age in circulation. Young offsprings of a mixed hIGHE×Balb/c ground (10~12 weeks of age) were used in a prevention model of a primary/memory immune response, and in a therapeutic model of a sensitization/recall immune response. Both studies were performed under approved IACUC applications at the contracted animal facility (National Health Research Institute, Taiwan) as well as at UBI, as sponsor.

The effects of intramuscular vaccinations over a 16 week period were observed for antibody response by ELISA assay of serum human IgE and for evidence of decreased levels of serum total IgE as well as antigen-specific IgE upon an antigen challenge.

Prior to immunization, serum samples from individual animals were tested for the presence of serum human IgE according to methods described above in this example. Each animal was immunized with IgE EMPD peptide immunogen constructs per dose of the vaccine formulations, depending on species and protocol.

Example 5

Vaccine Formulations for Immunogenicity Assessment of IgE EMPD Peptide Constructs in Guinea Pigs, Transgenic Knock-In Mice and Cynomolgus Macaques for Final Product Selection Pharmaceutical compositions and vaccine formulations used in each experiment are described in greater detail below. Briefly, the formulations specified in each of the study groups generally contained all types of designer IgE EMPD peptide constructs with a segment of the IgE EMPD peptide linked via different type of spacers (e.g., εK or KKK to enhance the peptide construct's solubility) and variations of promiscuous helper T cell epitopes including two sets of artificial T helper epitopes derived from Measles virus fusion protein and Hepatitis B surface antigen with the IgE EMPD peptide segment(s) linked at the N-terminus of the designer peptide constructs. Over 100 designer IgE EMPD peptide constructs were initially evaluated in guinea pigs for their relative immunogenicity with the IgE EMPD 1-52 and further for their cross-reactivity with the membrane IgE on IgE bearing B cells (Ramos cell line). The IgE EMPD peptide constructs were prepared in a water-in-oil emulsion with Seppic Montanide™ ISA 51 as the approved oil for human vaccine use, or mixed with mineral salts ADJUPHOS or ALHYDROGEL (Alum) at varying amounts of peptide constructs as specified. Vaccines were usually prepared by dissolving the IgE EMPD peptide constructs in water at about 20 to 800 μg/mL and formulated with Montanide™ ISA 51 into water-in-oil emulsions (1:1 in volume) or with mineral salts ADJUPHOS or ALHYDROGEL (Alum) (1:1 in volume). The vaccine formulations were kept at room temperature for about 30 min and mixed by vortex for about 10 to 15 seconds prior to immunization.

Animals were immunized with 2 to 3 doses of a specific vaccine formulation, which were administered at time 0 (prime) and 3 week post initial immunization (wpi) (booster), optionally 5 or 6 wpi for a second boost, by intramuscular route. These immunized animals were then tested to evaluate the immunogenicity of the various synthetic IgE EMPD peptide immunogens present in the vaccine formulation as well as their cross-reactivity with the IgE EMPD 1-52. IgE EMPD peptide immunogens with potent immunogenicity in the initial screening in guinea pigs were then further tested in both water-in-oil emulsion, mineral salts, and alum-based formulations in macaques for dosing regimens over a specified period as dictated by the immunizations protocols.

Only the most promising IgE EMPD peptide immunogen candidates were further assessed extensively by the immune sera's capability to mediate ADCC, apoptosis of mIgE bearing B cells and in transgenic knock-in mice and macaques for their ability to break tolerance in the same species with self IgE EMPD antigen prior to being incorporated into final vaccine formulations for GLP guided immunogenicity, duration, toxicity and proof related efficacy studies in preparation for submission of an Investigational New Drug application and clinical trials in patients with IgE mediated allergic diseases.

Example 6

Figure 2B:
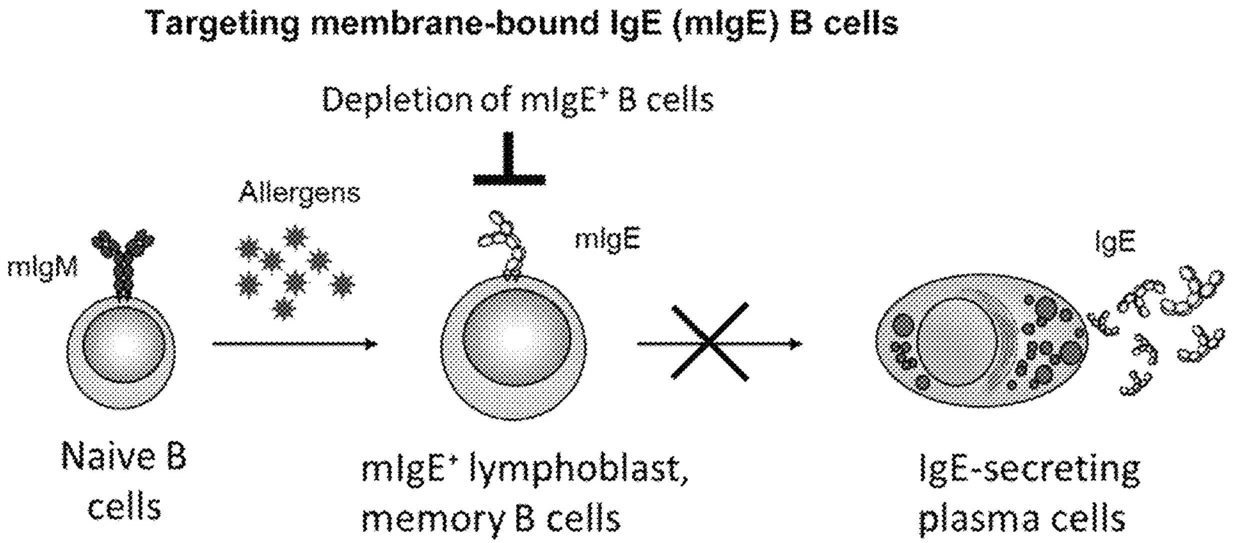

Design Rationale, Screening, Identification, Assessment of Functional Properties and Optimization of Multi-Component Vaccine Formulations Incorporating IgE EMPD 1-39 Peptide Immunogen Constructs for Treatment of IgE Mediated Allergic Diseases FIGS. 2A and 2B illustrate the rationale for depletion of mIgE B cells by targeting IgE EMPD. IgE are expressed in two forms: secretory IgE and membrane-bound IgE (mIgE) (FIG. 2A, left and right, respectively). Secretory IgE is captured on the cell surface of basophils and mast cells through FcRI while mIgE is exclusively present on IgE-committed B cells as part of the B cell receptor (BCR). The extracellular membrane proximal domain (EMPD) of mIgE is a 67 amino acid peptide segment (SEQ ID NO: 1) between the CH4 domain and the transmembrane region, exclusively found on mIgE B cells. The uniqueness of IgE EMPD has provided an attractive site for targeting mIgE bearing B cells. Depletion of mIgE B cells by targeting IgE EMPD allows for the suppression of allergen-specific IgE production before their differentiation to become new IgE-secreting plasma cells (FIG. 2B). Existing IgE secreting plasma cells with their limited lifespan will gradually die off, resulting in the gradual decline in total and allergen-specific IgE.

Figure 3:
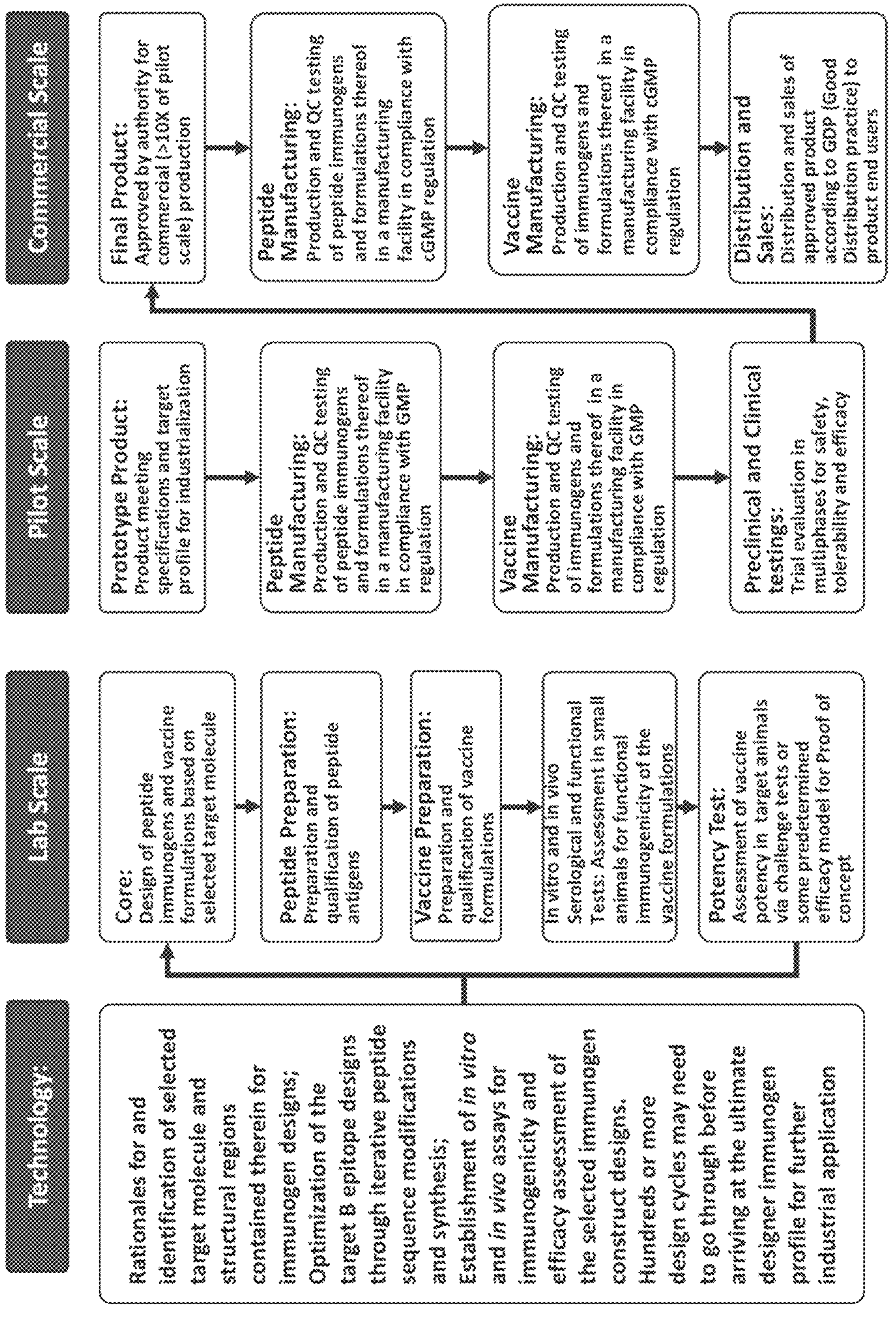
FIG. 3 is a flow chart identifying the development process from discovery to commercialization (industrialization) of a vaccine formulation according to a particular embodiment disclosed herein. The present disclosure includes peptide immunogen design, peptide composition design, vaccine formulation design, in vitro functional antigenicity study design, in vivo immunogenicity and efficacy study design, and clinical protocol design, as summarized in this chart. Detailed evaluation and analysis of each of the steps, leads to a series of experiments resulting in the commercialization of a safe and efficacious vaccine formulation.

FIG. 3 is a flow chart identifying the development process from discovery to commercialization (industrialization) of a vaccine formulation according to a particular embodiment disclosed herein. The present disclosure includes peptide immunogen design, peptide composition design, vaccine formulation design, in vitro functional antigenicity design, in vivo immunogenicity and efficacy study design, and clinical protocol design as hereby summarized. Detailed evaluation for each of the steps surprisingly leads to a series of experiments resulting in final commercialization of a safe and efficacious vaccine formulation.

A general summary of the steps is described below:

a. Design History

Each peptide immunogen construct or immunotherapeutic product requires its own design focus and approach based on its specific disease mechanism and the target protein(s) required for intervention. The target that designs are modeled after can include cellular proteins involved in a disease pathway or an infectious agent in which several proteins from the pathogen may be involved. The process from research to commercialization is very long typically requires one or more decades to accomplish.

An extensive process of serological validation is required once the target molecule is selected. Identification of the B cell and T cell epitopes and functional site(s) within the target molecule subject to intervention is important to the immunogen construct design. Once the target B cell epitope is recognized, consecutive pilot immunogenicity studies in small animals incorporating various T helper support (carrier proteins or suitable T helper peptides) are conducted to evaluate the functional properties of the elicited antibodies by pharmaceutical compositions of the designer peptides. Such serological application is then carried out in animals of the target species for further validation of the immunogenicity and functional properties of the elicited antibodies. All studies are conducted in multiple parallel groups with sera collected from the immunized hosts for evaluation. Early immunogenicity studies in the target species or in non-human primate in the case of human pharmaceutical compositions, are also carried out to further validate the immunogenicity and direction of the design. Target peptides are then prepared in varying mixtures to evaluate subtle difference in functional property related to the respective interactions among peptide constructs when used in combinations to prepare for respective formulation designs. After additional evaluation, the final peptide constructs, peptide compositions and formulations thereof, along with the respective physical parameters of the formulations are thus established leading to the final product development process.

b. Design and Validation of IgE EMPD Derived Peptide Immunogen Constructs for Pharmaceutical Compositions with Potential to Treat Patients with IgE Mediated Allergic Disease In order to generate the most potent peptide constructs for incorporation into the pharmaceutical compositions, a large repertoire of IgE EMPD B cell epitope peptides (SEQ ID NOs: 5-8) (Table 1) and promiscuous T helper epitopes derived from various pathogens or artificially T helper epitopes further designed (SEQ ID NOs: 59-87) (Table 2) were made into IgE EMPD peptide immunogen constructs for immunogenicity studies in guinea pigs.

i) Selection of IgE EMPD G1-H40 as the Target Region for Immunogen Design.

IgE are expressed in two forms: secretory IgE and membrane-bound IgE (mIgE). Secretory IgE is captured on the cell surface of basophils and mast cells through FcRI while mIgE is exclusively present on IgE-committed B cells as part of the B cell receptor (BCR). The full length extracellular membrane proximal domain (EMPD) of mIgE is a 67 amino acid peptide segment (SEQ ID NO: 1) between the CH4 domain and the transmembrane region, exclusively found on mIgE B cells. Existing IgE secreting plasma cells with their limited lifespan will gradually die off, resulting in the gradual decline in total and allergen-specific IgE. Out of many peptide immunogen constructs tested for immunogenicity in guinea pigs, data from a series of IgE EMPD derived peptide immunogen constructs (SEQ ID NOs: 88-93) were made incorporating representative IgE EMPD B cell epitope peptides derived from the IgE EMPD 1-52 (SEQ ID NO: 2) and a representative Th epitope peptide UBITh®1 (SEQ ID NO: 72) for immunogenicity testing in Guinea pigs using IgE EMPD 1-39 (SEQ ID NO: 5) peptide for plate coating, as shown in Table 4. High immunogenicity was found with six IgE EMPD peptide immunogen constructs with three orientations where UBITh®1 Th epitope peptide was linked to the IgE EMPD B cell epitope peptide at either the C-terminus (SEQ ID NOs: 88 and 91) or N-terminus (SEQ ID NOs: 89, 90, and 92) or at both the C- and N termini (SEQ ID NO: 93) of the IgE EMPD B cell epitope peptide with a spacer linker of &K. IgE EMPD peptide immunogen constructs containing the longer linker εK-KKK (SEQ ID NO: 129) was also employed to allow high immunogenicity in construct design (e.g., SEQ ID NOs: 94-97).

Shorter fragments of IgE EMPD B cell epitope peptides (SEQ ID NOs: 7 and 8) were also potentiated by T helper epitope peptide, such as UBITh®1, (SEQ ID NOs: 96 and 97, respectively) for immunogenicity. However, these constructs elicited antibodies having weak binding capabilities to IgE EMPD (e.g. for longer fragments with SEQ ID NOs: 5, 6, 7, and 8) as shown in Table 5. Constructs of SEQ ID NOs: 96 and 97 also elicited antibodies having very restricted binding profiles as shown by linear epitope mapping studies where only 10mer peptides with SEQ ID NO: 25 (amino acids 8-17) and SEQ ID NO: 39 (amino acids 22-31) were found to be reactive, respectively. Furthermore, the elicited antibodies of constructs of SEQ ID NOs: 96 and 97 were found to have minimal mIgE-B cell binding effect (as shown in FIG. 6C), a prerequisite for induction of mIgE-B cell apoptosis.

ii) Ranking of Heterologous T Helper Epitopes Derived from Pathogens and their Inclusion in the IgE EMPD Peptide Immunogen Constructs Design to Enhance the Immunogenicity of the Selected IgE EMPD B Cell Epitope Peptide.

Table 2 lists a total of 29 heterologous Th epitopes (SEQ ID NOs: 59-87) that have been tested for their relative potency in multispecies, from mice, rats, guinea pigs, baboons, macaques etc., to enhance B cell epitope immunogenicity.

A representative study of IgE EMPD peptide immunogen constructs containing the IgE EMPD 1-39 B cell epitope peptide (SEQ ID NO: 5) linked through an εK spacer with individual promiscuous T helper epitopes (SEQ ID NOs: 88, 98-124, and 130) was conducted for immunogenicity study in guinea pigs to rank the relative effectiveness of the respective heterologous T helper epitopes as shown in Table 6. Due to the high B-epitope enhancing capabilities of some Th epitopes, results obtained at 3 weeks post initial immunization (3 wpi) after only single immunization of the guinea pigs were used to rank the 29 different IgE EMPD peptide immunogen constructs. Although all selected Th epitopes had the capability of enhancing the immunogenicity of the IgE EMPD B-epitope peptide, the most potent construct was found to be the construct of SEQ ID NO: 88 and the least was construct of SEQ ID NO: 101.

Figure 4:
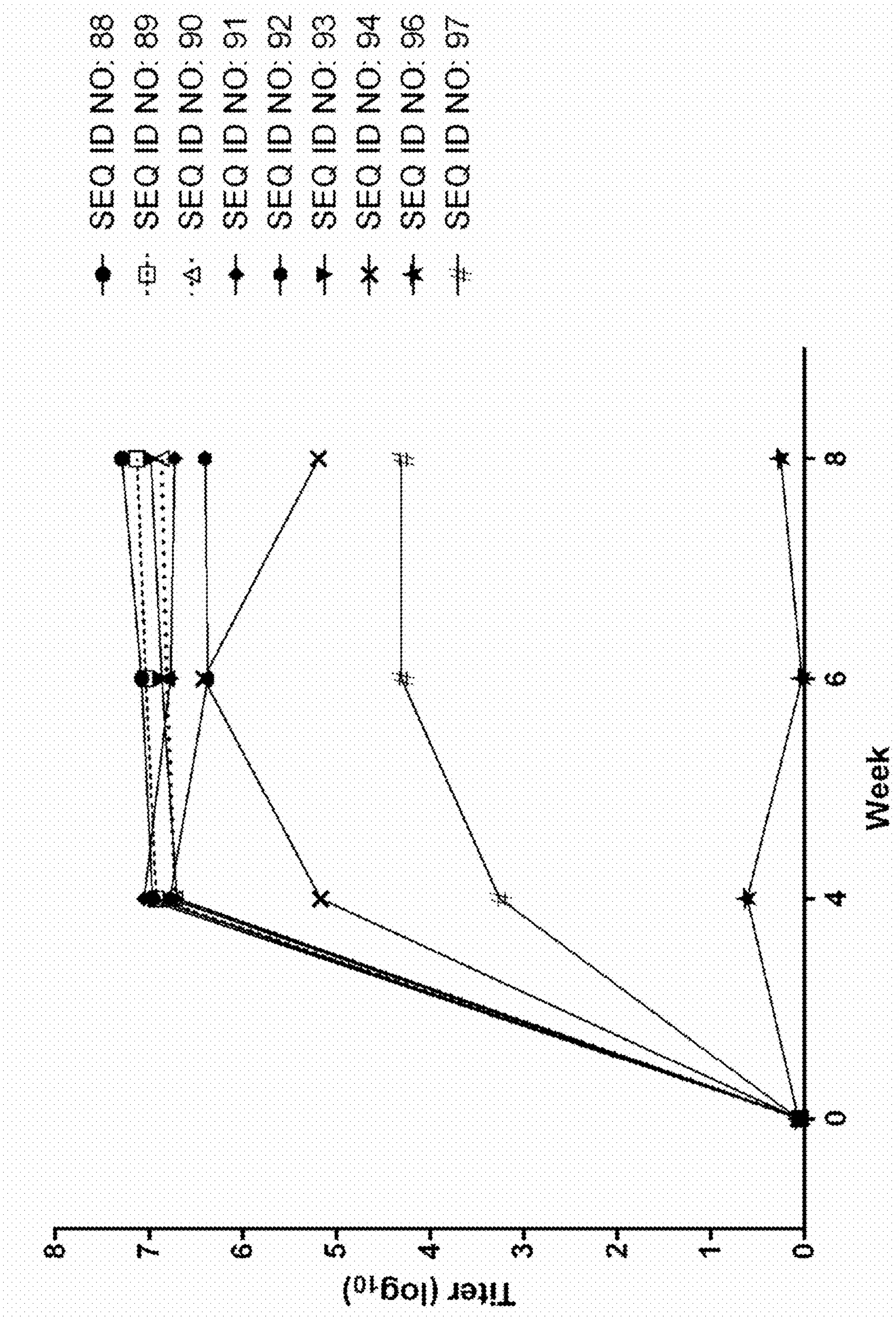
FIG. 4 is a graph that illustrates the kinetics of antibody response over an 8-week period in guinea pigs immunized with different IgE EMPD peptide immunogen constructs (SEQ ID NOs: 88 to 94, 96, and 97). Serum was diluted from 1:100 to 1:100000 by a 10-fold serial dilution. ELISA plates were coated with the IgE EMPD 1-39 peptide (SEQ ID NO: 5) at 0.5 μg peptide per well. The titer of a tested serum, expressed as $Log_{10}$, was calculated by linear regression analysis of the $A_{450}$ with the cutoff $A_{450}$ set at 0.5.

Careful calibration of immunogenicity for each and all IgE EMPD peptide immunogen constructs in different species including primates would assure ultimate Th peptide selection and success in the development of a final vaccine formulations.

iii) Assessment of Immunogenicity of IgE EMPD G1-C39 Peptide Immunogen Constructs for their Antibody Reactivities with Corresponding Full Length and IgE EMPD G1-C39 Peptides FIG. 4 illustrates the kinetics of antibody response over an κ-week period in guinea pigs immunized with different IgE EMPD peptide immunogen constructs (SEQ ID NOs: 88 to 94, 96, and 97). Serum was diluted from 1:100 to 1:10,000,000 by a 10-fold serial dilution. ELISA plates were coated with IgE EMPD 1-39 peptide (SEQ ID NO: 5) at 0.5 μg peptide per well. The titer of a tested serum, expressed as $Log_{10}$, was calculated by linear regression analysis of the A450 nm with the cutoff $A_{450}$ set at 0.5.

Figure 5:
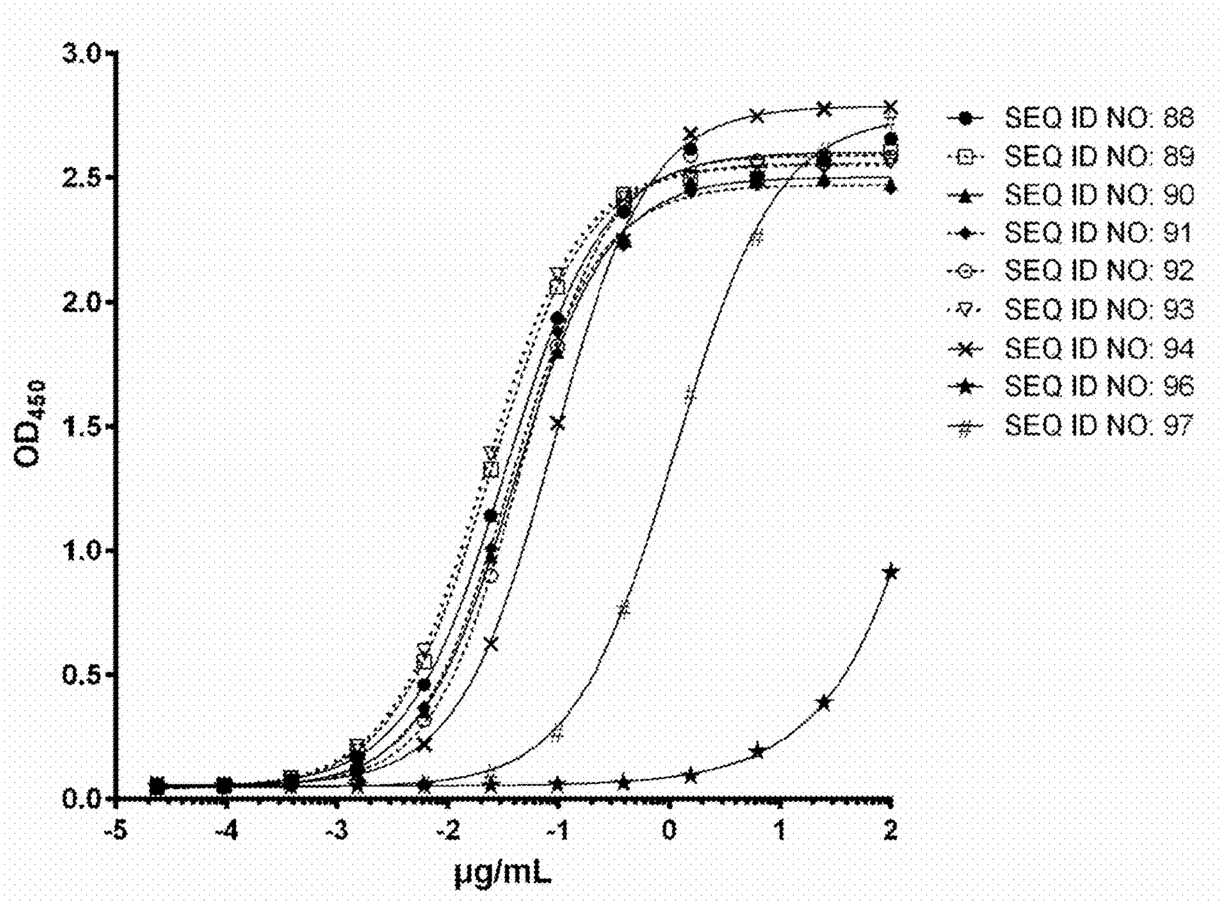
FIG. 5 is a graph that illustrates the titration curve of various purified polyclonal anti-IgE EMPD antibodies raised by different IgE EMPD immunogen constructs (SEQ ID NOs: 88 to 94, 96, and 97). ELISA plates were coated with a recombinant IgE EMPD-(SEQ ID NO: 1)-containing protein, γ1-em67 (SEQ ID NO: 1). Polyclonal anti-IgE EMPD antibodies purified from guinea pig sera by protein A chromatography were diluted from 100 μg/mL to 0.0238 ng/ml by a 4-fold serial dilution. The $EC_{50}$ of each polyclonal anti-IgE EMPD antibody was calculated by nonlinear regression with four-parameter logistic curve-fit with immunogen constructs SEQ ID Nos: 89 and 93 showing the best binding efficacy.

FIG. 5 illustrates the titration curve of various purified polyclonal anti-IgE EMPD antibodies raised by different IgE EMPD immunogen constructs (SEQ ID NOs: 88 to 94, 96, and 97). ELISA plates were coated with a recombinant IgE EMPD-containing protein, γ1-em67, which contains the sequence of SEQ ID NO: 1. Polyclonal anti-IgE EMPD antibodies purified from guinea pig sera by protein A chromatography were diluted from 100 μg/mL to 0.0238 ng/ml by a 4-fold serial dilution. The $EC_{50}$ of each preparation of polyclonal anti-IgE EMPD antibodies was calculated by nonlinear regression with four-parameter logistic curve-fit.

As shown in both FIGS. 4 and 5, peptide immunogen constructs from SEQ ID NOs: 88 to 94, which were selected from many other designs, demonstrated high immunogenicity with Logo titers mostly higher than 4. More precise measurements of $EC_{50}$ using purified antibodies from each group, as shown in FIG. 5, are from 0.02111 to 0.08892 μg/mL with IgE EMPD peptide immunogen constructs containing longer B cell epitope peptides of IgE EMPD 1-39 and IgE EMPD 7-40 (SEQ ID NOs: 88-94) showing considerably higher immunogenicity compared to peptide immunogen constructs containing shorter B cell epitope peptides of IgE EMPD (<20 residues in length), such as IgE EMPD 1-17 or IgE EMPD 19-38 (SEQ ID NOs: 96 and 97).

IgE EMPD peptide immunogen constructs containing a longer spacer between the B cell and Th epitopes also significantly reduced immunogenicity as in the case of IgE EMPD B cell epitope peptide design (SEQ ID NOs: 94 vs 89 for respective $EC_{50}$s of 0.08892 vs 0.02368). Among B cell epitope peptides longer than 20 residues in length, IgE EMPD 1-39 was found to be the most optimal in design and thus would be used most often in the following examples as the B cell epitope peptide in representative peptide immunogen designs for further assessment by various in vitro functional assays and in vivo efficacy assessment.

iv) Assessment of Immunogenicity of IgE EMPD Peptide Immunogen Constructs for their Antibody Binding to IgE Bearing B Cells that are Committed to B Cell Differentiation into IgE Secretion.

Figure 6A:
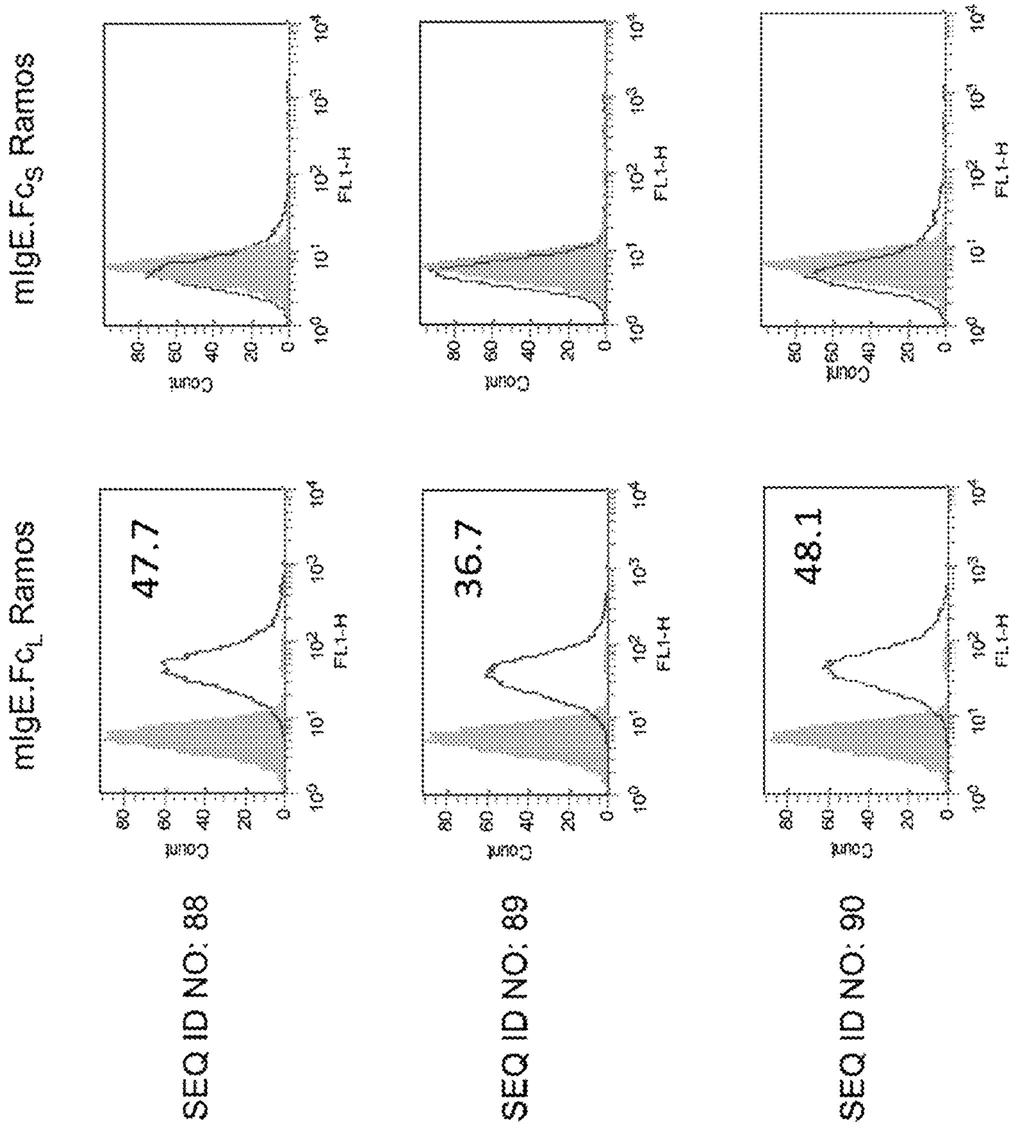
FIGS. 6A to 6C contain flow cytometry histograms that illustrate the binding of purified polyclonal antibodies from guinea pig sera pooled from animals immunized with IgE EMPD immunogen constructs to Ramos cell line cells expressing either mIgE.FcL (left side) or mIgE.FcS (right side). Polyclonal anti-IgE EMPD antibodies purified from guinea pig sera by protein A chromatography were used at 10 μg/mL with immunogen constructs having SEQ ID NOs from 88 to 94 showing respectable binding to mIgEL B cells when compared to immunogen constructs 96 and 97 with IgE EMPD B epitope peptide sizes smaller than 20 amino acid residues.
Figure 6B:
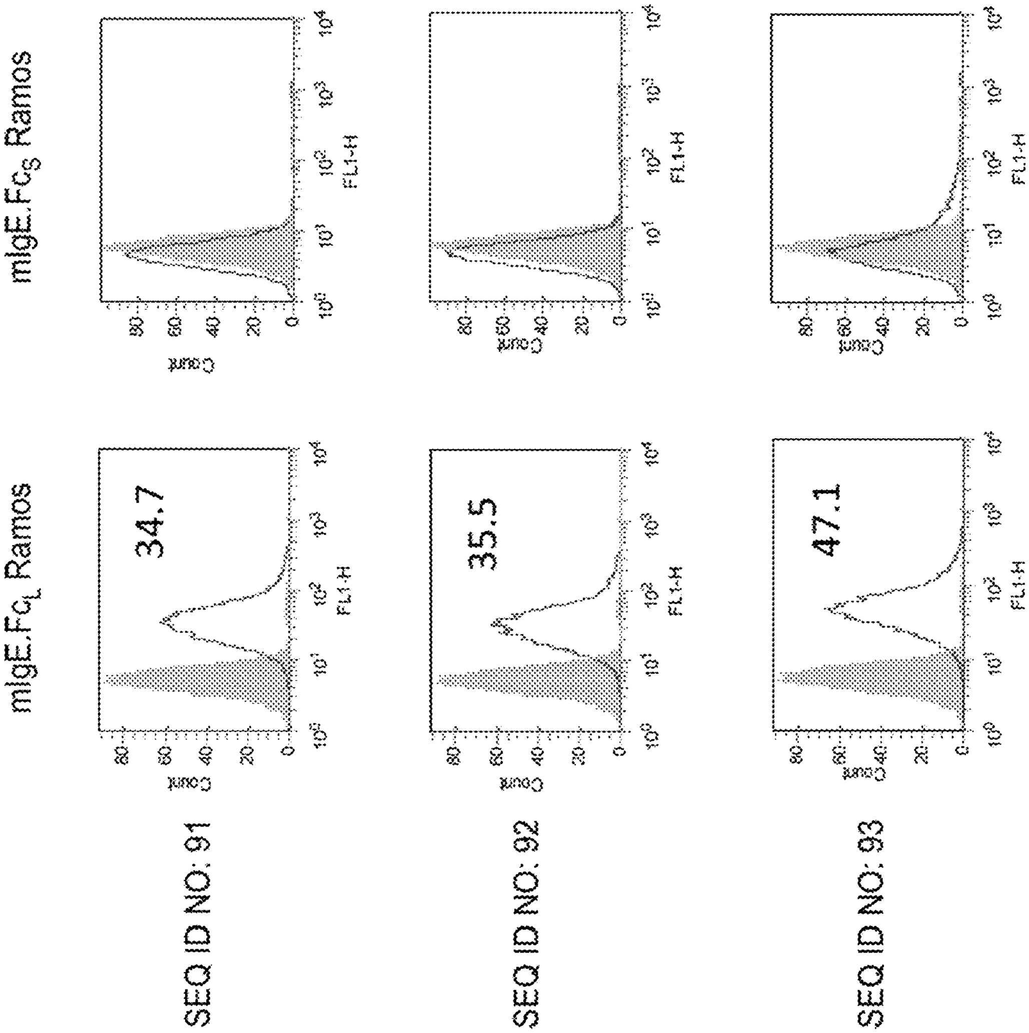
Figure 6C:
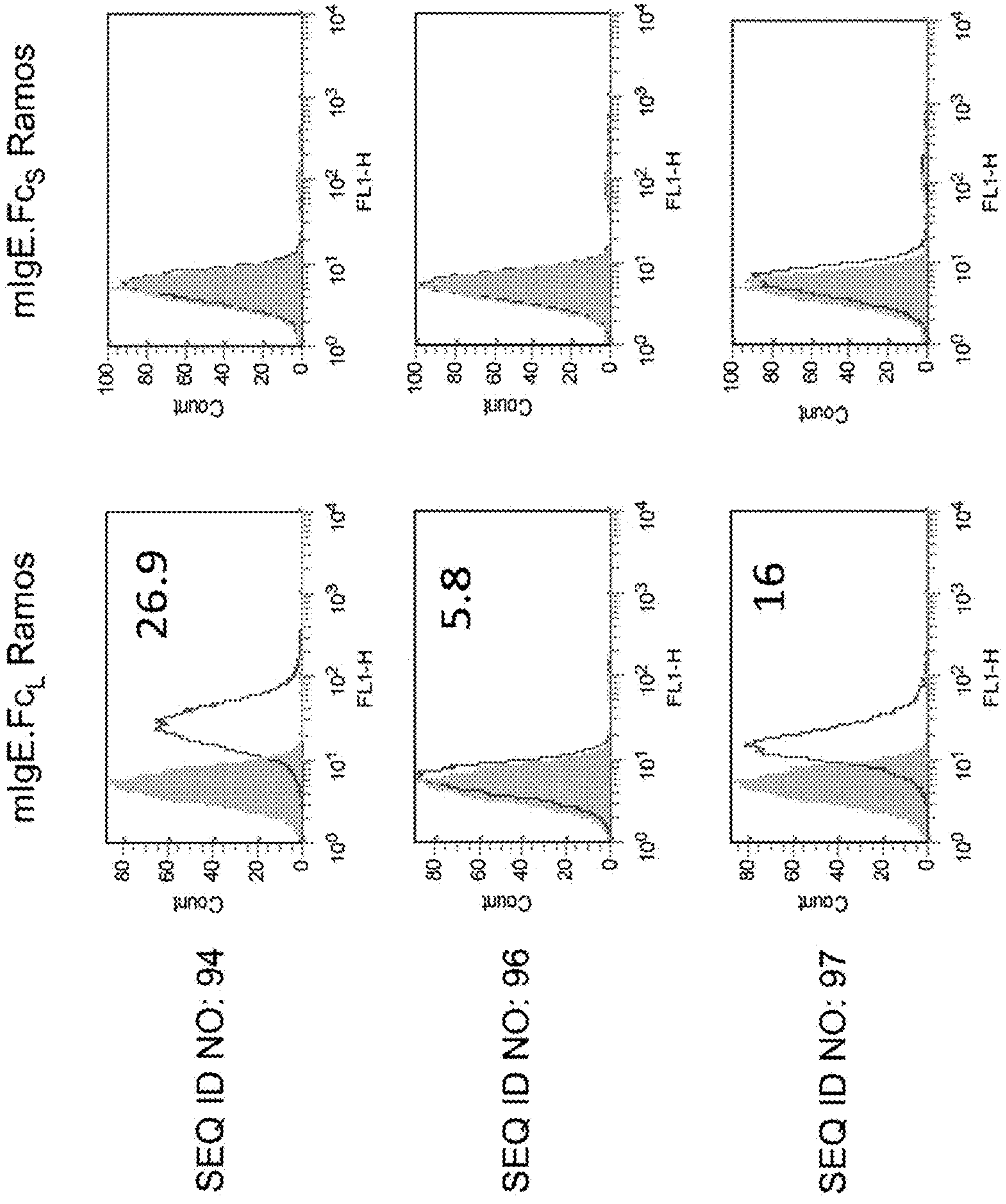

FIGS. 6A to 6C illustrate the binding to B cells derived from Ramos cell lines that express $mIgE.Fc_L$ or $mIgE.Fc_S$ (see Example 2 for method of cytoflurograph staining) by purified polyclonal antibodies from guinea pig sera pooled for each group of animals immunized with IgE EMPD immunogen constructs (SEQ ID NOs: 88 to 97). Polyclonal anti-IgE EMPD antibodies purified from guinea pig sera by protein A chromatography were used at 10 μg/mL.

Low background binding with cells from mIgE.FCs Ramos cell line missing the EMPD fragment of the target sequence was found with purified antibodies from all groups indicative of high specificity of this cell binding assay. As shown in FIGS. 6A to 6C, antibodies generated from animals immunized with IgE EMPD peptide immunogen constructs of SEQ ID NOs: 88 to 94, 96, and 97 had different binding affinities to $mIgE.Fc_L$ Ramos cell line cells. In particular, antibodies generated from IgE EMPD peptide immunogen constructs containing the long B cell epitope peptide IgE EMPD 1-39 (SEQ ID NOs: 88-94) demonstrated higher mIgE binding of $mIgE.Fc_L$ Ramos cell line cells compared to antibodies generated from IgE EMPD peptide immunogen constructs containing B cell epitope peptides with less than 20 residues (SEQ ID NOs: 96-97). Additionally, antibodies generated from IgE EMPD peptide immunogen construct having a shorter spacer (εK) had a higher mIgE binding of $mIgE.Fc_L$ Ramos cell line cells compared to constructs having a longer spacer (εK-KKK; SEQ ID NO: 129), which can be seen by comparing the results of SEQ ID NO: 89 in FIG. 6A with the results of SEQ ID NO: 94 in FIG. 6C.

A negative correlation was found between the group polyclonal antibodies $EC_{50}$ values and the percentage (%) of positive binding of IgE bearing cells. Percentage of IgE bearing B cell binding is an important functional parameter for assessment of both antibody crossreactivity and functional efficacy of the immunogenicity of an IgE EMPD peptide immunogen construct.

v) Assessment of immunogenicity of IgE EMPD peptide immunogen constructs for their Ability to Generate Antibodies with High Potency to Induce Apoptosis of IgE Bearing B Cells that are Committed to B Cell Differentiation into IgE Secretion.

Figure 7:
FIG. 7 is a graph that shows apoptosis of mIgE.FcL-expressing Ramos cells induced by various polyclonal anti-IgE EMPD antibodies directed against IgE EMPD immunogen constructs (SEQ ID NOs: 88 to 93). The level of apoptosis is expressed as % Annexin $V^+/PI^-$. Polyclonal anti-IgE EMPD antibodies purified from guinea pig sera by protein A chromatography were diluted from 1000 to 62.5 ng/ml by a 2-fold serial dilution. XOLAIR®, a humanized anti-IgE monoclonal antibody, was used as a positive control. The $EC_{50}$ of each set of polyclonal anti-IgE EMPD antibodies is shown under the graph and was calculated by nonlinear regression with four-parameter logistic curve-fit with immunogen constructs having SEQ ID NOs of 88, 90 and 93 showing best efficacy inducing apoptosis of mIgEL B cells.

FIG. 7 shows that apoptosis was induced by various preparations of polyclonal anti-IgE EMPD antibodies raised by IgE EMPD immunogen constructs (SEQ ID NOs: 88 to 93) in a dose dependent mode on the cell surface of $mIgE.Fc_L$-expressing Ramos cells. Polyclonal anti-IgE EMPD antibodies purified from guinea pig sera by protein A chromatography were diluted from 1000 to 62.5 ng/ml by a 2-fold serial dilution. Xolair®, a humanized anti-IgE monoclonal antibody, was used as a positive control. The $EC_{50}$ of each set of polyclonal anti-IgE EMPD antibodies was calculated by nonlinear regression with four-parameter logistic curve-fit.

As shown in FIG. 7, while Xolair® (an anti-IgE monoclonal antibody targeting the Fc receptor binding CH3 domain of an IgE molecule) is shown with the lowest $EC_{50}$ value (121.4 ng/mL) indicative of highest efficacy, its presence in serum would neutralize all such apoptosis inducing potency due to neutralization by serum IgE. Among the selected IgE EMPD peptide immunogen constructs tested (SEQ ID NOs: 88-93), $EC_{50}$ values from 277.5 to 536 ng/ml were observed indicative of high apoptosis inducing potency without serum IgE interference due to their binding to the unique EMPD target region sequence. These IgE bearing B cells are the cells committed to B cell differentiation into IgE secretion.

Induction of apoptosis of these cells by immunization of host with IgE EMPD peptide immunogen constructs (e.g.

SEQ ID NOs: 88-93) would trigger suppression of IgE synthesis leading to serum reduction of IgE, a major cause of allergic diseases.

vi) Assessment of Immunogenicity of IgE EMPD Peptide Immunogen Constructs for their Ability to Generate Antibodies with High Potency to Trigger Antibody Dependent Cell Mediated Cytotoxicity (ADCC) of IgE Bearing B Cells that are Committed to B Cell Differentiation into IgE Secretion.

Figure 8:
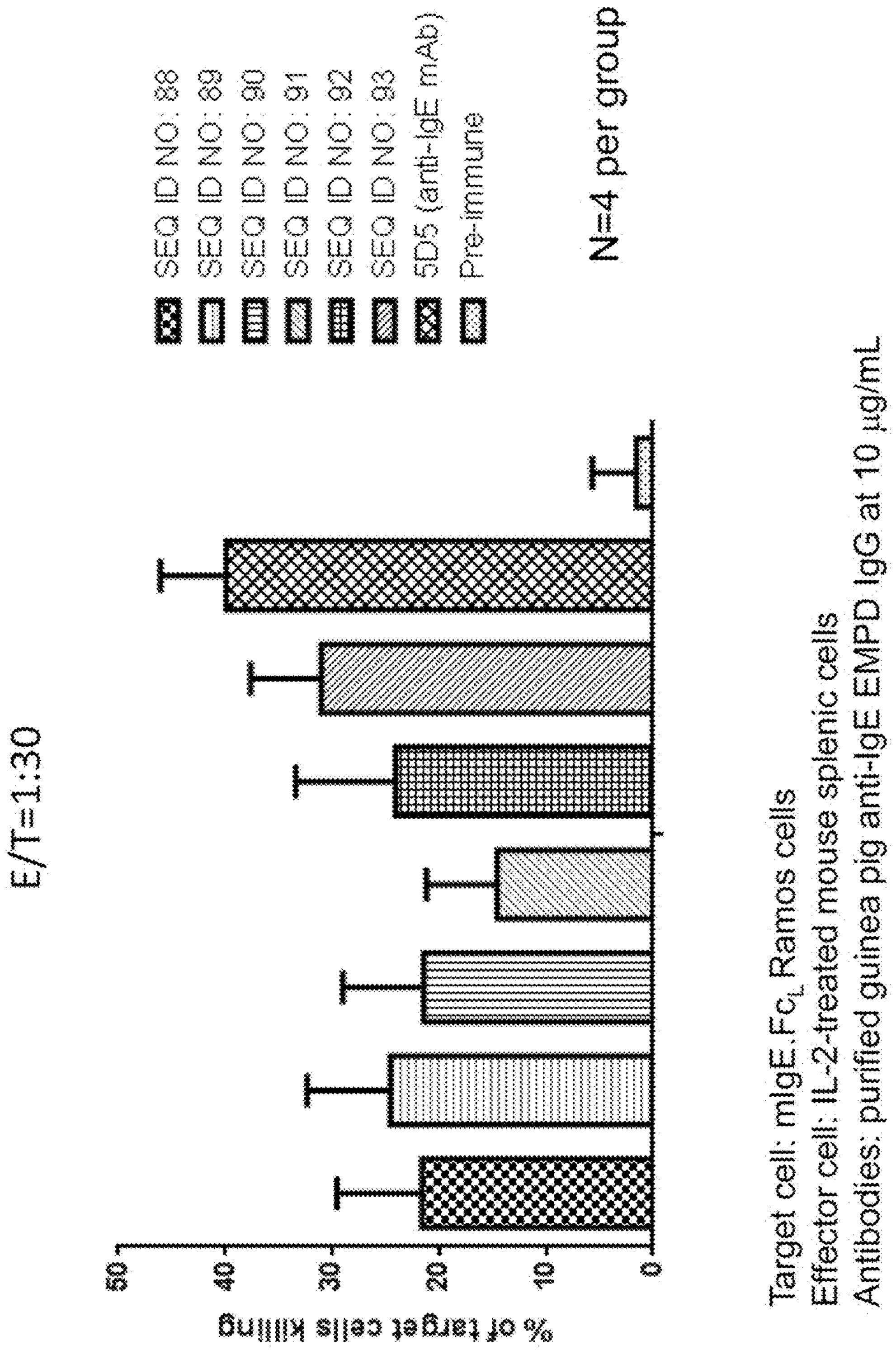
FIG. 8 is a bar graph that shows antibody-dependent cell mediated cytotoxicity (ADCC) of mIgE.FcL-expressing Ramos cells induced by polyclonal anti-IgE EMPD antibodies directed IgE EMPD immunogen constructs (SEQ ID NOs: 88 to 93) at an effector/target ratio of 1/30. Polyclonal anti-IgE EMPD antibodies purified from guinea pig sera by protein A chromatography were used at 10 μg/mL. IL-2-stimulated mouse splenic cells were used as effector cells and 5D5, a mouse anti-IgE monoclonal antibody, was used as a positive control.

FIG. 8 shows that various preparations of polyclonal anti-IgE EMPD antibodies generated by different immunogen constructs of IgE EMPD (SEQ ID NO: 88 to 93) were able to induce ADCC against mIgE.$Fc_L$-expressing Ramos cells at an effector/target ratio of 30. Polyclonal anti-IgE EMPD antibodies purified from guinea pig sera by protein A chromatography were used at 10 μg/mL. IL-2-stimulated mouse splenic cells were used as effector cells. A mouse anti-IgE monoclonal antibody 5D5 secretion was used as a positive control.

As shown in FIG. 8, all peptide immunogen constructs with long B cell epitope peptides having more than 20 amino acid residues (SEQ ID NOs: 88-93) induced ADCC of IgE bearing B cells that are committed to B cell differentiation into IgE secretion indicative of reduction and suppression of IgE serum levels upon immunization of host with such peptide immunogen constructs.

vii) Broadening of MHC Coverage by Using IgE EMPD Derived Peptide Immunogen Constructs with Different Promiscuous T Helper Epitopes.

When designing a pharmaceutical composition to treat patients of diverse genetic background, it is important to allow the design to cover maximal population with diverse genetic background. Since promiscuous T helper epitopes derived from MVF or HBsAg represent among the most potent ones to provide such immunogenicity enhancement, combination of peptide constructs containing these two helper T epitopes could be designed to allow for synergistic immunogenicity effect. A mixture of two peptide immunogen constructs with the same B cell epitopes would be expected to elicit a respectable immune response when compared to that elicited by the respective individual peptide construct.

viii) Epitope Mapping for Fine Specificity Analysis by Immune Sera (9 Wpi) Elicited by Various IgE EMPD Peptide Immunogen Constructs The design of an IgE-EMPD vaccine containing an IgE EMPD peptide immunogen construct was focused on the special loop structure of C18-C39 in the middle region of IgE-EMPD as a functional and structural target. This structure-based design aims to retain the native extracellular loop structure as an immunogenic target.

Four representative IgE-EMPD peptide fragments of 1-17 (SEQ ID NO: 7), 19-38 (SEQ ID NO: 8), 1-39 (SEQ ID NO: 5) and 7-40 (SEQ ID NO: 6) were used for designing the B cell epitope peptides that were linked with UBITh®1 (SEQ ID NO: 72) or UBITh®2 (SEQ ID NO: 73) in N- or C-terminus of the B cell epitope peptides to form the prototype peptide immunogens. The εK linker or εK-KKK (SEQ ID NO: 129) spacer was used between the B cell and Th epitopes to form the peptide immunogen constructs shown in Table 3 (SEQ ID NOs: 88 to 97). All peptide fragments with amino acids (aa) 1-39 and 7-40 were designed with a C18-C39 constrained loop structure by cyclization.

ELISA tests using individual IgE-EMPD B cell epitope peptides of 1-17 (SEQ ID NO: 7), 19-38 (SEQ ID NO: 8), 1-39 (SEQ ID NO: 5) and 7-40 (SEQ ID NO: 6) for plate coating were evaluated for antibody reactivities of the hyperimmune sera obtained from guinea pigs immunized with their corresponding peptide immunogen constructs (SEQ ID NOs: 96, 97, 88, 89, 93). The results showed that constructs SEQ ID NOs: 88, 89, and 93 induced high titer antibodies against all four IGE EMPD B cell epitope peptides while the guinea pig antisera induced by IgE-EMPD 1-17 (SEQ ID NO: 96) and IgE-EMPD 19-38 (SEQ ID NO: 97) peptide immunogen constructs had only antibody reactivity with their corresponding B cell epitope peptides (e.g. SEQ ID NOs: 7 or 8) while having no cross-reactivity to the IgE EMPD B cell epitope peptides (SEQ ID NOs: 8 or 7) from the non-corresponding neighboring epitope, indicative of the high specificity of the immunogenicity, i.e. the designed immunogen constructs are able to evoke specific antibodies to react with the IgE-EMPD corresponding B cell epitope domains (Table 5).

In a fine epitope mapping study (Table 5) to localize the antibody binding site(s) to specific residues within the target region, 50 overlapping 10-mer peptides (SEQ ID NOs: 10 to 58) were synthesized that cover the first 8 amino acids from IgE CH4 C terminus and 1 to 50 amino acid sequence region of IgE-EMPD. These 10-mer peptides were individually coated onto 96-well microtiter plate wells as solid-phase immunoabsorbents. The pooled guinea pig antisera were added at a 1:100 dilution in specimen diluent buffer to the plate wells coated with 10-mer peptide at 2.0 μg/mL followed by incubation for one hour at 37° C. After washing the plate wells with wash buffer, the horseradish peroxidase-conjugated rProtein A/G was added and incubated for 30 min. After washing with PBS again, the substrate was added to the wells for measurement of absorbance at 450 nm by ELISA plate reader, when the samples were analyzed in duplicate. The binding of IgE-EMPD peptide immunogen elicited immune sera to the corresponding IgE EMPD B cell epitope peptide coated wells represent the maximal antibody binding signal.

The fine epitope mapping results showed that the pooled guinea pig sera from IgE-EMPD 19-38 derived peptide immunogen construct (SEQ ID NO: 97, with a non-cyclized linear B cell epitope, H19-R38) recognize IgE EMPD 22-31 peptide (SEQ ID NO: 39) located in the middle region of IgE-EMPD. It also reacted with IgE EMPD peptide 19-38 (SEQ ID NO: 8), 1-39 (SEQ ID NO: 5) and 7-40 (SEQ ID NO: 6), but not 1-17 (SEQ ID NO: 7).

The antisera induced by IgE EMPD 1-17 (SEQ ID NO: 96, a non-cyclized linear B cell epitope, G1-L17) recognized IgE EMPD 8-17 (SEQ ID NO: 25) in the N terminal region of IgE-EMPD, as well as IgE EMPD 1-17 (SEQ ID NO: 7), 1-39 (SEQ ID NO: 5) and 7-40 (SEQ ID NO: 6), but not 19-38 (SEQ ID NO: 8) peptide. The antisera induced by IgE EMPD1-17 (SEQ ID NO: 96) and IgE EMPD 19-38 (SEQ ID NO: 97) immunogen constructs had no cross-reactivity.

Interestingly, two counterpart IgE-EMPD 1-39 immunogen constructs with UBITh®1 epitope linked to the IgE EMPD B cell epitope peptide at either N-terminus (SEQ ID NO: 89) or the C-terminus (SEQ ID NO: 88) generated immune sera recognizing distinctly different epitope binding pattern. The immune sera induced by immunogen construct (SEQ ID NO: 89, UBTh1 located at the N-terminus of the peptide) reacted strongly with only one 10-mer peptide of (SEQ ID NO: 47) at aa 30-39, nearby the C-terminal region of IgE-EMPD. It also reacted weakly with IgE EMPD 9-18 at the N-terminal region (SEQ ID NO: 27).

However, for other IgE-EMPD 1-39 immunogen construct (SEQ ID NO: 88, UBTh1 located at the C terminus), the induced antisera reacted strong with three discontinuous linear epitopes represented by IgE EMPD 9-19 (SEQ ID NO: 27 and 28); IgE EMPD 19-31 (SEQ ID NO: 37, 38, 39 and 40) and IgE EMPD 30-43 (SEQ ID NO: 48, 49, 50, 51 and 52). Peptide immunogen construct (SEQ ID NO: 88) demonstrated far stronger immunogenicity and reacted with a much broader surface than IgE EMPD peptide immunogen construct (SEQ ID NO: 89). This finding of far stronger immunogenicity associated with peptide immunogen construct (SEQ ID NO: 88) also displayed a much stronger ADCC and apoptosis activities on IgE-expressing lymphocytes than IgE EMPD peptide immunogen construct (SEQ ID NO: 89).

As for the IgE-EMPD 7-40 immunogen construct (SEQ ID NO: 93, with two UBTh1 located at both N- and C-termini of the IgE EMPD B cell epitope peptide), its induced antisera recognized two major antigenic regions similar to those recognized by IgE-EMPD 1-39 in that it reacted strongly with peptides in the region of IgE EMPD 18-33 covered by peptides of SEQ ID NOs: 35-41; IgE EMPD 29-43 (SEQ ID NOs: 45-51). IgE-EMPD 7-40 immunogen construct (SEQ ID NO: 93) shares similar antigenic determinant regions with IgE-EMPD 1-39 immunogen construct (SEQ ID NO: 88, the UBTh1 in C-terminus of IgE EMPD B cell epitope peptide). IgE-EMPD 1-39 (SEQ ID NO: 88) displayed the best efficacy among all designed peptide immunogen constructs as shown by several functional assays which correlated with the results shown in its fine epitope mapping in that this immunogen construct elicited high binding polyclonal antibodies recognizing a broad surface covered by three or more B cell epitope peptides on the extracellular membrane protein of IgE-EMPD. The IgE EMPD 30-43 (SEQ ID NOs: 47-51) epitope region represents a very important B cell epitope region, located at the C-terminal region of a looped structure with proximity to the IgE bearing B cell basal membrane, susceptible to antibody mediated apoptosis and ADCC. In addition, a cyclized looped structure presents a better quality immunogen construct than its non-cyclic counterpart (Table 5 SEQ ID NO: 88 vs SEQ ID NO: 88 non-cyclized).

In summary, the designed synthetic IgE-EMPD peptide immunogen constructs (IgE EMPD 1-39, SEQ ID NO: 88) and (IgE EMPD 7-40, SEQ ID NO: 93) both with a B cell epitope peptide represented by a looped structure within IgE EMPD that is linked to UBITh®1 epitope peptide which induced a robust immune response generating polyclonal antibodies targeted at a new epitope region (aa 29-43) on IgE-EMPD protein which have close proximity to the cell membrane due to its location at the C-terminal region of the central loop structure, allowing for crosslinking of as many membrane IgE as possible to induce ADCC and apoptosis for depletion of IgE-expressing B lymphocytes (Table 5).

Example 7

Focused Antibody Response Found to be Directed Exclusively Towards the B Cell Epitope of the IgE EMPD Peptide Immunogen Construct It is well known that all carrier proteins (e.g. Keyhole Limpet Hemocyanin (KLH) or other carrier proteins such as Diphtheria toxoid (DT) and Tetanus Toxoid (TT) proteins) used to potentiate an immune response directed against a targeted B cell epitope peptide by chemical conjugation of such B cell epitope peptide to the respective carrier protein will elicit more than 90% of the antibodies directed against the potentiating carrier protein and less than 10% of the antibodies directed again the targeted B cell epitope in immunized hosts.

It is therefore of interest to assess the specificity of the antibodies elicited by the IgE EMPD peptide immunogen constructs of the present invention. A representative IgE EMPD peptide immunogen construct (SEQ ID NO: 94) with B cell epitope (SEQ ID NO: 5) linked through a spacer sequence ε-KKK (SEQ ID NO: 129) to the heterologous T cell epitope UBITh®1 (SEQ ID NO: 72) was prepared for immunogenicity assessment. The UBITh®1 (T helper peptide used for B epitope immunopotentiation) was coated onto the plates and the sera from immunized guinea pigs were employed to test for cross reactivities with the UBITh®1 peptide used for immunopotentiation. Table 7 shows that the antibodies generated from the IgE EMPD peptide immunogen construct (SEQ ID NO: 94) had high immunogenicity towards the corresponding targeted B epitope of IgE EMPD (SEQ ID NO: 5); whereas most, if not all, of the immune sera were found to be non-reactive to the UBITh®1 peptide (SEQ ID NO: 72).

In summary, immunogen design incorporating target B cell epitope linked to carefully selected T helper epitope results in the generation of a focused and clean immune response that elicits antibodies targeted only to the IgE EMPD B cell epitope and not the Th epitope used to potentiate the immune response. For pharmaceutical composition design, the more specific the immune response an immunogen generates, the higher safety profile it provides for the composition. The IgE EMPD peptide immunogen construct of this instant invention is thus highly specific yet highly potent against its target.

Example 8

Effects of Immunotherapeutic Allergy Vaccine in Both Preventative and Therapeutic Models on Serum IgE Levels of Genetically Modified Knockin Mice IgE EMPD peptide immunogen constructs of SEQ ID NO: 88 and SEQ ID NO: 93 were selected to evaluate the IgE production in the primary and secondary/memory response in a proof of concept study using the human IgE expressing genetically engineered mice, an F1 offspring of HuIGHE×Balb/c knock-in mice.

Initially, the IgE EMPD peptide immunogen prime-boost immunizations were conducted prior to the sensitization by allergen (e.g., Papain) challenge. Eight animals (n=8) were assigned to each of six treatment groups and one placebo group, with a total of 7 groups. For each of two peptide immunogens, three subgroups with different doses were designed at 9 (low), 18 (medium), and 40 (high) μg/dose by i.m. route at weeks 0, 3, and 5. The peptide immunogens were formulated with adjuvants of ISA 51VG and CpG to enhance immune responses. The mice in the placebo group were injected with only vehicle of formulation solution at weeks 0, 3, and 5 intramuscularly. At weeks 10 and 16, all animal groups, including placebo group, were sensitized with 50 μg papain with TiterMax Gold adjuvant by subcutaneously route (FIG. 10).

Figure 11:
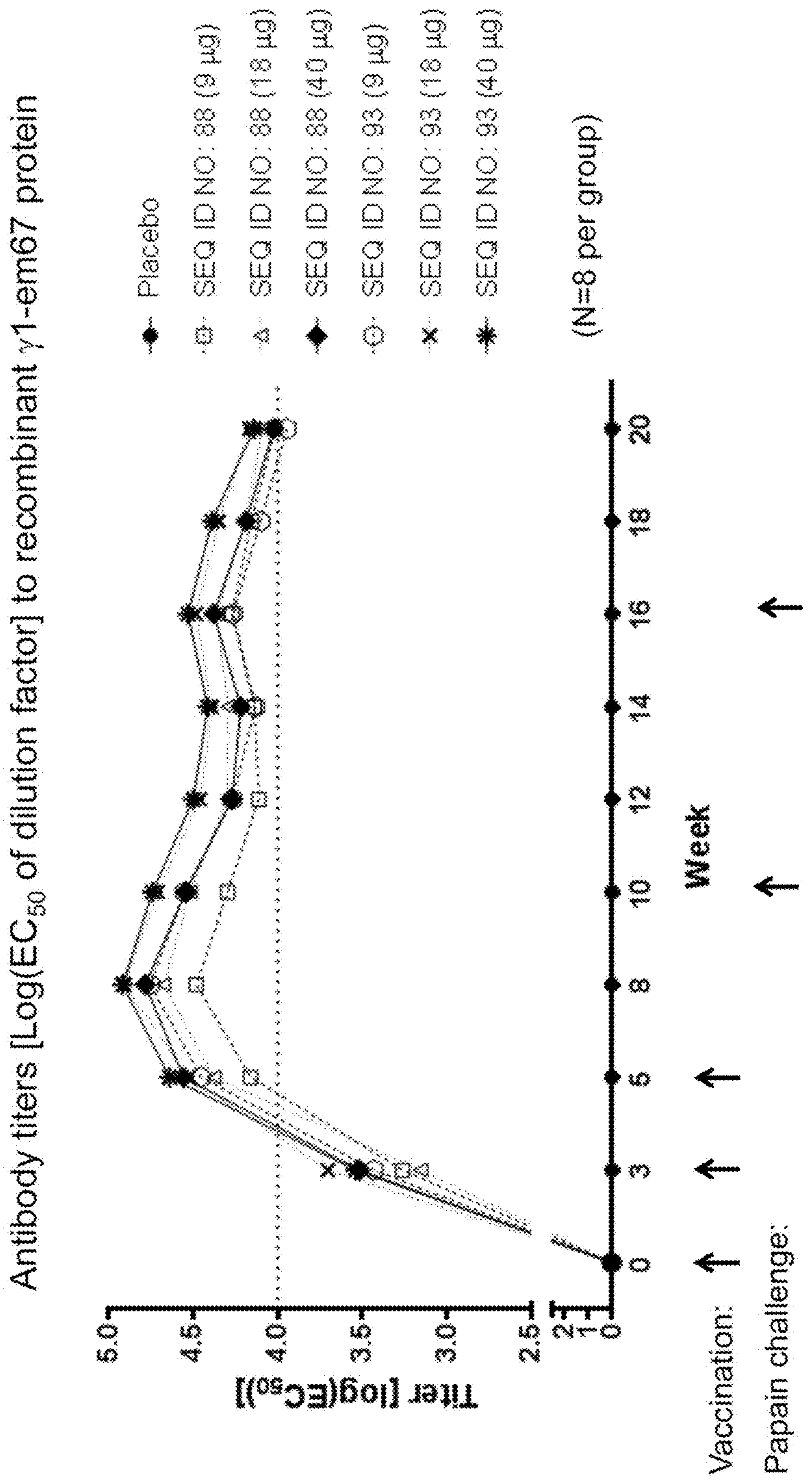
FIG. 11 is a graph that illustrates the kinetics of anti-IgE antibody production during a 20-week period using the experimental design described in FIG. 10. Specifically, the graph shows the antibody response in human IGHE knockin hybrid mice (hIGHE×Balb/c, n=8 per group) immunized intramuscularly with an IgE EMPD immunogen construct (SEQ ID NO: 88 or 93) at the indicated doses (100 μL per immunization) three times at weeks 0, 3 and 5 and subcutaneously challenged with papain/TiterMax at weeks 10 and 16. Mouse serum was diluted from 1:100 to 1:$(4.19\times10^8)$ by a 4-fold serial dilution. ELISA plates were coated with a recombinant IgE EMPD-containing protein, γ1-em67. The titer of a tested serum, expressed as Log($EC_{50}$) of dilution factor, was calculated by nonlinear regression with four-parameter logistic curve-fit.

Antibody response (IgG titers against γ1-εm67 fusion protein) by the two peptide immunogens were determined by ELISA assay, as described in Example 2. All mice developed robust antibody responses in the six treatment groups immunized with different doses at weeks 0, 3, 5. The ELISA data show that serum samples from all treatment groups with high antibody titers specifically bind to recombinant γ1-εm67 fusion protein beginning at week 3, and remained at high titers through week 20 (FIG. 11). In contrast, mice in the placebo group did not generate specific antibodies against recombinant γ1-εm67 fusion protein. These results indicate that all treatment groups generated anti-IgE-EMPD antibodies with the potential ability to target IgE-expressing B lymphocytes resulting in the inhibition of IgE production. FIG. 11 illustrates that high antibody titers were sustained throughout the whole study period of 20 weeks. These results also indicate that the peptide immunogens (SEQ ID NO: 88 and SEQ ID NO: 93) are very immunogenic at inducing specific immune response generating high titers anti-IgE EMPD antibodies even in the low dose group (9 μg/dose) from each of two vaccine immunogens.

Figure 12:
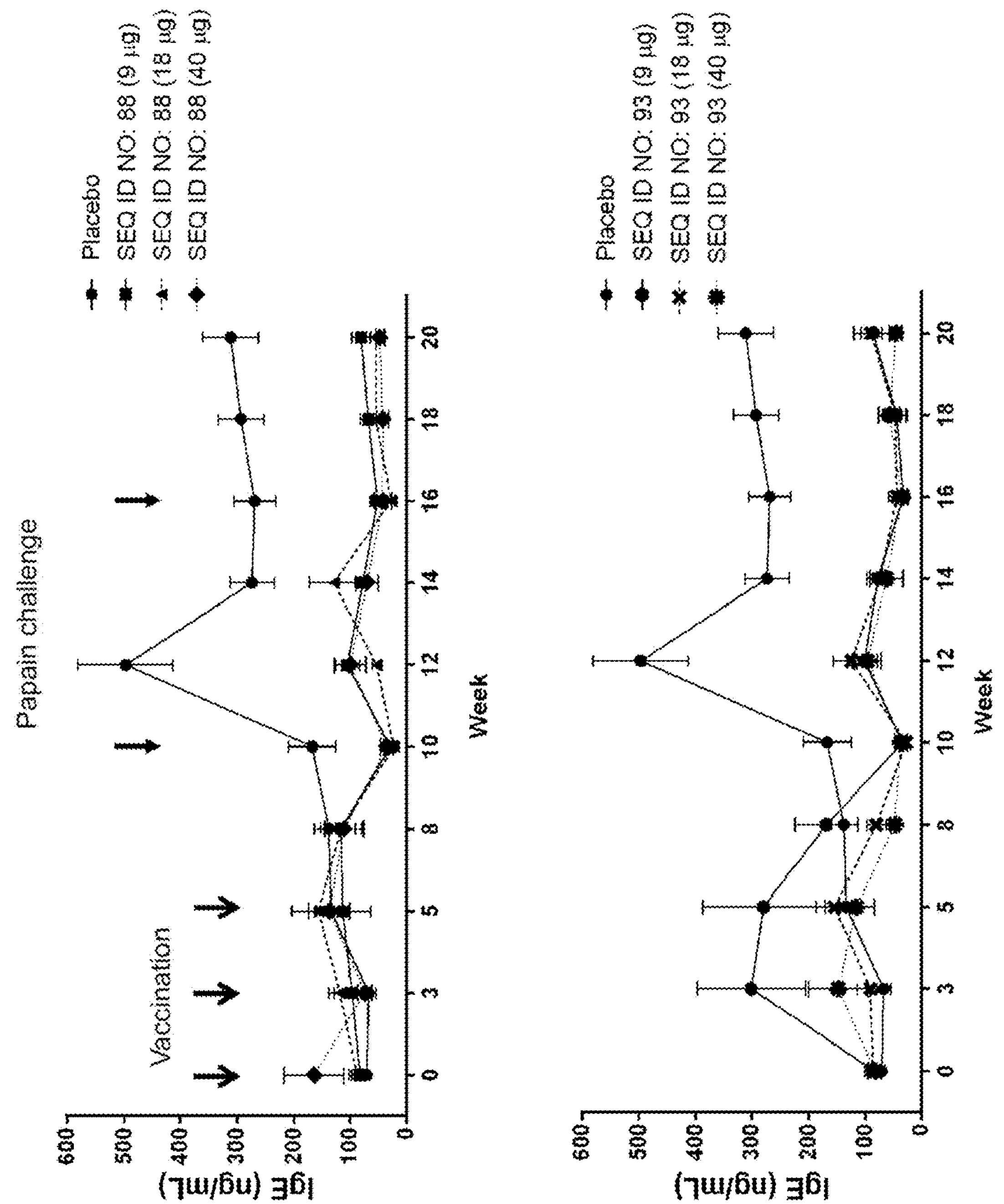
FIG. 12 is a graph that illustrates the changes of serum IgE during a 20-week period using the experimental design described in FIG. 10. Specifically, the graph shows the serum level of IgE in human IGHE knockin hybrid mice (hIGHE×Balb/c, n=8 per group) intramuscularly immunized with an IgE EMPD immunogen construct (SEQ ID NO: 88 or 93) at the indicated doses (100 μL per immunization)

The immunization effects on IgE production in the primary and memory responses from immunized mice were investigated by measuring of serum basal IgE levels and allergen-specific IgE levels, with the assay procedures described in Example 2. The serum basal IgE levels for pre- and post-vaccination are shown in FIG. 12, which demonstrated that mouse serum basal IgE levels in all treatment groups gradually decreased as compared to that of the corresponding time point in the placebo group. At week 10, before the sensitization, the basal IgE levels decreased to the lowest level in all six treatment groups, while the basal serum IgE levels of the placebo group did not change considerably. This result indicates that, at week 10, the basal IgE production in all treatment groups was significantly suppressed in animals receiving a vaccine formulation containing an IgE EMPD peptide immunogen construct (either SEQ ID NO: 88 or 93) when compared to the placebo group. FIG. 12 also shows that basal serum IgE levels in all treatment groups were suppressed throughout the 20 week study period, even after two allergen sensitizations at week 10 and 16.

Allergen-specific IgE production induced by papain with the prime at week 12 and second sensitization at week 18 is shown in FIGS. 13 and 14, respectively. These results indicate that both peptide immunogen constructs (SEQ ID NOs: 88 and 93) were able to significantly suppress papain-specific IgE levels after both prime and secondary allergen-sensitization when compared to the placebo group. There were no substantial differences observed among the three dose levels in any of the two peptide immunogens. Upon the generation of allergen-specific IgE in the primary response at week 12, the peptide immunogen (SEQ ID NO: 88) performed slightly better than (SEQ ID NO: 93) in this study, as shown in FIG. 13. Both IgE EMPD peptide immunogen constructs displayed significantly suppression of allergen-specific IgE production when compared with the placebo group in both primary and memory responses (FIGS. 13 and 14).

For further investigation on the potential therapeutic effect of IgE-EMPD peptide immunogen constructs (SEQ ID NO: 88 and SEQ ID NO: 93) targeting IgE-expressing B cell to suppress IgE production and treat IgE-mediated allergic disease, an additional protocol was designed to evaluate the effect of these two peptide immunogen constructs on a sensitization/recall response in HuIGHE knock-in Mice. Six animals were assigned to each of the two treatment groups (N=6) and four animals for the placebo group (N=4), with a total of three groups. Mice in all groups received sensitization twice, pre- and post-peptide vaccinations respectively, with 50 μg papain/TiterMax Gold adjuvant by subcutaneous route at week 0 and footpad route at week 12. A prime-boost immunization regimen with 40 μg/0.1 mL of formulation containing one of the two peptide immunogen constructs at weeks 3, 6 and 8 were evaluated in both treatment groups, with the placebo group administered with only adjuvant vehicle (see FIG. 15).

The results showed that all groups, including the placebo, sensitized with papain, elicited high titers of papain-specific IgGs in all three groups after week 2, and remained high titers until week 6 (the last time period observed). Both total serum IgE and papain-specific IgE levels reached the highest levels at week 2, and then gradually declined beginning at week 3 and returned to baseline at week 6 (FIG. 16).

Vaccination with the IgE EMPD peptide immunogen constructs elicited high titer antibodies that specifically recognize the γ1-εm67 fusion protein. After three injections of peptide immunogens at weeks 3, 6 and 8, the elicited antibody IgG titers (against anti-γ1-εm67 or anti-IgE-EMPD) steadily elevated and reached the highest level at week 10 (data not shown). At week 12, upon the second papain sensitization, none of the two treatment groups showed elevated papain-specific IgE levels; however, the papain-specific IgE level significantly increased in placebo group at week 12 and 13, and then dropped to lower level at week 14 (data not shown).

The study results indicate the IgE EMPD peptide immunogens of SEQ ID NOs: 88 and 93 are able to induce specific humoral immune response to prevent recall proliferative responses of memory B cells in vivo, which completely blocked papain-specific IgE production evoked by papain recall at week 12 when compared to that of the placebo group (FIG. 17). Overall, this study indicates the disclosed IgE EMPD peptide immunogen constructs induced antibody responses not only inhibit the generation of allergen-specific serum IgE from primary sensitization but also steadily suppress the recalled allergen-specific serum IgE from the secondary allergen challenge. This study result demonstrates that the disclosed invention provides a potential efficacious therapeutic vaccine for treatment of IgE mediated allergic diseases, such as asthma. Upon close examination of the therapeutic efficacy to attenuate allergen-specific IgE, both peptide immunogens (SEQ ID NO: 88 and SEQ ID NO: 93) exhibited similar efficacy in inhibiting allergen-specific IgE production.

Example 9

Dosing and Formulation Studies Through Assessment of Immunogenicity of Prototype Immunotherapeutic Allergy Vaccine Formulations in Cynomolgus Macaques a. Overall Goal

The goal of this study was to assess the effects of intramuscular immunizations with a selected IgE EMPD peptide immunogen construct SEQ ID NO: 88 over a 20 week period on immunogenicity. Cynomolgus macaques were selected as an animal model for evaluation of the immunogenicity of prototype IgE-EMPD peptide vaccine formulation and dosing regimen prior to conducting human studies. A representative peptide immunogen construct (SEQ ID NO: 88) was formulated into two commonly used formulations. In the first formulation, the IgE EMPD peptide immunogen construct of SEQ ID NO: 88 was made into a stabilized immunostimulatory complex with CpG prior to forming a water in oil emulsion mixed with Montanide™ ISA51 (Part A study). In the second formulation, the IgE EMPD peptide immunogen construct of SEQ ID NO: 88 was made into a stabilized immunostimulatory complex with CpG prior to forming a suspension formulation with ADJUPHOS (Part B). Four dosings from 30 μg, 100 μg, 300 μg to 1000 μg per dose were assessed in each of the formulations in this comprehensive immunogenicity study.

b. Protocol Summary

Adult cynomolgus macaques at 2.5-4.0 kg were selected to evaluate the effects of the IgE EMPD peptide immunogens on immunogenicity and serum macaque IgE level. A total of 20 macaques were separated into 10 groups: placebo control animals (n=2) were injected with the adjuvant only (Montanide™ ISA 51 plus CpG oligodeoxynucleotide) or (ADJUPHOS plus CpG oligodeoxynucleotide). Experimental animals were injected with the IgE EMPD peptide immunogen (SEQ ID NO: 88) at the doses of 30, 100, 300, and 1,000 μg per group (total 500 μL vaccine volume per animal; n=2 per group, 1 male and 1 female). A total of three intramuscular immunizations were administered at weeks 0, 3 and 6. All macaques were monitored for immunogenicity and serum IgE level at weeks 0, 3, 6, 8, 10, 12, 14, 16, 20, and 24.

c. Determination of Anti-IgE EMPD Antibody Titers

All animals were bled at weeks 0, 3, 6, 8, 10, 12, 14, 16, 20 and 24. Serum was separated for each bleed to determine anti-IgE EMPD antibody titers using the γ1-cyno em67 ELISA. The placebo-treated animals had little to no detectable anti-IgE EMPD antibody titers (FIGS. 18A and 18B). However, all animals that received three immunizations had detectable IgG antibody titers against IgE EMPD B epitopes with peak titers obtained at weeks 8 to 12. Such specific reactivities were maintained throughout the 24 week study in a dose dependent fashion (FIGS. 18A and 18B). All animals were found with high anti-serum titers against γ1-cyno εm67 recombinant protein with 300 μg in 0.5 mL per dose being the most optimal for both formulations since 1,000 μg dose formulation would result in an excess of peptide immunogen vs the ISA51V or ADJUPHOS adjuvant in the respective formulations. The results show that the formulations containing ISA51/CpG ODN had higher immunogenicity results compared to the formulations with ADJUPHOS/CpG ODN. Antibody response towards IgE EMPD B cell epitope was enhanced along with each peptide immunogen boosts and then the anti IgE EMPD titers gradually decline over time. Significantly high anti-serum titers were sustained throughout the 24 week study (FIGS. 18A and 18B).

Example 10

Proof of Efficacy with the Surrogate Immunotherapeutic Allergy Vaccine in Cynomolgus Macaques a. Overall Goal The goal of this study was to assess the effects of intramuscular immunizations with the IgE EMPD peptide immunogens, of which the sequence was derived from self mIgE, over a 20 week period on immunogenicity and serum IgE level in cynomolgus macaques, which is an animal model that closely mimics human IgE production. The IgE EMPD of mIgE is evolutionally conserved in non-human primates (e.g., new and old world monkeys, and apes) and such IgE EMPD counterpart sequences were not found in other species (e.g., rodents, rabbits and canine). The amino acid sequence of cynomolgus macaque IgE EMPD (SEQ ID NO: 127) has high sequence identity (90%) to that of human IgE EMPD (SEQ ID NO: 2).

b. Protocol Summary

Adult cynomolgus macaques at 2.5-4.0 kg were selected to evaluate the effects of the IgE EMPD peptide immunogens on immunogenicity and serum macaque IgE level. A total of 12 macaques were separated into 3 groups: placebo control animals (n=4, 2 male and 2 female) were injected with the adjuvant only (Montanide™ ISA 51 plus CpG oligodeoxynucleotide); experimental animals were injected with the IgE EMPD peptide immunogens (SEQ ID NOs: 125 or 126) at a dose of 300 μg (total 500 μL vaccine volume per animal; n=4 per group, 2 male and 2 female). A total of three intramuscular immunizations were administered at weeks 0, 3 and 6. All macaques were monitored for immunogenicity and serum IgE level at weeks 0, 3, 6, 8, 10, 12, 14, 16, 18 and 20.

c. Determination of Anti-IgE EMPD Antibody Titers

All animals were bled at weeks 0, 3, 6, 8, 10, 12, 14, 16, 18 and 20. Serum was separated for each bleed for determination of anti-IgE EMPD antibody titers using the γ1-cyno εm67 ELISA.

The placebo-treated animals no detectable anti-IgE EMPD antibody titers (FIG. 19). However, all animals that received three immunizations with either SEQ ID NO: 125 or SEQ ID NO: 126 had detectable IgG antibody titers against IgE EMPD B epitopes with peak titers obtained at weeks 8 to 12 (FIG. 19). Such specific reactivities were maintained throughout the 20 week study. In addition, all of the immunized animals developed specific IgM and IgA antibody titers throughout the 20-week period (FIG. 20).

d. Measurement of Serum IgE Level

All animals were bled at weeks 0, 3, 6, 8, 10, 12, 14, 16, 18 and 20. Serum was separated for each bleed for measurement of serum IgE using a quantitative macaque IgE ELISA. The basal IgE levels in the placebo group varied during the period of in-life phase. The observed IgE reduction in the group administered with SEQ ID NO: 125 was statistically significant while in the group administered with SEQ ID NO: 126 also showed a trend of IgE reduction during the period monitored (FIG. 19).

e. Results

The effects of IgE EMPD peptide immunogens in a surrogate model on immunogenicity against self-mIgE and serum IgE concentrations in serum samples of adult cynomolgus macaques were evaluated. In this proof-of-concept study, four animals in each group were administered with a mixture of CpG ODN and Montanide™ ISA 51 as a placebo control and 8 adult cynomolgus macaques (n=4 per group) were immunized at 0, 3 and 6 weeks with 300 μg of macaque IgE EMPD peptide immunogens, either SEQ ID NO: 125 or 126, complexed into proprietary immunostimulatory complexes (ISC) with CpG oligodeoxynucleotides (CpG ODN) and formulated with Montanide™ ISA 51 adjuvant. SEQ ID NO: 125 and 126 are the counterparts of human IgE EMPD immunogens, SEQ ID NO: 93 and 88, respectively. The two macaque-derived immunogens with CpG ODN/Montanide™ ISA 51 formulation resulted in strong anti-IgE EMPD IgG antibody responses in all animals (FIG. 19). Furthermore, all animals developed IgM and IgA antibodies against IgE EMPD (FIG. 20). A decreasing trend in basal macaque serum IgE was also observed (FIG. 21). No adverse injection site reactions were noted. The study demonstrated that synthetic IgE EMPD peptide immunogens (SEQ ID NOs: 125 and 126), of which the sequence is derived from self, with enhanced UBITh® T cell epitope were able to elicit profound anti-IgE EMPD antibody responses resulting in suppression of IgE production and a trend in basal macaque serum IgE level reduction.

f. Conclusions

Cynomolgus macaques were injected 3 times by intramuscular route over a 20 week period with the IgE EMPD peptide immunogens (SEQ ID NOs: 125 and 126) or a placebo control. The animals had good overall tolerability and broke out immune tolerance. All immunized macaques developed transient specific IgM antibodies along with the development of potent and sustained IgG (up to $10^5$) and IgA (up to $10^4$) antibody titers against the corresponding B cell epitope of IgE EMPD constructs. Reduced basal IgE levels were observed in each and all responders. These results support the action mode of anti-IgE-EMPD antibody whereby the antibodies target membrane-bound IgE-expressing B cells, leading to suppression of IgE production subsequently.

TABLE 1

IgE-$_{EMPD}$ Peptide and Fragments Thereof Employed in Serological Assays

| Peptide code | Amino Acid positions within IgE-EMPD | SEQ ID NO: | Sequence |
|---|---|---|---|
| | IgE$_{EMPD\ 1-67}$ | 1 | GLAGG SAQSQ RAPDR VLCHS GQQQG LPRAA GGSVP HPRCH CGAGR ADWPG PPELD VCVEE AEGEA PW |
| | IgE$_{EMPD\ 1-52}$ | 2 | GLAGG SAQSQ RAPDR VLCHS GQQQG LPRAA GGSVP HPRCH CGAGR ADWPG PP |
| | IgE$_{EMPD\ 1-52}$ (macaque) | 127 | GLAGG SAQSQ RAPDR VLCHS EQQQG LPRAA RGSVP DHRCH CGAGR ADWPG LP |
| | IgE$_{EMPD\ -10-67}$ | 3 | TVQRA VSVNP GLAGG SAQSQ RAPDR VLCHS GQQQG LPRAA GGSVP HPRCH CGAGR ADWPG PPELD VCVEE AEGEA PW |
| | IgE$_{EMPD\ -10-52}$ | 4 | TVQRA VSVNP GLAGG SAQSQ RAPDR VLCHS GQQQG LPRAA GGSVP HPRCH CGAGR ADWPG PP |
| p4161a | IgE$_{EMPD\ 1-39}$ | 5 | GLAGG SAQSQ RAPDR VLCHS GQQQG LPRAA GGSVP HPRC |
| p4167a | IgE$_{EMPD\ 7-40}$ | 6 | AQSQR APDRV LCHSG QQQGL PRAAG GSVPH PRCH |
| p4374a | IgE$_{EMPD\ 1-17}$ | 7 | GLAGG SAQSQ RAPDR VL |
| p4375a | IgE$_{EMPD\ 19-38}$ | 8 | HSGQQ QGLPR AAGGS VPHPR |

TABLE 1-continued

IgE-$_{EMPD}$ Peptide and Fragments Thereof Employed in Serological Assays

| Peptide code | Amino Acid positions within IgE-EMPD | SEQ ID NO: | Sequence |
|---|---|---|---|
| p4381 | IgE$_{EMPD\ 1-40}$ | 9 | GLAGG SAQSQ RAPDR VLCHS GQQQG LPRAA GGSVP HPRCH |
| p4382 | IgE$_{EMPD\ -8-2}$ | 10 | QRAVS VNPGL |
| p4383 | IgE$_{EMPD\ -7-3}$ | 11 | RAVSV NPGLA |
| p4384 | IgE$_{EMPD\ -6-4}$ | 12 | AVSVN PGLAG |
| p4385 | IgE$_{EMPD\ -5-5}$ | 13 | VSVNP GLAGG |
| p4386 | IgE$_{EMPD\ -4-6}$ | 14 | SVNPG LAGGS |
| p4387 | IgE$_{EMPD\ -3-7}$ | 15 | VNPGL AGGSA |
| p4388 | IgE$_{EMPD\ -2-8}$ | 16 | NPGLA GGSAQ |
| p4389 | IgE$_{EMPD\ -1-9}$ | 17 | PGLAG GSAQS |
| p4390 | IgE$_{EMPD\ 1-10}$ | 18 | GLAGG SAQSQ |
| p4391 | IgE$_{EMPD\ 2-11}$ | 19 | LAGGS AQSQR |
| p4392 | IgE$_{EMPD\ 3-12}$ | 20 | AGGSA QSQRA |
| p4393 | IgE$_{EMPD\ 4-13}$ | 21 | GGSAQ SQRAP |
| p4394 | IgE$_{EMPD\ 5-14}$ | 22 | GSAQS QRAPD |
| p4395 | IgE$_{EMPD\ 6-15}$ | 23 | SAQSQ RAPDR |
| p4396 | IgE$_{EMPD\ 7-16}$ | 24 | AQSQR APDRV |
| p4397 | IgE$_{EMPD\ 8-17}$ | 25 | QSQRA PDRVL |
| p4398 | IgE$_{EMPD\ 9-18}$ | 26 | SQRAP DRVLC |
| p4399 | IgE$_{EMPD\ 10-19}$ | 27 | QRAPD RVLCH |
| p4400 | IgE$_{EMPD\ 11-20}$ | 28 | RAPDR VLCHS |
| p4401 | IgE$_{EMPD\ 12-21}$ | 29 | APDRV LCHSG |
| p4402 | IgE$_{EMPD\ 13-22}$ | 30 | PDRVL CHSGQ |
| p4403 | IgE$_{EMPD\ 14-23}$ | 31 | DRVLC HSGQQ |
| p4404 | IgE$_{EMPD\ 15-24}$ | 32 | RVLCH SGQQQ |
| p4405 | IgE$_{EMPD\ 16-25}$ | 33 | VLCHS GQQQG |
| p4406 | IgE$_{EMPD\ 17-26}$ | 34 | LCHSG QQQGL |
| p4407 | IgE$_{EMPD\ 18-27}$ | 35 | CHSGQ QQGLP |
| p4408 | IgE$_{EMPD\ 19-28}$ | 36 | HSGQQ QGLPR |
| p4409 | IgE$_{EMPD\ 20-29}$ | 37 | SGQQQ GLPRA |
| p4410 | IgE$_{EMPD\ 21-30}$ | 38 | GQQQG LPRAA |
| p4411 | IgE$_{EMPD\ 22-31}$ | 39 | QQQGL PRAAG |
| p4412 | IgE$_{EMPD\ 23-32}$ | 40 | QQGL PRAAGG |
| p4413 | IgE$_{EMPD\ 24-33}$ | 41 | QGLPR AAGGS |
| p4414 | IgE$_{EMPD\ 25-34}$ | 42 | GLPRA AGGSV |
| p4415 | IgE$_{EMPD\ 26-35}$ | 43 | LPRAA GGSVP |
| p4416 | IgE$_{EMPD\ 27-36}$ | 44 | PRAAG GSVPH |

TABLE 1-continued

IgE-$_{EMPD}$ Peptide and Fragments Thereof Employed in Serological Assays

| Peptide code | Amino Acid positions within IgE-EMPD | SEQ ID NO: | Sequence |
|---|---|---|---|
| p4417 | $IgE_{EMPD\ 28-37}$ | 45 | RAAGG SVPHP |
| p4418 | $IgE_{EMPD\ 29-38}$ | 46 | AAGGS VPHPR |
| p4419 | $IgE_{EMPD\ 30-39}$ | 47 | AGGSV PHPRC |
| p4420 | $IgE_{EMPD\ 31-40}$ | 48 | GGSVP HPRCH |
| p4421 | $IgE_{EMPD\ 32-41}$ | 49 | GSVPH PRCHC |
| p4422 | $IgE_{EMPD\ 33-42}$ | 50 | SVPHP RCHCG |
| p4423 | $IgE_{EMPD\ 34-43}$ | 51 | VPHPR CHCGA |
| p4424 | $IgE_{EMPD\ 35-44}$ | 52 | PHPRC HCGAG |
| p4425 | $IgE_{EMPD\ 36-45}$ | 53 | HPRCH CGAGR |
| p4426 | $IgE_{EMPD\ 37-46}$ | 54 | PRCHC GAGRA |
| p4427 | $IgE_{EMPD\ 38-47}$ | 55 | RCHCG AGRAD |
| p4428 | $IgE_{EMPD\ 39-48}$ | 56 | CHCGA GRADW |
| p4429 | $IgE_{EMPD\ 40-49}$ | 57 | HCGAG RADWP |
| p4430 | $IgE_{EMPD\ 41-50}$ | 58 | CGAGR ADWPG |

TABLE 2

Selected Promiscuous T Helper Epitopes for Employment in the Design of IgE-EMPD Derived Peptide Immunogen Constructs

| Description | SEQ ID NO: | Sequence |
|---|---|---|
| Clostridium tetani1 Th | 59 | KKOYIKANSKFIGITEL |
| MvF1 Th | 60 | LSEIKGVIVHRLEGV |
| Bordetella pertussis Th | 61 | GAYARCPNGTRALTVAELRG-NAEL |
| Clostridium tetani2 Th | 62 | WVRDIIDDFTNESSQKT |
| Diphtheria Th | 63 | DSETADNLEKTVAALSILPGHGC |
| Plasmodium falciparum Th | 64 | DHEKKHAKMEKAS SVFNVVNS |
| Schistosoma mansoni Th | 65 | KWFKTNAPNGVDEKHRH |

TABLE 2-continued

Selected Promiscuous T Helper Epitopes for Employment in the Design of IgE-EMPD Derived Peptide Immunogen Constructs

| Description | SEQ ID NO: | Sequence |
|---|---|---|
| Cholera Toxin Th | 66 | ALNIWDRFDVFCTLGAT-TGYLKGNS |
| MvF2 Th | 67 | ISEIKGVIVHKIEGI |
| KKKMvF3 Th | 68 | KKKISISEIKGVIVHKIEGILF<br>T RT TR T |
| HBsAg1 Th | 69 | KKKLFLLTKLLTLPQSLD<br>RRRIKII RII I L IR<br>VRVV VV V I V<br>F FF FF F V F<br>F |
| MvF4 Th | 70 | ISISEIKGVIVHKIETILF<br>T RT TR |
| HBsAg2 Th | 71 | KKKIITITRIITIPQSLD<br>FFLL L ITTI |
| MvF5 Th (UBITh®1) | 72 | ISITEIKGVIVHRIETILF |
| HBsAg3 Th (UBITh®2) | 73 | KKKIITITRIITIITTID |
| Influenza MP1_1 Th | 74 | FVFTLTVPSER |
| Influenza MP1_2 Th | 75 | SGPLKAEIAQRLEDV |
| Influenza NSP1 Th | 76 | DRLRRDQKS |
| EBV BHRF1 Th | 77 | AGLTLSLLVICSYLFISRG |
| Clostridium tetani TT1 Th | 78 | QYIKANSKFIGITEL |
| EBV EBNA-1 Th | 79 | PGPLRESIVCYFMVFLQTHI |
| Clostridium tetani TT2 Th | 80 | FNN FTVS FWLRVPKVSASHLE |
| Clostridium tetani TT3 Th | 81 | KFIIKRYTPNNEIDSF |
| Clostridium tetani TT4 Th | 82 | VSIDKFRIFCKALNPK |
| EBV CP Th | 83 | VPGLYSPCRAFFNKEELL |
| HCMV IE1 Th | 84 | DKREMWMACIKELH |
| EBV GP340 Th | 85 | TGHGARTSTEPTTDY |
| EBV BPLF1 Th | 86 | KELKRQYEKKLRQ |
| EBV EBNA-2 Th | 87 | TVFYNIPPMPL |

TABLE 3

Immunogenicity Enhancement of IgE-EMPD Peptide Fragments by Pathogen Protein derived Th epitopes including Idealized Artificial Th Epitopes for Elicitation of Specific Antibodies in the Design of IgE-$_{EMPD}$ Peptide Immunogen Constructs

| Peptide code | Description | SEQ ID NO: | Sequence |
|---|---|---|---|
| p4160kb | $IgE_{EMPD\ 1-39}$-εK-UBITh1 | 88 | GLAGGSAQSQRAPDRVLCHSGQQQGLPRAAGGSVPHPRC-εK-UBITh1 |
| p4161kb | UBITh1-εK-$IgE_{EMPD\ 1-39}$ | 89 | UBITh1-εK-GLAGGSAQSQRAPDRVLCHSGQQQGLPRAAGGSVPHPRC |

TABLE 3-continued

Immunogenicity Enhancement of IgE-EMPD Peptide Fragments by Pathogen Protein derived Th epitopes including Idealized Artificial Th Epitopes for Elicitation of Specific Antibodies in the Design of $IgE_{EMPD}$ Peptide Immunogen Constructs

| Peptide code | Description | SEQ ID NO: | Sequence |
|---|---|---|---|
| p4162kb | UBITh1-εK-$IgE_{EMPD\ 1-39}$-εK-UBITh1 | 90 | UBITh1-εK-GLAGGSAQSQRAPDRVLCHSGQQQGLPRAAGGSVPHPRC-εK-UBITh1 |
| p4166kb | $IgE_{EMPD\ 7-40}$-εK-UBITh1 | 91 | AQSQRAPDRVLCHSGQQQGLPRAAGGSVPHPRCH-εK-UBITh1 |
| p4167kb | UBITh1-εK-$IgE_{EMPD\ 7-40}$ | 92 | UBITh1-εK-AQSQRAPDRVLCHSGQQQGLPRAAGGSVPHPRCH |
| p4168kb | UBITh1-εK-$IgE_{EMPD\ 7-40}$-εK-UBITh1 | 93 | UBITh1-εK-AQSQRAPDRVLCHSGQQQGLPRAAGGSVPHPRCH-εK-UBITh1 |
| p4372kb | UBITh1-εK-KKK-$IgE_{EMPD\ 1-39}$ | 94 | UBITh1-εK-KKK-GLAGGSAQSQRAPDRVLCHSGQQQGLPRAAGGSVPHPRC |
| p4373kb | UBITh2-εK-KKK-$IgE_{EMPD\ 1-39}$ | 95 | UBITh2-εK-KKK-GLAGGSAQSQRAPDRVLCHSGQQQGLPRAAGGSVPHPRC |
| p4374kb | UBITh1-εK-KKK-$IgE_{EMPD\ 1-17}$ | 96 | UBITh1-εK-KKK-GLAGGSAQSQRAPDRVL |
| p4375kb | UBITh1-εK-KKK-$IgE_{EMPD\ 19-38}$ | 97 | UBITh1-εK-KKK-HSGQQQGLPRAAGGSVPHPR |
| | B. pertussis Th-εK-$IgE_{EMPD\ 1-39}$ | 98 | KKQYIKANSKFIGITEL-εK-GLAGGSAQSQRAPDRVLCHSGQQQGLPRAAGGSVPHPRC |
| | MvF1 Th-εK-$IgE_{EMPD\ 1-39}$ | 99 | LSEIKGVIVHRLEGV-εK-GLAGGSAQSQRAPDRVLCHSGQQQGLPRAAGGSVPHPRC |
| | B. pertussis Th-εK-$IgE_{EMPD\ 1-39}$ | 100 | GAYARCPNGTRALTVAELRGNAEL-εK-GLAGGSAQSQRAPDRVLCHSGQQQGLPRAAGGSVPHPRC |
| | C. tetani2 Th-εK-$IgE_{EMPD\ 1-39}$ | 101 | WVRDIIDDFTNESSQKT-εK-GLAGGSAQSQRAPDRVLCHSGQQQGLPRAAGGSVPHPRC |
| | Diphtheria Th-εK-$IgE_{EMPD\ 1-39}$ | 102 | DSETADNLEKTVAALSILPGHGC-εK-GLAGGSAQSQRAPDRVLCHSGQQQGLPRAAGGSVPHPRC |
| | P. falciparum Th-εK-$IgE_{EMPD\ 1-39}$ | 103 | DHEKKHAKMEKASSVFNVVNS-εK-GLAGGSAQSQRAPDRVLCHSGQQQGLPRAAGGSVPHPRC |
| | S. mansoni Th-εK-$IgE_{EMPD\ 1-39}$ | 104 | KWFKTNAPNGVDEKHRH-εK-GLAGGSAQSQRAPDRVLCHSGQQQGLPRAAGGSVPHPRC |
| | Cholera Toxin Th-εK-$IgE_{EMPD\ 1-39}$ | 105 | ALNIWDRFDVFCTLGATTGYLKGNS-εK-GLAGGSAQSQRAPDRVLCHSGQQQGLPRAAGGSVPHPRC |
| | MvF2 Th-εK-$IgE_{EMPD\ 1-39}$ | 106 | ISEIKGVIVHKIEGI-εK-GLAGGSAQSQRAPDRVLCHSGQQQGLPRAAGGSVPHPRC |
| | KKKMvF3 Th-εK-$IgE_{EMPD\ 1-39}$ | 107 | KKKISISEIKGVIVHKIEGILF-εK-GLAGGSAQSQRAPDRVLCHSGQQQGLPRAAGGSVPHPRC<br>T RT TR T |
| | HBsAg1 Th-εK-$IgE_{EMPD\ 1-39}$ | 108 | KKKLFLLTKLLTLPQSLD-εK-GLAGGSAQSQRAPDRVLCHSGQQQGLPRAAGGSVPHPRC<br>RRRIKII RII I L IR<br>VRVV VV V I V<br>F FF FF F V F<br>F |
| | MvF4 Th-εK-$IgE_{EMPD\ 1-39}$ | 109 | ISISEIKGVIVHKIETILF-εK-GLAGGSAQSQRAPDRVLCHSGQQQGLPRAAGGSVPHPRC<br>T RT TR |
| | HBsAg2 Th-εK-$IgE_{EMPD\ 1-39}$ | 110 | KKKIITITRIITIPQSLD-εK-GLAGGSAQSQRAPDRVLCHSGQQQGLPRAAGGSVPHPRC<br>FFLL L ITTI |
| | Influenza MP1_1 Th-εK-$IgE_{EMPD\ 1-39}$ | 111 | FVFTLTVPSER-εK-GLAGGSAQSQRAPDRVLCHSGQQQGLPRAAGGSVPHPRC |
| | Influenza MP1_2 Th-εK-$IgE_{EMPD\ 1-39}$ | 112 | SGPLKAEIAQRLEDV-εK-GLAGGSAQSQRAPDRVLCHSGQQQGLPRAAGGSVPHPRC |

TABLE 3-continued

| Immunogenicity Enhancement of IgE-EMPD Peptide Fragments by Pathogen Protein derived Th epitopes including Idealized Artificial Th Epitopes for Elicitation of Specific Antibodies in the Design of IgE-$_{EMPD}$ Peptide Immunogen Constructs | | | |
|---|---|---|---|
| Peptide code | Description | SEQ ID NO: | Sequence |
| | Influenza NSP1 Th-εK-IgE$_{EMPD\ 1-39}$ | 113 | DRLRRDQKS-εK-GLAGGSAQSQRAPDRVLCHSGQQQGLPRAAGGSVPHPRC |
| | EBV BHRF1 Th-εK-IgE$_{EMPD\ 1-39}$ | 114 | AGLTLSLLVICSYLFISRG-εK-GLAGGSAQSQRAPDRVLCHSGQQQGLPRAAGGSVPHPRC |
| | C. tetani TT1 Th-εK-IgE$_{EMPD\ 1-39}$ | 115 | QYIKANSKFIGITEL-εK-GLAGGSAQSQRAPDRVLCHSGQQQGLPRAAGGSVPHPRC |
| | EBV EBNA-1 Th-εK-IgE$_{EMPD\ 1-39}$ | 116 | PGPLRESIVCYFMVFLQTHI-εK-GLAGGSAQSQRAPDRVLCHSGQQQGLPRAAGGSVPHPRC |
| | C. tetani TT2 Th-εK-IgE$_{EMPD\ 1-39}$ | 117 | FNNFTVSFWLRVPKVSASHLE-εK-GLAGGSAQSQRAPDRVLCHSGQQQGLPRAAGGSVPHPRC |
| | C. tetani TT3 Th-εK-IgE$_{EMPD\ 1-39}$ | 118 | KFIIKRYTPNNEIDSF-εK-GLAGGSAQSQRAPDRVLCHSGQQQGLPRAAGGSVPHPRC |
| | C. tetani TT4 Th-εK-IgE$_{EMPD\ 1-39}$ | 119 | VSIDKFRIFCKALNPK-εK-GLAGGSAQSQRAPDRVLCHSGQQQGLPRAAGGSVPHPRC |
| | EBV CP Th-εK-IgE$_{EMPD\ 1-39}$ | 120 | VPGLYSPCRAFFNKEELL-εK-GLAGGSAQSQRAPDRVLCHSGQQQGLPRAAGGSVPHPRC |
| | HCMV IE1 Th-εK-IgE$_{EMPD\ 1-39}$ | 121 | DKREMWMACIKELH-εK-GLAGGSAQSQRAPDRVLCHSGQQQGLPRAAGGSVPHPRC |
| | EBV GP340 Th-εK-IgE$_{EMPD\ 1-39}$ | 122 | TGHGARTSTEPTTDY-εK-GLAGGSAQSQRAPDRVLCHSGQQQGLPRAAGGSVPHPRC |
| | EBV BPLF1 Th-εK-IgE$_{EMPD\ 1-39}$ | 123 | KELKRQYEKKLRQ-εK-GLAGGSAQSQRAPDRVLCHSGQQQGLPRAAGGSVPHPRC |
| | EBV EBNA-2 Th-εK-IgE$_{EMPD\ 1-39}$ | 124 | TVFYNIPPMPL-εK-GLAGGSAQSQRAPDRVLCHSGQQQGLPRAAGGSVPHPRC |
| | UBITh2-εK-IgE$_{EMPD\ 1-39}$ | 130 | UBITh2-εK-GLAGGSAQSQRAPDRVLCHSGQQQGLPRAAGGSVPHPRC |
| p4668kb | UBITh1-εK- Macaque IgE$_{EMPD\ 7-40}$-εK-UBITh1 | 125 | UBTh1-εK-AQSQRAPDRVLCHSEQQQGLPRAARGSVPDHRCH-εK-UBTh1 |
| p4670kb | Macaque IgE$_{EMPD\ 1-39}$-εK-UBITh1 | 126 | GLAGGSAQSQRAPDRVLCHSEQQQGLPRAARGSVPDHRC-εK-UBTh1 |
| | Spacer 1 | 128 | PPXPXP |
| | Spacer 2 | 129 | εK-KKK |

Peptides are cyclized by cysteine disulfide bonds with the cysteines underlined.

TABLE 4

| Immunogenicity Assessment in Guinea Pigs of IgE-$_{EMPD}$ derived Peptide Immunogen Constructs | | | | | | | | | | | |
|---|---|---|---|---|---|---|---|---|---|---|---|
| | IgE-EMPD peptide immunogen construct in | SEQ | | IgE-EMPD (1-39) ELISA $Log_{10}$ Titers by Immune Sera directed against IgE EMPD constructs collected at various wpi | | | | | | | |
| Group No. | vaccine formulation | ID NO: | Animal ID | 0 wpi | 4 wpi | 6 wpi | 8 wpi | 10 wpi | 12 wpi | 14 wpi | 16 wpi |
| 1 | IgE$_{EMPD}$ (1-39)-εK-UBITh1 | 88 | 4937 | 0.054 | 7.033 | 7.369 | 7.852 | 7.310 | 7.126 | 6.963 | 6.888 |
| | | | 4938 | 0.046 | 7.132 | 6.873 | 7.093 | 6.775 | 6.688 | 6.617 | 6.579 |
| | | | 4939 | 0.049 | 6.738 | 7.014 | 6.932 | 6.668 | 6.649 | 6.497 | 6.472 |
| | | | Average | 0.050 | 6.968 | 7.085 | 7.292 | 6.918 | 6.821 | 6.692 | 6.646 |

TABLE 4-continued

Immunogenicity Assessment in Guinea Pigs of IgE-$_{EMPD}$ derived Peptide Immunogen Constructs

| Group No. | IgE-EMPD peptide immunogen construct in vaccine formulation | SEQ ID NO: | Animal ID | IgE-EMPD (1-39) ELISA $Log_{10}$ Titers by Immune Sera directed against IgE EMPD constructs collected at various wpi 0 wpi | 4 wpi | 6 wpi | 8 wpi | 10 wpi | 12 wpi | 14 wpi | 16 wpi |
|---|---|---|---|---|---|---|---|---|---|---|---|
| 2 | UBITh1-εK-IgE$_{EMPD}$ (1-39) | 89 | 4940 | 0.053 | 6.870 | 6.815 | 6.938 | 6.748 | 6.944 | 6.598 | 6.695 |
| | | | 4941 | 0.049 | 6.904 | 7.110 | 7.243 | 6.986 | 6.994 | 6.712 | 6.805 |
| | | | 4942 | 0.046 | 7.006 | 7.192 | 7.220 | 6.967 | 6.921 | 6.791 | 6.864 |
| | | | Average | 0.049 | 6.927 | 7.039 | 7.134 | 6.900 | 6.953 | 6.700 | 6.788 |
| 3 | UBITh1-εK-IgE$_{EMPD}$ (1-39)-εK-UBITh1 | 90 | 4943 | 0.064 | 6.684 | 6.941 | 6.946 | 6.636 | 6.726 | 6.523 | 6.585 |
| | | | 4944 | 0.046 | 6.771 | 6.665 | 6.729 | 6.449 | 6.463 | 6.063 | 6.170 |
| | | | 4945 | 0.046 | 6.726 | 6.843 | 6.937 | 6.659 | 6.549 | 6.225 | 6.321 |
| | | | Average | 0.052 | 6.727 | 6.816 | 6.871 | 6.581 | 6.579 | 6.270 | 6.359 |
| 4 | IgE$_{EMPD}$ (7-40)-εK-UBITh1 | 91 | 4946 | 0.049 | 6.997 | 6.887 | 6.962 | 6.765 | 6.905 | 6.531 | 6.510 |
| | | | 4947 | 0.047 | 7.454 | 6.949 | 6.772 | 6.542 | 6.204 | 6.468 | 6.194 |
| | | | 4948 | 0.048 | 6.719 | 6.487 | 6.459 | 6.175 | 6.189 | 5.834 | 6.062 |
| | | | Average | 0.048 | 7.057 | 6.774 | 6.731 | 6.494 | 6.433 | 6.278 | 6.255 |
| 5 | UBITh1-εK-IgE$_{EMPD}$ (7-40) | 92 | 4949 | 0.048 | 6.658 | 5.905 | 5.992 | 5.682 | 5.761 | 5.629 | 5.523 |
| | | | 4950 | 0.047 | 6.959 | 6.659 | 6.635 | 6.545 | 6.506 | 6.417 | 6.369 |
| | | | 4951 | 0.047 | 6.731 | 6.565 | 6.583 | 6.241 | 5.890 | 5.884 | 6.120 |
| | | | Average | 0.047 | 6.783 | 6.376 | 6.403 | 6.156 | 6.052 | 5.977 | 6.004 |
| 6 | UBITh1-εK-IgE$_{EMPD}$ (7-40)-εK-UBITh1 | 93 | 4952 | 0.047 | 6.622 | 6.841 | 7.011 | 7.016 | 6.984 | 6.906 | 6.945 |
| | | | 4953 | 0.045 | 6.632 | 6.872 | 7.213 | 6.931 | 6.980 | 6.846 | 6.830 |
| | | | 4954 | 0.046 | 6.860 | 6.886 | 6.732 | 6.725 | 6.578 | 6.656 | 6.690 |
| | | | Average | 0.046 | 6.705 | 6.866 | 6.985 | 6.891 | 6.847 | 6.803 | 6.822 |

[a] Group 1-6: Vaccinated at 0, 2, 4, 6, 8 and 10 wpi; bleed at 0, 4, 6, 8, 10, 12 and 14 wpi

TABLE 5

Epitope Mapping for Fine Specificity Analysis by Immune Sera against Various Synthetic IgE EMPD Immunogen Constructs

| Peptide Sequence: IgE CH4 / IgE-EMPD (1-52) TVQRAVSVNP**GLAGGSAQSQRAPDRVLCHSGQQQGLPRAAGGSVPHPRCHCGAGRADWPGPP** (SEQ ID NO: 4) | SEQ ID NO: | $AA_X$ to $AA_Y$ | SEQ ID NO: 96 | SEQ ID NO: 97 | SEQ ID NO: 89 | SEQ ID NO: 88 | SEQ ID NO: 88 (non-cyclized) | SEQ ID NO: 93 |
|---|---|---|---|---|---|---|---|---|
| | | | Immune Sera Directed Against Synthetic IgE-EMPD Immunogen Constructs ELISA Abs (450nm) | | | | | |
| QRAVSVNPGL | 10 | -8 to 2 | 0.126 | 0.115 | 0.063 | 0.145 | 0.133 | 0.061 |
| RAVSVNPGLA | 11 | -7 to 3 | 0.109 | 0.095 | 0.066 | 0.110 | 0.108 | 0.070 |
| AVSVNPGLAG | 12 | -6 to 4 | 0.114 | 0.124 | 0.070 | 0.156 | 0.121 | 0.072 |
| VSVNPGLAGG | 13 | -5 to 5 | 0.103 | 0.103 | 0.061 | 0.096 | 0.106 | 0.082 |
| SVNPGLAGGS | 14 | -4 to 6 | 0.113 | 0.098 | 0.066 | 0.151 | 0.119 | 0.073 |
| VNPGLAGGSA | 15 | -3 to 7 | 0.099 | 0.086 | 0.067 | 0.202 | 0.108 | 0.066 |
| NPGLAGGSAQ | 16 | -2 to 8 | 0.117 | 0.104 | 0.080 | 0.176 | 0.129 | 0.087 |
| PGLAGGSAQS | 17 | -1 to 9 | 0.103 | 0.094 | 0.075 | **0.463** | 0.114 | 0.072 |
| GLAGGSAQSQ | 18 | 1 to 10 | 0.112 | 0.108 | 0.076 | 0.229 | 0.126 | 0.082 |
| LAGGSAQSQR | 19 | 2 to 11 | 0.099 | 0.085 | 0.075 | 0.114 | 0.101 | 0.072 |
| AGGSAQSQRA | 20 | 3 to 12 | 0.107 | 0.362 | 0.076 | 0.167 | 0.234 | 0.075 |
| GGSAQSQRAP | 21 | 4 to 13 | 0.091 | 0.088 | 0.129 | 0.104 | 1.926 | 0.067 |
| GSAQSQRAPD | 22 | 5 to 14 | 0.097 | 0.083 | 0.084 | 0.134 | 0.214 | 0.081 |
| SAQSQRAPDR | 23 | 6 to 15 | 0.090 | 0.084 | 0.069 | 0.112 | 0.151 | 0.063 |
| AQSQRAPDRV | 24 | 7 to 16 | 0.090 | 0.090 | 0.077 | 0.200 | 0.130 | 0.071 |
| **QSQRAPDRVL** | 25 | 8 to 17 | **3.559** | 0.081 | 0.080 | 0.162 | 0.132 | 0.081 |
| **SQRAPDRVLC** | 26 | 9 to 18 | 0.097 | 0.099 | **0.495** | **3.822** | **1.525** | 0.204 |
| **QRAPDRVLCH** | 27 | 10 to 19 | 0.086 | 0.091 | **0.377** | **3.090** | **2.975** | 0.143 |

TABLE 5-continued

Epitope Mapping for Fine Specificity Analysis by Immune Sera against Various Synthetic IgE EMPD Immunogen Constructs

| Peptide Sequence: IgE CH4 / IgE-EMPD (1-52) TVQRAVSVNP**GLAGGSAQSQRAPDRVLCHSGQQQGLPRAAGGSVPHPRCHCGAGRADWPGPP** (SEQ ID NO: 4) | SEQ ID NO: | $AA_X$ to $AA_Y$ | Immune Sera Directed Against Synthetic IgE-EMPD Immunogen Constructs: SEQ ID NO: 96 | SEQ ID NO: 97 | SEQ ID NO: 89 | SEQ ID NO: 88 | SEQ ID NO: 88 (non-cyclized) | SEQ ID NO: 93 |
|---|---|---|---|---|---|---|---|---|
| | | | ELISA Abs (450nm) | | | | | |
| RAPDRVLCHS | 28 | 11 to 20 | 0.100 | 0.095 | 0.210 | 0.251 | **1.289** | 0.261 |
| APDRVLCHSG | 29 | 12 to 21 | 0.098 | 0.094 | 0.090 | 0.108 | 0.209 | 0.069 |
| PDRVLCHSGQ | 30 | 13 to 22 | 0.113 | 0.123 | 0.068 | 0.185 | 0.143 | 0.071 |
| DRVLCHSGQQ | 31 | 14 to 23 | 0.105 | 0.106 | 0.065 | 0.098 | 0.118 | 0.062 |
| RVLCHSGQQQ | 32 | 15 to 24 | 0.095 | 0.087 | 0.070 | 0.114 | 0.128 | 0.068 |
| VLCHSGQQQG | 33 | 16 to 25 | 0.108 | 0.104 | 0.062 | 0.094 | 0.112 | 0.064 |
| LCHSGQQQGL | 34 | 17 to 26 | 0.093 | 0.089 | 0.060 | 0.125 | 0.134 | 0.081 |
| **CHSGQQQGLP** | 35 | 18 to 27 | 0.090 | 0.106 | 0.089 | 0.184 | 0.162 | **2.544** |
| **HSGQQQGLPR** | 36 | 19 to 28 | 0.126 | 0.097 | 0.125 | **1.873** | **1.114** | **2.347** |
| **SGQQQGLPRA** | 37 | 20 to 29 | 0.111 | 0.099 | 0.071 | **0.957** | **0.652** | **1.990** |
| **GQQQGLPRAA** | 38 | 21 to 30 | 0.102 | 0.086 | 0.073 | **1.173** | **1.425** | **1.893** |
| **QQQGLPRAAG** | 39 | 22 to 31 | 0.092 | **3.733** | 0.079 | **1.332** | 0.109 | 0.161 |
| **QQGLPRAAGG** | 40 | 23 to 32 | 0.113 | 0.094 | 0.091 | 0.198 | 0.177 | **2.057** |
| **QGLPRAAGGS** | 41 | 24 to 33 | 0.099 | 0.090 | 0.099 | 0.211 | 0.149 | **1.625** |
| GLPRAAGGSV | 42 | 25 to 34 | 0.099 | 0.083 | 0.092 | 0.317 | 0.129 | 0.226 |
| LPRAAGGSVP | 43 | 26 to 35 | 0.090 | 0.102 | 0.104 | 0.330 | 0.120 | 0.116 |
| PRAAGGSVPH | 44 | 27 to 36 | 0.099 | 0.080 | 0.083 | 0.167 | 0.131 | 0.150 |
| RAAGGSVPHP | 45 | 28 to 37 | 0.092 | 0.088 | 0.104 | 0.124 | 0.118 | 0.265 |
| **AAGGSVPHPR** | 46 | **29 to 38** | 0.108 | 0.084 | 0.075 | **0.249** | 0.279 | **2.367** |

TABLE 5-continued

Epitope Mapping for Fine Specificity Analysis by Immune Sera against Various Synthetic IgE EMPD Immunogen Constructs

| Peptide Sequence: IgE CH4 | Peptide Sequence: IgE-EMPD (1-52) | SEQ ID NO: | $AA_X$ to $AA_Y$ | SEQ ID NO: 96 | SEQ ID NO: 97 | SEQ ID NO: 89 | SEQ ID NO: 88 | SEQ ID NO: 88 (non-cyclized) | SEQ ID NO: 93 |
|---|---|---|---|---|---|---|---|---|---|
| TVQRAVSVNP | **GLAGGSAQSQRAPDRVLCHSGQQQGLPRAAGGSVPHPRCHCGAGRADWPGPP** (SEQ ID NO: 4) | | | Immune Sera Directed Against Synthetic IgE-EMPD Immunogen Constructs — ELISA Abs (450nm) | | | | | |
| | **AGGSVPHPRC** | 47 | **30 to 39** | 0.091 | 0.151 | **2.585** | **4.000** | 0.118 | **2.499** |
| | **GGSVPHPRCH** | 48 | **31 to 40** | 0.116 | 0.098 | 0.277 | **3.908** | 0.125 | **2.362** |
| | **GSVPHPRCHC** | 49 | **32 to 41** | 0.095 | 0.167 | 0.156 | **3.582** | 0.115 | **2.498** |
| | **SVPHPRCHCG** | 50 | **33 to 42** | 0.128 | 0.138 | 0.139 | **2.939** | 0.129 | **2.335** |
| | **VPHPRCHCGA** | 51 | **34 to 43** | 0.126 | 0.188 | 0.092 | **3.879** | **3.279** | **2.595** |
| | PHPRCHCGAG | 52 | 35 to 44 | 0.163 | 0.122 | 0.088 | 0.182 | 0.140 | 0.102 |
| | HPRCHCGAGR | 53 | 36 to 45 | 0.153 | 0.164 | 0.090 | 0.176 | 0.141 | 0.090 |
| | PRCHCGAGRA | 54 | 37 to 46 | 0.123 | 0.123 | 0.092 | 0.139 | 0.185 | 0.089 |
| | RCHCGAGRAD | 55 | 38 to 47 | 0.119 | 0.130 | 0.097 | 0.126 | 0.127 | 0.100 |
| | CHCGAGRADW | 56 | 39 to 48 | 0.109 | 0.109 | 0.090 | 0.140 | 0.150 | 0.086 |
| | HCGAGRADWP | 57 | 40 to 49 | 0.131 | 0.181 | 0.105 | 0.170 | 0.162 | 0.112 |
| | CGAGRADWPG | 58 | 41 to 50 | 0.112 | 0.110 | 0.094 | 0.119 | 0.180 | 0.096 |
| | **AQSQRAPDRVLCHSGOOOGLPRAAGGSVPHPRCH** | 6 | 7 to 40 | 0.151 | **3.263** | **2.589** | **3.317** | **3.957** | **2.609** |
| | **GLAGGSAQSQRAPDRVLCHSGQQQGLPRAAGGSVPHPRC** | 5 | 1 to 39 | 0.221 | **3.385** | **2.515** | **3.286** | **3.957** | **2.475** |
| | **GLAGGSAQSQRAPDRVL** | 7 | 1 to 17 | **3.763** | 0.084 | **2.809** | **3.536** | | **2.314** |
| | **HSGQQQGLPRAAGGSVPHPR** | 8 | 19 to 38 | **0.086** | **3.785** | **3.798** | **3.313** | | **4.000** |

TABLE 6

Ranking of IgEEMPD B epitope Enhancing Capability of Pathogen derived Th Epitopes by Immunogenicity Assessment in Guinea Pigs

| Group No. | IgE-EMPD peptide immunogen construct | SEQ ID NO: | Animal ID | IgE-EMPD (G1-C39) ELISA $Log_{10}$ Titer 0 wpi | 3 wpi | 6 wpi |
|---|---|---|---|---|---|---|
| 1 | IgE-EMPD (G1-C39)-εK-UBITh1 | 88 | 6381 | 0.155 | >10 | >10 |
| | | | 6382 | 0.116 | >10 | >10 |
| | | | 6383 | 0.094 | >10 | >10 |
| | | | Avg | 0.122 | >10 | >10 |
| 12 | HBsAg1 Th-εK-IgE-EMPD (G1-C39) | 108 | 6414 | 0.070 | >10 | >10 |
| | | | 6415 | 0.078 | >10 | >10 |
| | | | 6416 | 0.061 | >10 | >10 |
| | | | Avg | 0.069 | >10 | >10 |
| 29 | UBITh3-εK-IgE-EMPD (G1-C39) | 109 | 6465 | 0.075 | >10 | >10 |
| | | | 6466 | 0.080 | 9.094 | 8.544 |
| | | | 6467 | 0.095 | >10 | >10 |
| | | | Avg | 0.084 | >10 | 9.515 |
| 22 | Clostridium tetani TT4 Th-εK-IgE-EMPD (G1-C39) | 119 | 6444 | 0.070 | >10 | 12.08 |
| | | | 6445 | 0.113 | 8.574 | 8.892 |
| | | | 6446 | 0.086 | >10 | 10.25 |
| | | | Avg | 0.090 | >10 | 10.41 |
| 11 | KKKMvF3 Th-εK-IgE-EMPD (G1-C39) | 107 | 6411 | 0.058 | 7.443 | >10 |
| | | | 6412 | 0.067 | >10 | >10 |
| | | | 6413 | 0.131 | >10 | >10 |
| | | | Avg | 0.085 | 9.814 | >10 |
| 28 | UBITh2-εK-IgE-EMPD (G1-C39) | 130 | 6462 | 0.083 | >10 | >10 |
| | | | 6463 | 0.095 | 4.817 | 5.043 |
| | | | 6464 | 0.074 | 5.011 | 5.181 |
| | | | Avg | 0.084 | 6.943 | 7.075 |
| 9 | Cholera Toxin Th-εK-IgE-EMPD (G1-C39) | 105 | 6405 | 0.068 | 5.361 | 5.850 |
| | | | 6406 | 0.117 | 5.424 | 6.934 |
| | | | 6407 | 0.066 | >10 | >10 |
| | | | Avg | 0.084 | 6.928 | 7.595 |
| 19 | EBV EBNA-1 Th-εK-IgE-EMPD (G1-C39) | 116 | 6435 | 0.065 | >10 | >10 |
| | | | 6436 | 0.074 | 5.369 | 5.293 |
| | | | 6437 | 0.089 | 4.788 | 5.074 |
| | | | Avg | 0.076 | 7.052 | 7.122 |
| 7 | Plasmodium falciparum Th-εK-IgE-EMPD (G1-C39) | 103 | 6399 | 0.063 | 5.902 | 5.789 |
| | | | 6400 | 0.052 | 5.269 | 5.173 |
| | | | 6401 | 0.054 | 8.749 | 7.260 |
| | | | Avg | 0.056 | 6.640 | 6.074 |
| 24 | HCMV IE1 Th-εK-IgE-EMPD (G1-C39) | 121 | 6450 | 0.058 | 5.333 | 6.636 |
| | | | 6451 | 0.068 | 6.203 | 7.349 |
| | | | 6452 | 0.074 | 5.464 | 5.180 |
| | | | Avg | 0.067 | 5.667 | 6.388 |
| 8 | Schistosoma mansoni Th-εK-IgE-EMPD (G1-C39) | 104 | 6402 | 0.054 | 4.703 | 4.053 |
| | | | 6403 | 0.063 | 7.552 | 5.500 |
| | | | 6404 | 0.070 | 4.521 | 3.713 |
| | | | Avg | 0.062 | 5.592 | 4.422 |
| 27 | EBV EBNA-2 Th-εK-IgE-EMPD (G1-C39) | 124 | 6459 | 0.074 | 5.426 | 5.044 |
| | | | 6460 | 0.087 | 5.934 | 5.359 |
| | | | 6461 | 0.140 | 5.265 | 5.261 |
| | | | Avg | 0.100 | 5.542 | 5.221 |
| 10 | MvF2 Th-εK-IgE-EMPD (G1-C39) | 106 | 6408 | 0.056 | 5.691 | 5.100 |
| | | | 6409 | 0.058 | 5.781 | 5.250 |
| | | | 6410 | 0.054 | 5.055 | 4.981 |
| | | | Avg | 0.056 | 5.509 | 5.110 |
| 6 | Diphtheria Th-εK-IgE-EMPD (G1-C39) | 102 | 6396 | 0.089 | 5.010 | 4.703 |
| | | | 6397 | 0.068 | 5.126 | 5.128 |
| | | | 6398 | 0.062 | 6.203 | 5.187 |
| | | | Avg | 0.073 | 5.446 | 5.006 |
| 18 | Clostridium tetani TT1 Th-εK-IgE-EMPD (G1-C39) | 115 | 6432 | 0.068 | 5.420 | 5.218 |
| | | | 6433 | 0.059 | 5.162 | 4.900 |
| | | | 6434 | 0.053 | 5.475 | 5.222 |
| | | | Avg | 0.060 | 5.352 | 5.113 |
| 20 | Clostridium tetani TT2 Th-εK-IgE-EMPD (G1-C39) | 117 | 6438 | 0.073 | 5.112 | 8.025 |
| | | | 6439 | 0.060 | 5.031 | 7.576 |
| | | | 6440 | 0.057 | 5.574 | 6.304 |
| | | | Avg | 0.063 | 5.239 | 7.302 |
| 17 | EBV BHRF1 Th-εK-IgE-EMPD (G1-C39) | 114 | 6429 | 0.073 | 4.886 | 5.111 |
| | | | 6430 | 0.083 | 5.723 | 10.91 |
| | | | 6431 | 0.064 | 5.098 | 5.582 |
| | | | Avg | 0.073 | 5.236 | 7.200 |
| 3 | MvF1 Th-εK-IgE-EMPD (G1-C39) | 99 | 6387 | 0.096 | 5.373 | 5.305 |
| | | | 6388 | 0.068 | 5.119 | 5.449 |
| | | | 6389 | 0.133 | 5.143 | 6.451 |
| | | | Avg | 0.099 | 5.212 | 5.735 |

TABLE 6-continued

Ranking of IgEEMPD B epitope Enhancing Capability of Pathogen derived Th Epitopes by Immunogenicity Assessment in Guinea Pigs

| Group No. | IgE-EMPD peptide immunogen construct | SEQ ID NO: | Animal ID | IgE-EMPD (G1-C39) ELISA $Log_{10}$ Titer 0 wpi | 3 wpi | 6 wpi |
|---|---|---|---|---|---|---|
| 2 | Clostridium tetani1 Th-εK-IgE-EMPD (G1-C39) | 98 | 6384 | 0.074 | 5.176 | 5.582 |
| | | | 6385 | 0.072 | 5.242 | 5.732 |
| | | | 6386 | 0.064 | 5.083 | 5.722 |
| | | | Avg | 0.070 | 5.167 | 5.679 |
| 23 | EBV CP Th-εK-IgE-EMPD (G1-C39) | 120 | 6447 | 0.077 | 5.107 | 4.970 |
| | | | 6448 | 0.055 | 5.014 | 5.035 |
| | | | 6449 | 0.054 | 5.209 | 5.146 |
| | | | Avg | 0.062 | 5.110 | 5.050 |
| 26 | EBV BPLF1 Th-εK-IgE-EMPD (G1-C39) | 123 | 6456 | 0.070 | 5.171 | 5.115 |
| | | | 6457 | 0.063 | 4.931 | 4.870 |
| | | | 6458 | 0.083 | 4.875 | 5.089 |
| | | | Avg | 0.072 | 4.992 | 5.025 |
| 15 | Influenza MP1_2 Th-εK-IgE-EMPD (G1-C39) | 112 | 6423 | 0.068 | 6.062 | 5.351 |
| | | | 6424 | 0.055 | 4.518 | 4.474 |
| | | | 6425 | 0.070 | 4.323 | 4.579 |
| | | | Avg | 0.064 | 4.968 | 4.801 |
| 13 | HBsAg2 Th-εK-IgE-EMPD (G1-C39) | 110 | 6417 | 0.067 | 5.234 | 6.403 |
| | | | 6418 | 0.056 | 4.863 | 5.305 |
| | | | 6419 | 0.065 | 4.731 | 4.902 |
| | | | Avg | 0.063 | 4.943 | 5.537 |
| 4 | Bordetella pertussis Th-εK-IgE-EMPD (G1-C39) | 100 | 6390 | 0.090 | 3.579 | 4.535 |
| | | | 6391 | 0.090 | 5.230 | 5.084 |
| | | | 6392 | 0.070 | 5.200 | 5.525 |
| | | | Avg | 0.083 | 4.670 | 5.048 |
| 16 | Influenza NSP1 Th-εK-IgE-EMPD (G1-C39) | 113 | 6426 | 0.056 | 2.994 | 3.087 |
| | | | 6427 | 0.070 | 0.249 | 0.000 |
| | | | 6428 | 0.082 | 9.361 | 7.041 |
| | | | Avg | 0.069 | 4.201 | 3.376 |
| 14 | Influenza MP1_1 Th-εK-IgE-EMPD (G1-C39) | 111 | 6420 | 0.067 | 5.399 | 6.554 |
| | | | 6421 | 0.112 | 3.469 | 4.688 |
| | | | 6422 | 0.080 | 2.316 | 4.439 |
| | | | Avg | 0.086 | 3.728 | 5.227 |
| 21 | Clostridium tetani TT3 Th-εK-IgE-EMPD (G1-C39) | 118 | 6441 | 0.056 | 0.000 | 3.181 |
| | | | 6442 | 0.055 | 2.144 | 2.893 |
| | | | 6443 | 0.059 | 5.268 | 5.168 |
| | | | Avg | 0.057 | 2.471 | 3.747 |
| 25 | EBV GP340 Th-εK-IgE-EMPD (G1-C39) | 122 | 6453 | 0.124 | 3.462 | 3.360 |
| | | | 6454 | 0.084 | 3.004 | 3.410 |
| | | | 6455 | 0.065 | 0.000 | 3.062 |
| | | | Avg | 0.091 | 2.155 | 3.277 |
| 5 | Clostridium tetani2 Th-εK-IgE-EMPD (G1-C39) | 101 | 6393 | 0.079 | 4.814 | 4.830 |
| | | | 6394 | 0.075 | 1.313 | 2.762 |
| | | | 6395 | 0.071 | 0.000 | 0.000 |
| | | | Avg | 0.075 | 2.042 | 2.531 |

TABLE 7

Immunogenicity Assessment by Guinea Pig Immune Sera directed against the Th peptide of a representative $IgE_{EMPD}$ Peptide Immunogen Construct (SEQ ID NO: 94) upon Prime (0 wpi) and Boost (3 and 6 wpi)

| Group No. | Description of $IgE_{EMPD\ 1-39}$ peptide construct in the vaccine formulation | SEQ ID NO: | Animal ID | $IgE_{EMPD\ 1-39}$ ELISA $Log_{10}$ Titer (SEQ ID NO: 5) 0 wpi | 3 wpi | 6 wpi | 8 wpi | UBITh1 ELISA $Log_{10}$ Titer (SEQ ID NO: 72) 0 wpi | 3 wpi | 6 wpi | 8 wpi |
|---|---|---|---|---|---|---|---|---|---|---|---|
| 1 | UBITh1-εK-KKK-$IgE_{EMPD}$ (1-39) | 94 | 5401 | 0.067 | 5.151 | 6.420 | 5.389 | 0.066 | 0.000 | 0.000 | 0.076 |
| | | | 5402 | 0.065 | 5.244 | 4.985 | 4.909 | 0.064 | 0.000 | 0.000 | 0.000 |
| | | | 5403 | 0.074 | 5.130 | 7.863 | 5.282 | 0.075 | 0.000 | 0.000 | 0.000 |
| | | | Average | 0.068 | 5.175 | 6.423 | 5.193 | 0.068 | 0.000 | 0.000 | 0.025 |

The invention claimed is:

1. A peptide immunogen construct targeting an extracellular membrane-proximal domain of membrane-bound IgE (IgE EMPD), wherein the peptide immunogen construct consists of the amino acid sequence selected from the group consisting of SEQ ID NOs: 88-95, 98-124, and 130.

2. A composition comprising a peptide immunogen construct according to claim 1.

3. A pharmaceutical composition comprising:

(a) a peptide immunogen construct according to claim 1; and (b) a pharmaceutically acceptable delivery vehicle and/or adjuvant.

4. The pharmaceutical composition of claim 3, wherein the peptide immunogen construct is mixed with a CpG oligodeoxynucleotide (ODN) to form a stabilized immunostimulatory complex.

* * * * *